United States Patent
Davis et al.

(10) Patent No.: US 7,537,499 B2
(45) Date of Patent: May 26, 2009

(54) REDUCED-SIZE VEHICLE WITH COMPARTMENTS PROVIDING BUOYANCY

(75) Inventors: Eric A. Davis, Mequon, WI (US); Brian P. Davis, Milwaukee, WI (US); Richard A. Davis, Mequon, WI (US)

(73) Assignee: American Off-Road Technologies, LLC, Mequon, WI (US)

( * ) Notice: Subject to any disclaimer, the term of this patent is extended or adjusted under 35 U.S.C. 154(b) by 296 days.

(21) Appl. No.: 11/323,990

(22) Filed: Dec. 30, 2005

(65) Prior Publication Data

US 2006/0186699 A1    Aug. 24, 2006

Related U.S. Application Data

(60) Provisional application No. 60/640,410, filed on Dec. 30, 2004.

(51) Int. Cl.
*B60F 3/00* (2006.01)
*B63B 43/02* (2006.01)
*B63B 43/10* (2006.01)
*B62D 21/00* (2006.01)

(52) U.S. Cl. .................. 440/12.5; 114/68; 114/360; 280/783

(58) Field of Classification Search ............ 280/781, 280/783; 114/68, 69, 123, 360; 296/24.3, 296/37.14–37.16; 440/11, 12, 12.5–12.7
See application file for complete search history.

(56) References Cited

U.S. PATENT DOCUMENTS 1,411,875 A    4/1922    Schroeder 1,802,427 A    4/1931    Hughes et al.

(Continued)

FOREIGN PATENT DOCUMENTS

DE    3830702    3/1990

(Continued)

OTHER PUBLICATIONS

Four Wheel All-Terrain Vehicles, American National Standard, ANSI/SVIA-1-200X, Specialty Vehicle Institute of America, Rev. Apr. 3, 2007, pp. 1-45, 2 Jenner Street, Ste 150, Irvine, CA 92618-3806.

(Continued)

*Primary Examiner*—Ajay Vasudeva
(74) *Attorney, Agent, or Firm*—Whyte Hirschboeck Dudek SC

(57) ABSTRACT

Various embodiments of reduced-size vehicles such as all-terrain vehicles (ATVs) and utility vehicles (UVs) are disclosed herein. In at least some embodiments, the vehicles include frames that are wider near the front and rear sections of the vehicles than within the mid-sections of the vehicles. This, in combination with the use of shock-absorbers that are substantially vertically oriented, allows for the opening-up of large interior cavities within the front and rear sections of the vehicles within which can be positioned large front and rear internal compartments that can provide storage/carrying capacity as well as added buoyancy for the vehicle, among other things. Also, in at least some embodiments, the vehicles can include special cooling and/or exhaust systems having components that are positioned substantially within the mid-sections of the vehicles, thus further increasing the amounts of space available for the cavities/compartments within the front and rear sections of the vehicles.

22 Claims, 32 Drawing Sheets

U.S. PATENT DOCUMENTS

| | | | |
|---|---|---|---|
| 2,278,255 A * | 3/1942 | Grabbe | 440/12.58 |
| 2,637,592 A | 5/1953 | Henning | |
| 2,941,494 A * | 6/1960 | McBride | 440/97 |
| 3,215,113 A * | 11/1965 | Roberts | 440/12.5 |
| 3,426,720 A * | 2/1969 | Enos | 440/12.66 |
| 4,237,995 A | 12/1980 | Pivar | |
| 4,328,601 A * | 5/1982 | Rodler et al. | 114/353 |
| 4,535,869 A | 8/1985 | Tsutsumikoshi et al. | |
| 4,662,467 A | 5/1987 | Arai et al. | |
| 4,666,015 A | 5/1987 | Matsuda et al. | |
| 4,690,235 A | 9/1987 | Miyakoshi | |
| 4,726,439 A | 2/1988 | Iwao et al. | |
| 4,735,275 A | 4/1988 | Tsukahara et al. | |
| 4,770,262 A | 9/1988 | Yasunaga et al. | |
| 4,830,135 A | 5/1989 | Yamashita | |
| 4,836,324 A | 6/1989 | Morita et al. | |
| 4,913,347 A | 4/1990 | Burst et al. | |
| 5,044,646 A | 9/1991 | Liga et al. | |
| 5,083,632 A | 1/1992 | Saito et al. | |
| 5,086,858 A | 2/1992 | Mizuta et al. | |
| 5,112,100 A | 5/1992 | Murkett et al. | |
| 5,400,734 A * | 3/1995 | Doyon | 440/12.51 |
| 5,401,056 A | 3/1995 | Eastman | |
| 5,575,352 A | 11/1996 | Suzuki et al. | |
| 5,687,669 A * | 11/1997 | Engler | 440/12.52 |
| 5,791,431 A | 8/1998 | Asao et al. | |
| 5,845,918 A | 12/1998 | Grinde et al. | |
| 5,855,250 A | 1/1999 | Nishi | |
| 5,868,093 A * | 2/1999 | Tseng | 440/12.5 |
| 5,921,339 A | 7/1999 | Matsuura | |
| 5,975,624 A | 11/1999 | Rasidescu et al. | |
| 6,116,972 A * | 9/2000 | Bellezza Quater et al. | 440/12.51 |
| 6,182,784 B1 | 2/2001 | Pestotnik | |
| 6,209,941 B1 | 4/2001 | Cross | |
| 6,264,241 B1 | 7/2001 | Horiuchi | |
| 6,296,073 B1 | 10/2001 | Rioux et al. | |
| 6,357,542 B1 | 3/2002 | Sako | |
| 6,394,225 B1 | 5/2002 | Yasuda | |
| 6,412,856 B1 | 7/2002 | Kajikawa et al. | |
| 6,454,039 B1 | 9/2002 | Matsuura | |
| 6,523,634 B1 | 2/2003 | Gagnon et al. | |
| 6,533,339 B1 | 3/2003 | Bettin et al. | |
| 6,547,027 B1 | 4/2003 | Kalhok et al. | |
| 6,581,716 B1 | 6/2003 | Matsuura | |
| 6,588,536 B1 | 7/2003 | Chiu | |
| 6,622,666 B2 | 9/2003 | Kuji | |
| 6,626,260 B2 | 9/2003 | Gagnon et al. | |
| 6,626,712 B1 * | 9/2003 | Bellezza Quater et al. | 440/12.56 |
| 6,637,539 B2 | 10/2003 | Rioux et al. | |
| 6,648,093 B2 | 11/2003 | Rioux et al. | |
| 6,672,916 B1 * | 1/2004 | Lent-Phillips et al. | 440/12.5 |
| 6,702,058 B2 | 3/2004 | Ishii et al. | |
| 6,705,417 B2 | 3/2004 | Kitai et al. | |
| 6,705,680 B2 | 3/2004 | Bombardier | |
| 6,719,084 B2 | 4/2004 | Kuji et al. | |
| 6,719,346 B2 | 4/2004 | Bettin et al. | |
| 6,767,022 B1 | 7/2004 | Chevalier | |
| 6,799,781 B2 | 10/2004 | Rasidescu et al. | |
| 6,881,108 B2 * | 4/2005 | Lin | 440/12.51 |
| 6,971,462 B2 | 12/2005 | Ito et al. | |
| 7,077,714 B2 * | 7/2006 | Brown | 440/12.5 |
| 7,128,341 B1 | 10/2006 | Dahl et al. | |
| 7,134,702 B2 | 11/2006 | Takahashi et al. | |
| 7,188,696 B2 | 3/2007 | Arnold | |
| 7,237,637 B2 | 7/2007 | Fecteau et al. | |
| 7,287,621 B2 | 10/2007 | Kuroki et al. | |
| 7,303,221 B2 | 12/2007 | Takahashi et al. | |
| 7,306,069 B2 | 12/2007 | Takeshima et al. | |
| 7,311,167 B2 | 12/2007 | Takayanagi et al. | |
| 7,377,570 B2 | 5/2008 | Rondeau et al. | |
| 2002/0117843 A1 | 8/2002 | Rasidescu et al. | |
| 2002/0153182 A1 | 10/2002 | Vaillancourt et al. | |
| 2003/0111859 A1 | 6/2003 | Bettin et al. | |
| 2003/0136613 A1 | 7/2003 | Seki | |
| 2004/0035623 A1 | 2/2004 | Fecteau et al. | |
| 2004/0035626 A1 | 2/2004 | Girouard et al. | |
| 2004/0084239 A1 | 5/2004 | Hioki | |
| 2004/0195035 A1 | 10/2004 | Takeshima et al. | |
| 2004/0231908 A1 | 11/2004 | Michisaka et al. | |
| 2005/0006169 A1 | 1/2005 | Michisaka et al. | |
| 2006/0066069 A1 | 3/2006 | Yanai et al. | |
| 2007/0044748 A1 | 3/2007 | Yasuda et al. | |
| 2007/0164537 A1 | 7/2007 | Lee | |

FOREIGN PATENT DOCUMENTS

| | | | |
|---|---|---|---|
| EP | 581318 A2 | | 2/1994 |
| JP | 1-215687 | | 8/1989 |
| JP | 01215687 | | 8/1989 |
| JP | 1-254480 | | 10/1989 |
| JP | 1-311974 | | 12/1989 |
| JP | 02070514 A | * | 3/1990 |
| JP | 2-169380 | | 6/1990 |

OTHER PUBLICATIONS

Powerpoint presentation—Polaris, etc. 8 pages.
Pure Polaris: Lock & Ride Accessory System, www.purepolaris.com; (3 pages).
Artic Cat Speedrack, www.articcat.com/atv/speedrack.asp; (2 pages).
Four Wheel All-Terrain Vehicles—Equipment, Configuration, and Performance Requirements, ANSI, ANSI/SVIA-1-2001, pp. 1-23, Feb. 15, 2001.

* cited by examiner

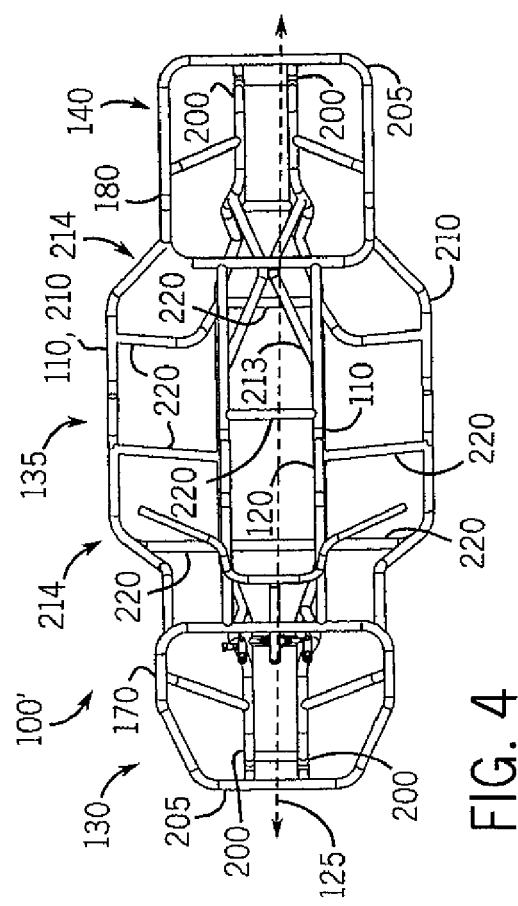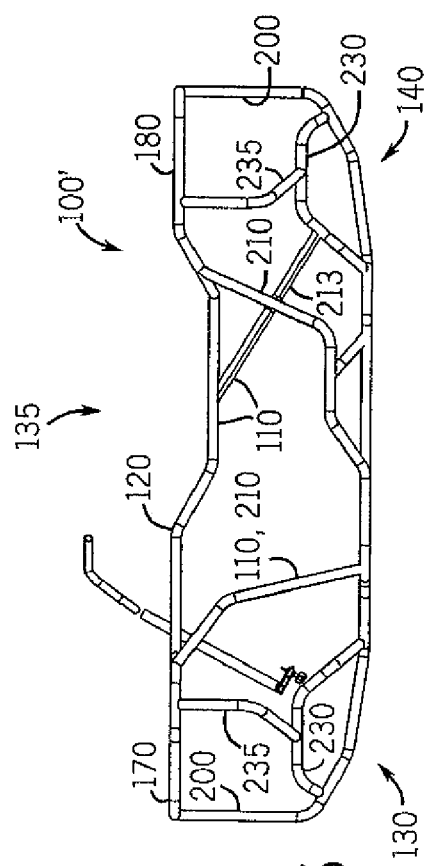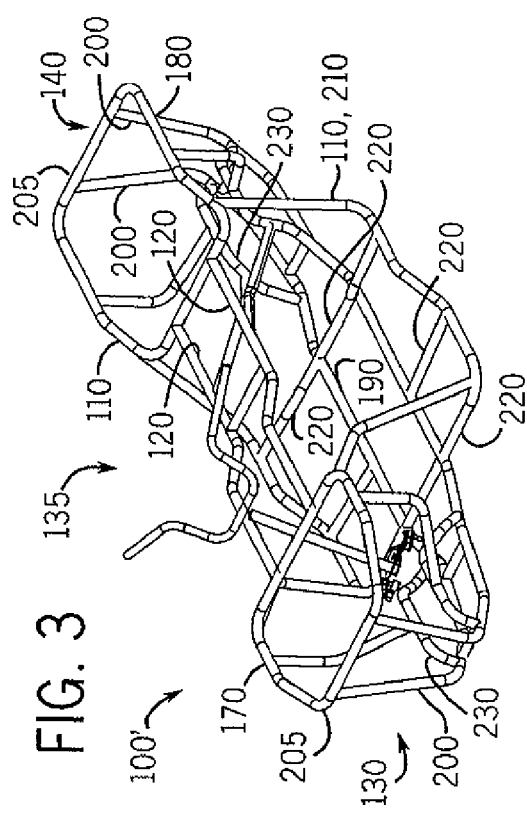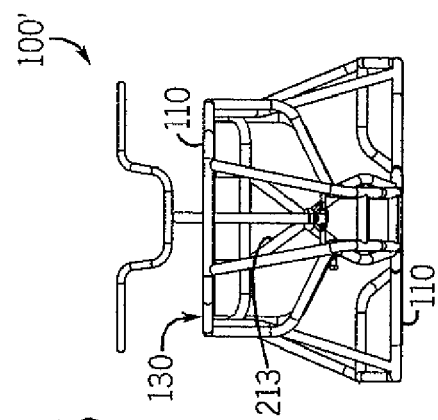

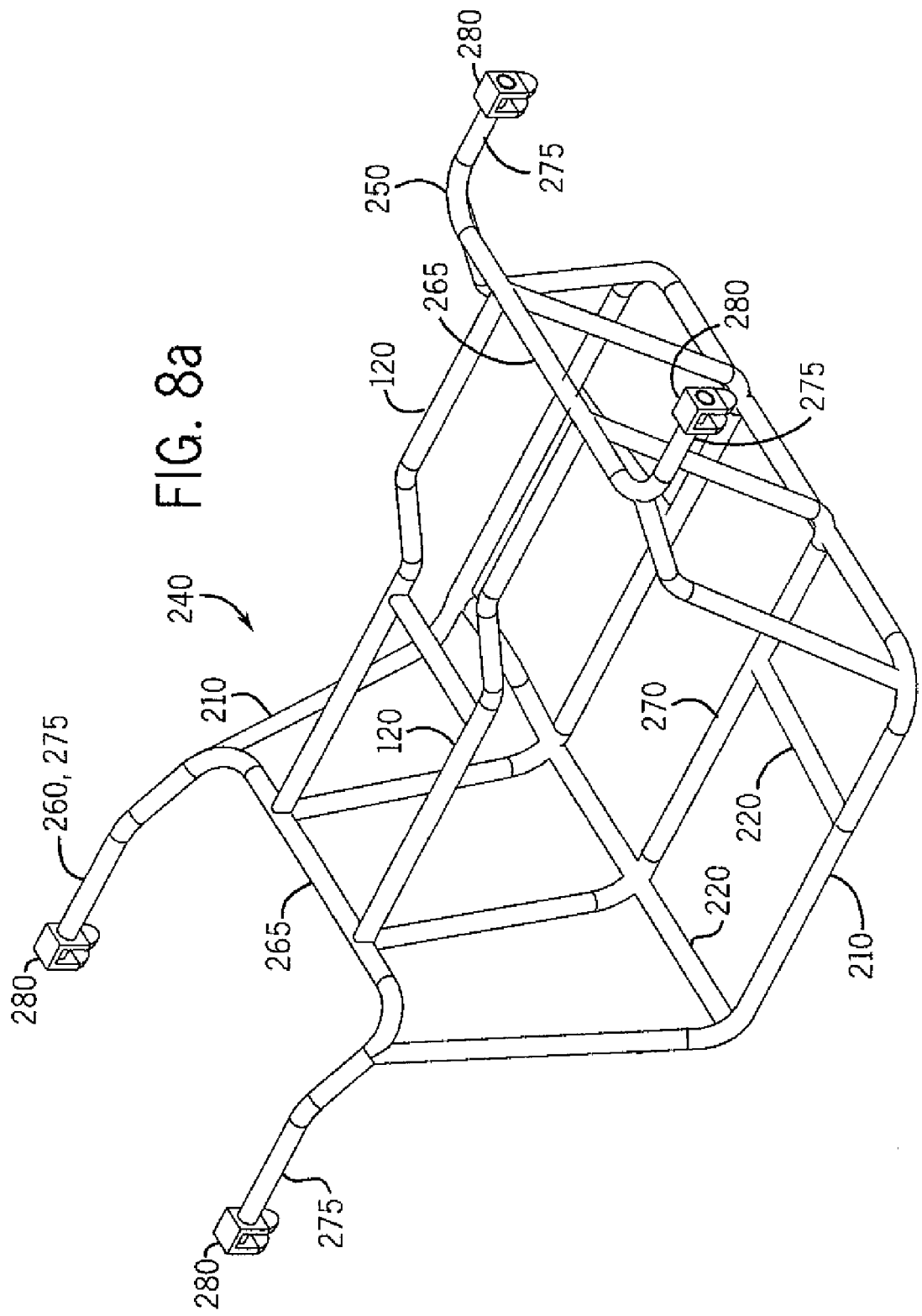

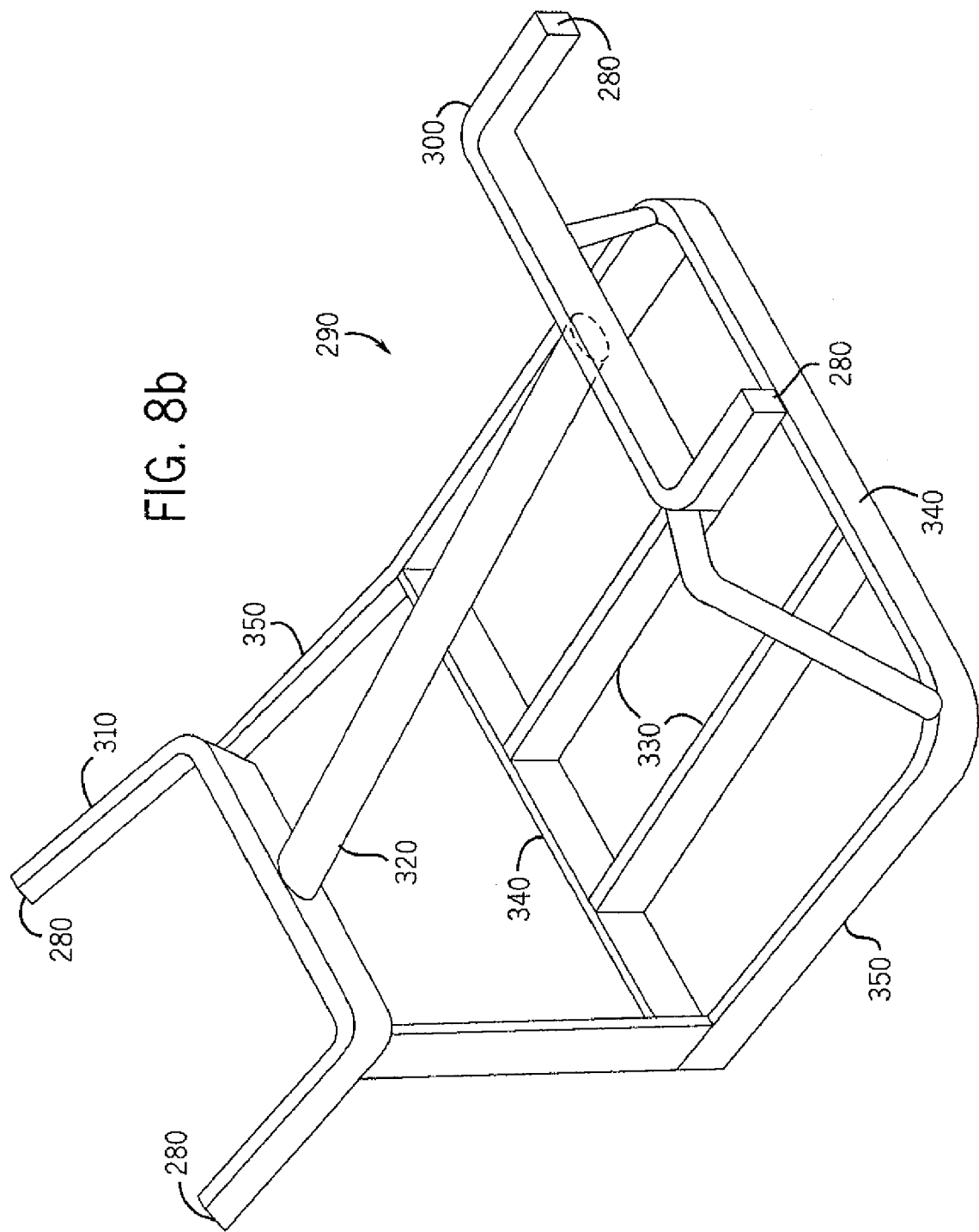

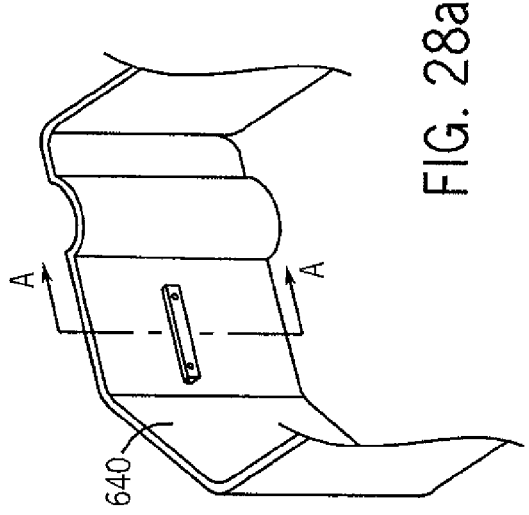
FIG. 28a
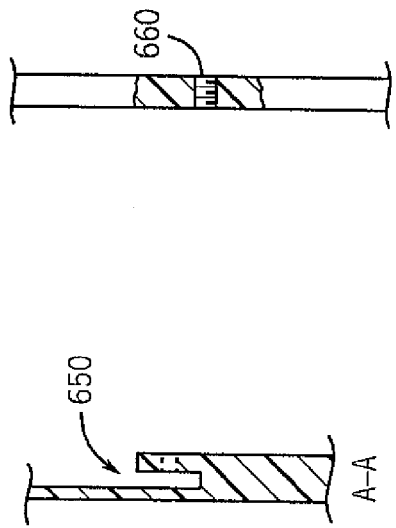
FIG. 28b
FIG. 28c
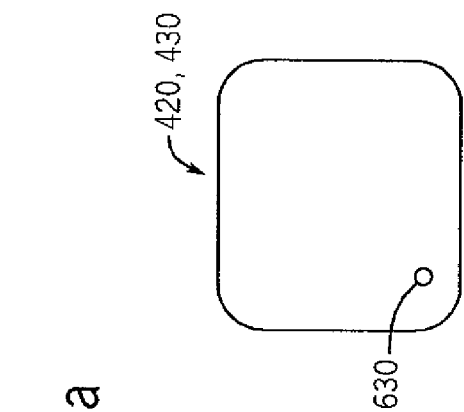
FIG. 27
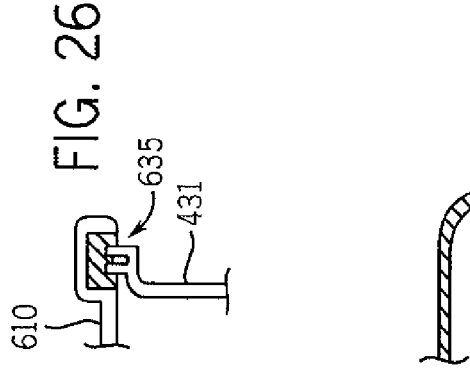
FIG. 26a
FIG. 26b

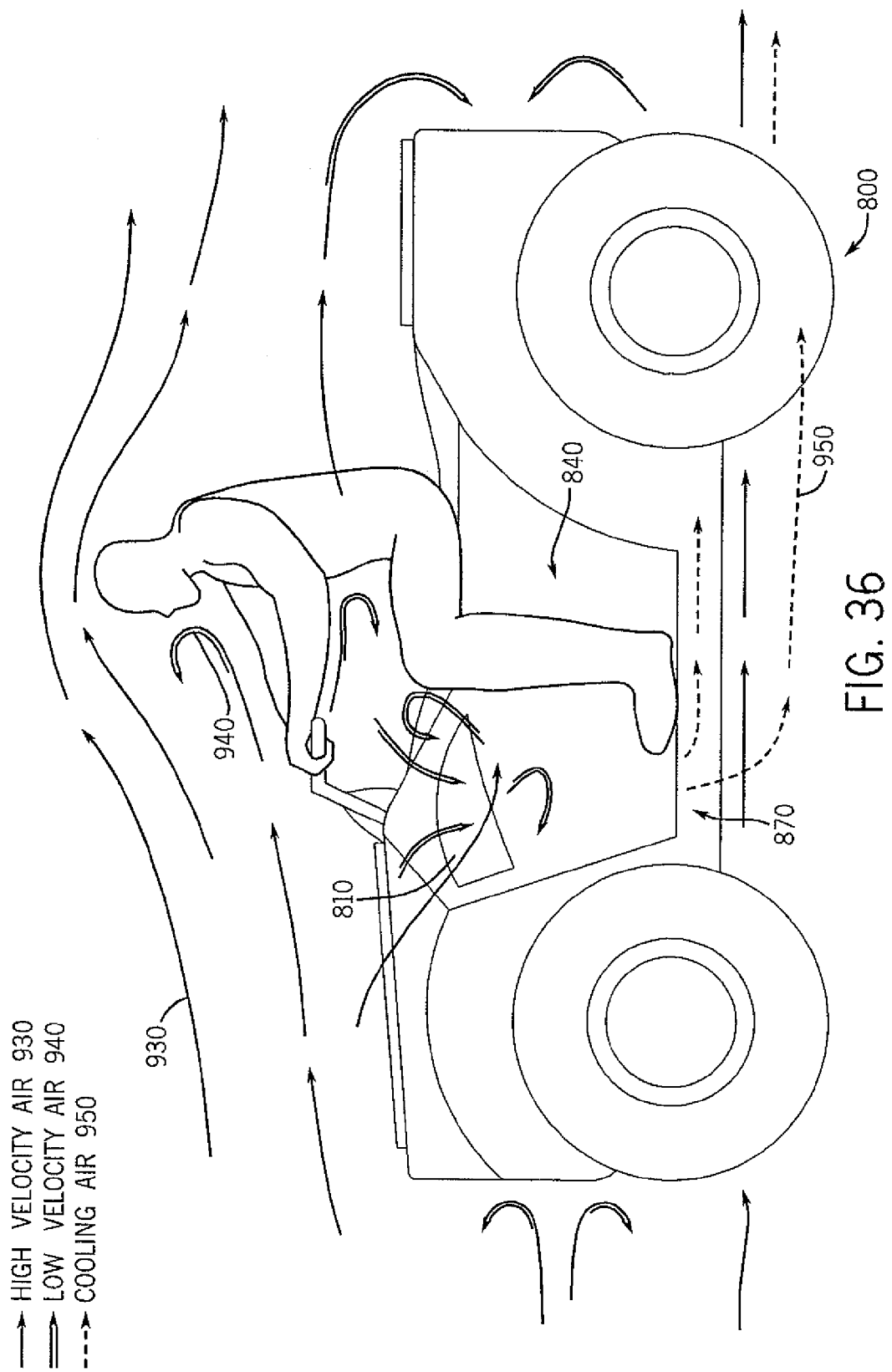

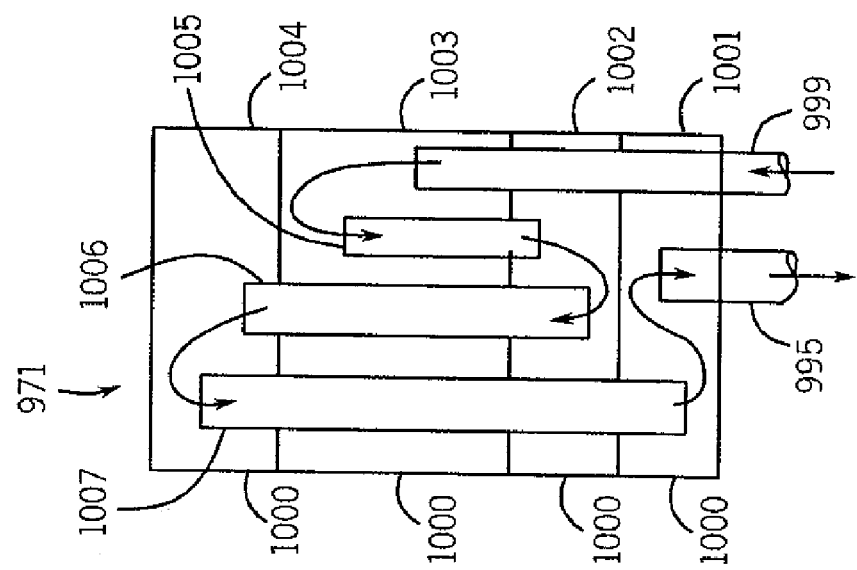
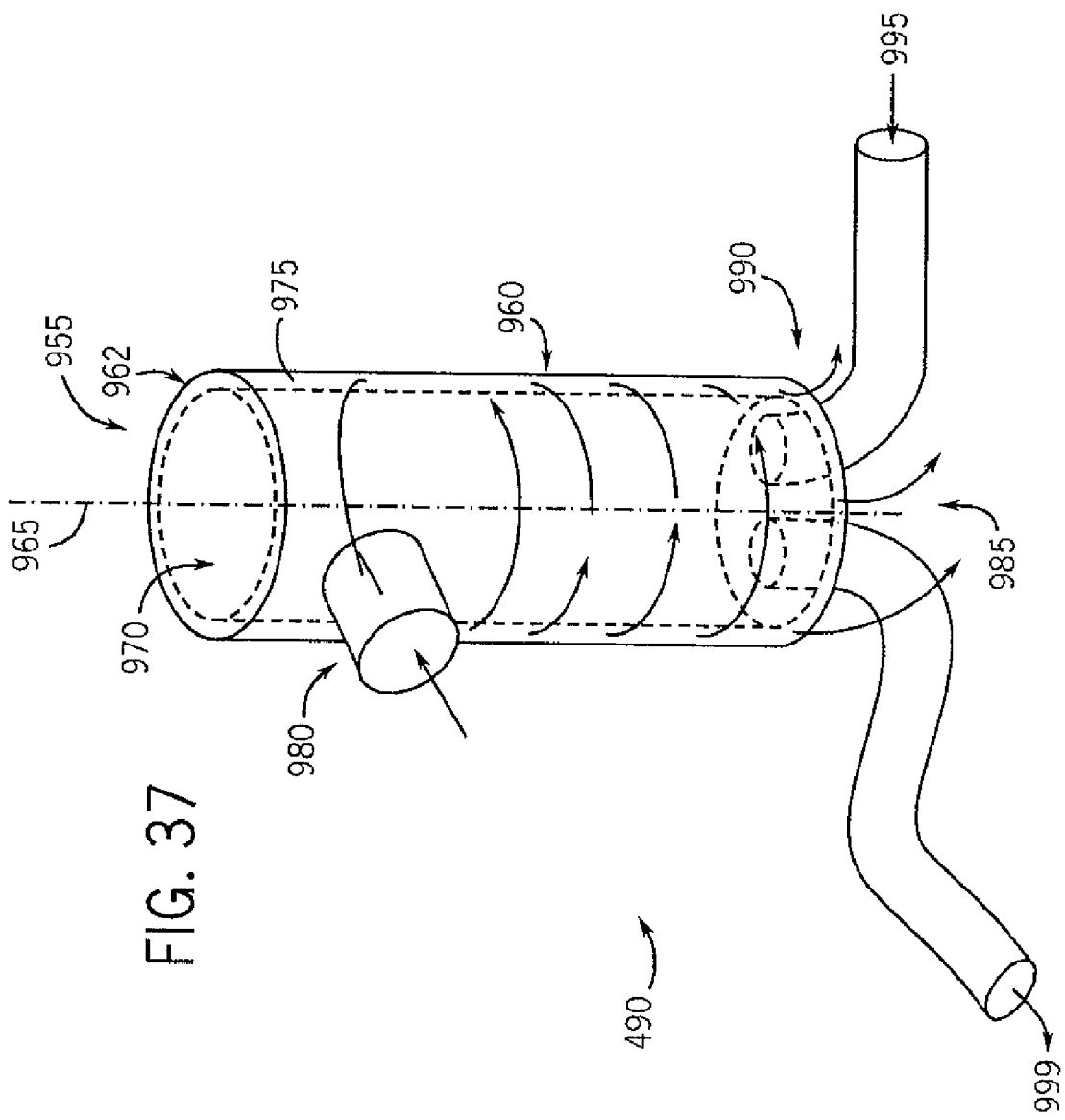

REDUCED-SIZE VEHICLE WITH COMPARTMENTS PROVIDING BUOYANCY

CROSS-REFERENCE TO RELATED APPLICATIONS

This application claims the benefit of U.S. provisional patent application No. 60/640,410 entitled "Improved Reduced-Size Vehicle" and filed on Dec. 30, 2004, which is hereby incorporated by reference herein.

STATEMENT REGARDING FEDERALLY SPONSORED RESEARCH OR DEVELOPMENT

FIELD OF THE INVENTION

This invention relates to reduced-size vehicles, particularly all-terrain vehicles ("ATVs") and various utility vehicles ("UVs").

BACKGROUND OF THE INVENTION

Reduced-size vehicles such as ATVs and UVs are becoming increasingly popular in North America and the world. Historically, ATVs can trace their origins to motorcycles. The ATV began as a motorcycle with two rear wheels, called an All-Terrain Cycle (ATC) and then, due to safety considerations, evolved to include a second front wheel so as to become the conventional four-wheeled ATV. As ATVs have further evolved over the past twenty years, many other aspects of the vehicles have also been improved. Many of the improvements have concerned the driving performance of the ATVs (both in terms of operation of the vehicles in a straight line and over rough terrain). For example, ATVs have become equipped with larger and more powerful engines, sophisticated automatic transmissions, and advanced differential technology. The suspension systems, likewise, have matured from rigid mounted wheels and tires to long-travel, fully independent suspension systems.

Conventional reduced-size vehicles offered by a variety of manufacturers share a number of features in common with one another. Because reduced-size vehicles (and particularly ATVs) originated as offshoots of motorcycle technology, such vehicles in particular share certain features that are similar to those of motorcycles. In particular, a conventional ATV typically employs an internal structural frame formed by a group of struts, tubes, castings, and/or stampings (and/or other elements) that extend substantially parallel to one another from near the front of the vehicle to near the rear of the vehicle, generally in close proximity to a central longitudinal axis of the vehicle. The arrangement of struts is such that the overall frame would conform to (e.g., would fit within) the physical confines of motorcycles having long, narrow bodies, even though reduced-size vehicles such as ATVs and UVs typically have bodies that are substantially wider than those of motorcycles. Although through the years there has been a focus on reducing the cost of the frame, there have been few major innovations in frame design beyond the standard motorcycle design. The frame is seen as the structure that carries the critical vehicle systems but delivers little if any additional value to the end user.

In addition to having motorcycle-type frames, conventional reduced-size vehicles also have other features that reflect their evolution from motorcycles, for example, in terms of their cooling systems and exhaust systems. With respect to their cooling systems, conventional reduced-size vehicles typically employ engine cooling systems in which air flow moves horizontally along the vehicles as the vehicles move forward. More specifically, such engine cooling systems (which can include, for example, radiators or heat exchangers), are typically positioned within front or rear sections of the vehicles relative to the mid-sections of the vehicles in which operators are seated during operation. When placed in the front section of a vehicle, as is more commonly the case, cooling air enters at the very front end of the vehicle and typically is then exhausted into the mid-section/operator space. When placed generally in the rear section behind the mid-section, as is less commonly the case, cooling air enters from the mid-section/operator space and then passes out the vehicle's rear end.

As for the exhaust systems of reduced-size vehicles, the traditional motorcycle-based design and packaging of an ATV exhaust system places the muffler (which is generally round and cylindrical) at the rear of the vehicle, typically in a generally horizontal manner, with the outlet near or at the rear of the vehicle, facing aft or downward. Certain factors influence the exact positioning of the exhaust system configuration and muffler. First, the exhaust system should be configured to function within the confined area that an ATV allows after placement of the engine, cooling system, transmission, drivetrain, intake system, and other critical systems. Second, because ATVs are often operated in water, it is desirable to locate the outlet of the muffler as high as possible so as to minimize water intrusion. Third, the muffler should have sufficient volume to allow for adequate performance while maintaining satisfactory sound dampening qualities. Fourth, the exhaust outlet should be positioned so that the exhaust air is not discharged directly onto a person who is working in close proximity to the vehicle. Lastly, the exhaust system should be as small as possible, so as to minimize radiated heat, and should be heat-shielded and placed sufficiently far away from any operator (e.g., laced under a rear fender).

As reduced-size vehicles have grown in their size, power and capabilities, it has been recognized that the vehicles are suitable for performing a variety of chores and tasks for which ordinary cars, trucks, and tractors are not well suited. To facilitate the performing of these functions by reduced-size vehicles, it has further become desirable to create dedicated carrying/storage features on the reduced-size vehicles. Yet, because the primary consideration in designing reduced-size vehicles traditionally has been to enhance the vehicles' driving performance, the interiors of reduced-size vehicles (e.g., the volumes defined by the outer perimeters of the vehicles) have been completely or nearly completely filled with the various engine, powertrain, suspension, cooling and other system components allowing for optimal performance of the vehicles. To the extent that certain spaces within the vehicle interiors have been reserved for storage purposes, such spaces have typically been very small, e.g., with a volume of only about 3 gallons or less. As a result, such spaces typically are sufficient only for transporting small items such as a pair of gloves, a tow strap, or an emergency tool kit. Further, these spaces often are inconvenient to use, for example, because the ports/doors are located at low or otherwise difficult-to-access locations (e.g., under the seat), or because the doors are at low levels and lack seals to prevent the entry of water into the spaces.

Although at least one manufacturer, Bombardier, has integrated a somewhat larger, 8 gallon storage compartment into the front end of at least one of its ATV models (e.g., the 1999 Traxter ATV), this storage compartment is still limited in size due to the frame of the ATV and due to the positioning of the front shock absorbers of the vehicle, and there is no comparable storage compartment in the rear of the ATV due to the movement of certain components from the front end of the vehicle to the rear end of the vehicle to provide sufficient space for the front storage compartment. Also, although at least one other manufacturer, Arctic Cat, has integrated a somewhat larger, 8-10 gallon storage compartment into the rear end of at least one of its ATV models, this storage compartment is still limited in size due to the configuration of the vehicle frame and the positioning of the rear shock absorbers, as well as difficult to access insofar as it only occupies a region that is below the cargo rack accessible from behind the vehicle. Further, the storage compartment is located substantially above the locations at which the shock absorbers are coupled to the frame of the vehicle, and loading of that compartment with items/materials can raise the vehicle's center of gravity.

Given the lack of large internal carrying/storage spaces within conventional ATVs, ATV manufacturers have developed alternative features to enhance the ability of ATVs to carry and move items and material. In particular, ATV manufacturers have added cargo racks to the tops of the fenders, first at the rear sections of the vehicles and subsequently at the front sections of the vehicles. Depending upon the embodiment, a rack can be located on top of the bodywork of a vehicle, or in the case of a carrying bed, on top of the rear tires of a vehicle. The inclusion of such cargo racks on ATVs is now the industry standard. Additionally, although items can be strapped/tied directly to such cargo racks, to further enhance the cargo capacity of ATVs, it also has become common to purchase aftermarket storage containers that fasten to the tops of the cargo racks. Also, various enhancements have been developed for facilitating the coupling of items to cargo racks, for example, Artic Cat's "Speed Rack" and Polaris' "Speed Lock." The use of such containers in combination with the cargo racks makes it possible to carry items/materials within enclosed compartments such that those items/materials are not exposed directly to the outside environment.

Although reduced-size vehicles with the above-described cargo rack and supplemental container features continue to increase in popularity, such conventional vehicles nevertheless have several limitations. First, the attachment of items/materials to the cargo racks is often challenging due to the need for additional ropes or cords or special clips to fasten the items. Second, in circumstances where containers are used, or otherwise large items are attached to the cargo racks, visibility can be reduced for the operators of the vehicles. Third, cargo carried on top of the racks can overload the vehicles and/or negatively impact the vehicles' centers of gravity, which in turn can impact the performance and safety of the vehicles. Indeed, this aspect is of particular significance to reduced-size vehicles in comparison with many other larger vehicles, both because reduced-size vehicles tend to be relatively light in terms of their weight, and also because reduced-size vehicles naturally tend to have a high center of gravity for other reasons—for example, because the vehicles typically are designed to have large amounts of ground clearance to clear obstacles while operating off-road, and because in such vehicles (particularly ATVs) the operator is seated upon the vehicle rather than within the vehicle. Consequently, the cargo racks/containers on reduced-size vehicles should be carefully loaded so as not to exceed the weight ratings of the vehicles.

Another limitation of conventional reduced-size vehicles is that the vehicles have little or no provision for floatation. ATVs in particular are frequently operated under conditions in which the vehicles need to ford bodies of water. During fording maneuvers, the depth of the water is not always known (e.g., if operating in an unfamiliar area). Consequently, it is not uncommon for an ATV to become submersed completely and ingest water into its engine and cease running, which is a significant inconvenience for the operator and can cause extensive damage to the engine. To prevent the above-described scenario, an ATV desirably would include sufficient displacement integrated into the vehicle to allow for vehicle floatation. Yet integrating sufficient displacement into an ATV for this purpose is difficult given the significant amount of displacement that is required. For example, typical ATVs weigh approximately 600 to 750 lbs without a rider, unladen. When a rider is positioned onto such an ATV, the ATV can approach as much as 950 lbs (e.g., supposing a 200 lb operator). Noting that the density of water is 8.34 lb/gal, an ATV needs to displace at least about 72 to 90 gallons of water to achieve buoyancy for the vehicle alone and potentially as much as about 114 gallons to obtain neutral buoyancy when laden with an operator (again supposing a 200 lb operator).

Conventional ATVs do include certain components that provide some buoyancy for the vehicles. Not only does the fuel tank in an ATV provide some buoyancy, but also virtually all ATVs employ the use of "high floatation oversize balloon tires" to provide buoyancy and, in some cases, pontoons or inflatable inner tubes can also be attached to the vehicles to provide additional buoyancy. None of these satisfactorily solves the buoyancy problem, however. The fuel tank only provides a limited amount of buoyancy, and the buoyancy that it provides varies depending upon how much it is filled with fuel. With respect to attaching pontoons/inner tubes to the ATVs, the use of such devices is undesirable for a variety of reasons including complications arising from the mounting/installation of those devices, negative effects on vehicle maneuverability when such devices are installed, and storage of the devices when not being used. As for the use of balloon tires, such tires on average only displace about 12 gallons of water each. Further, as the performance of ATVs is improved, there will continue to be an increased need for braking area, which will tend to drive up wheel size and reduce the available volume for the tires, which in turn will decrease the tires' overall contribution to buoyancy.

Even if one assumes that a typical ATV has four balloon tires, each displacing 12 gallons, and a typical fuel tank of 4 gallons (and no pontoons/inner tubes), and additionally that the remaining componentry/structure of a conventional ATV displaces an additional 20 gallons, such ATV will displace by way of these components only about 72 gallons of water or 600 pounds. Thus, noting the difference between the displaced weight of water and the typical weight of a conventional ATV, and given the density of water, a conventional ATV unladen (e.g., without any operator/passenger or additional carried weight) at best is barely buoyant and potentially falls short of neutral buoyancy by nearly 20 gallons. Further, with an operator on board, much less any additional weight, conventional ATVs will sink.

In addition to the aforementioned limitations relating to storage capacity and buoyancy, conventional reduced-size vehicles also are inadequate in terms of the manner in which the vehicles respond to accidents/impacts. More particularly, while the frames of conventional reduced-size vehicles are satisfactorily designed for the purpose of carrying the operator and the various internal vehicle systems, such conventional frames have not been designed with the aim of effectively dissipating energy if the vehicles hit immovable objects such as trees, or with the aim of reducing the effects of side impacts upon the vehicles. Further, because the struts/tubes, castings and stampings forming the frames of conventional reduced-size vehicles extend from the front ends to the rear ends of the vehicles in proximity to the central longitudinal axes of the vehicles, the frames are exposed to, and not particularly well-suited to resisting, extreme forces and torques that can be applied to the vehicles in certain accidents where the front ends of the vehicles tend to be twisted in directions contrary to those of the rear ends of the vehicles. In general, conventional frames have not been designed in a manner intended to enhance the crashworthiness of the reduced-size vehicles.

Further, the cooling systems of conventional reduced-size vehicles also have a number of drawbacks. With respect to conventional front-mounted cooling systems, for example, such systems are typically vulnerable to clogging in the off-road environment due to contact with mud, leaves, grass, snow, seeds, etc., and to the possibility of puncture from rocks & sticks. To the extent that extra guards are utilized to prevent puncture, these can exacerbate clogging events. Further, in such systems, the radiators exhaust heat into the mid-sections of the vehicles, which can undesirably heat up the seats and the surrounding bodywork and in some circumstances expose the vehicle operators (particularly the operators' legs) to undesirable heat. Additionally, when one such vehicle closely follows behind another such vehicle, the following vehicle can undesirably ingest dirty air expelled by the leading vehicle. As for conventional rear-mounted cooling systems, such systems are typically vulnerable to puncture and physical harm when the vehicles are driven in reverse. Such systems also can constrain suspension design and decrease vehicle system flexibility. To guarantee sufficient air flow, such systems often require large amounts of space within the vehicles to be dedicated to the communication of air for cooling and long coolant lines from the engine to the heat exchanger. Further, in contrast to the conventional front-mounted cooling systems, the rear-mounted cooling systems require fans to force air into the radiator, and hot air can "chimney" back to the operator if the cooling fan is not running.

The exhaust systems of conventional reduced-size vehicles also have several drawbacks. First, the horizontal placement of a muffler in such a vehicle, in conjunction with the positioning of the muffler above the power cylinder(s) of the engine of the vehicle, allows water that has entered the muffler to drain directly into the engine (a condition that can regularly occur when operating the ATV in deep water and mud). Second, the horizontal placement of the muffler maximizes the surface area by which heat is convectively transferred away from the muffler and onto the plastic fender that is commonly located above it, which can result in significant and possibly undesirable heating of the fender. Although some reduced-size vehicles include heat shields above their mufflers and/or highly reflective foil insulators on the bottom sides of the plastic fenders, the fenders and surrounding body work of such vehicles often still can become undesirably hot. Further, even to the extent that the heating of the fenders and bodywork of such vehicles is reduced, the header pipes connecting the engines of the vehicles to their mufflers typically are run high in the vehicles, just below the edges of the operator seats and horizontally along the vehicles, e.g., proximate where operators' legs are situated during vehicle operation.

In view of the above discussion, it therefore would be advantageous if new reduced-size vehicles could be designed that overcome one or more of the aforementioned limitations. In particular, it would be advantageous if a new reduced-size vehicle was developed that could have one or more large interior storage compartment(s) for carrying items/material, where those interior storage compartment(s) were easy to use and/or were positioned substantially below the top of the vehicle such that items/material contained within those compartments did not overly raise the center of gravity of the vehicle or reduce operator visibility. Further, it would be advantageous if such a new reduced-size vehicle included features that improved the buoyancy of the vehicle. Additionally, it would be advantageous if such a new reduced size vehicle included an improved frame design to improve the vehicle's behavior under at least some accident conditions. Further, it would be advantageous if such a new reduced-size vehicle included an improved cooling system arrangement and/or improved exhaust system arrangement to alleviate one or more of the above-discussed problems associated with conventional reduced-size vehicles.

SUMMARY OF THE INVENTION

The present inventors have recognized that conventional reduced-size vehicles can be modified and improved in a variety of ways so as to address one or more of the above-discussed drawbacks of conventional reduced-size vehicles. In particular, the present inventors have recognized that, by modifying the internal frames of such vehicles so that the struts/tubes, castings, and stampings of the frames are not overly concentrated along the central longitudinal axes of the vehicles, it can become possible in at least some embodiments for large unobstructed interior cavities to be created within the vehicles at their front and rear ends, allowing for large interior storage compartments to be provided within the vehicles. The inventors have further recognized that in at least some embodiments the creation of such interior cavities/storage compartments can be further facilitated by utilizing shock absorbers that are vertically-oriented (as viewed from both front elevation and side elevation views) rather than obliquely-oriented as they extend between the frame and the wheels/axles. The inventors have additionally recognized that, in at least some embodiments, the filling of such interior storage compartments with items/materials will tend not to raise the vehicles' centers of gravity (and rather will tend to lower it), and/or that such storage compartments in certain embodiments can greatly facilitate vehicle buoyancy. Additionally, the inventors have recognized that the use of such modified internal frames can in at least some embodiments improve the manner in which the vehicles perform during accidents and/or respond to impacts.

Further, the present inventors have recognized that the cooling and exhaust systems of conventional reduced-size vehicles can be modified to improve the vehicles' design and performance. In particular, the present inventors have recognized that, in at least some embodiments, the placement of cooling and/or exhaust system components primarily within the mid-sections of the vehicles rather than in the front or rear sections of the vehicles not only is possible but also can be advantageous for several reasons. For example, the placement of cooling and/or exhaust system components within the mid-section of a vehicle in at least some embodiments can free up space within the front and rear sections of the vehicle, space which can be allocated to other vehicle structures such as the interior cavities/storage compartments discussed above. Further, the placement of cooling system components in the mid-section of a vehicle in at least some embodiments can reduce the risks of clogging/puncture of the cooling system components and/or can reduce the length of coolant lines that are utilized in those systems. Additionally, with respect to the exhaust system, the muffler when placed in the mid-section of a vehicle can be vertically-oriented and configured to resist backflow of water from the exhaust pipe back into the engine, as well as positioned so as to reduce the possibility of undesirable excessive heat dissipation occurring in relation to other components of the vehicle.

In at least some embodiments, the present invention relates to a reduced-size vehicle having a front section, a mid-section and a rear section. The reduced-size vehicle includes a first compartment within the front section of the vehicle, a second compartment with the rear section of the vehicle, and a plurality of tires. Due to the first compartment, the second compartment and the tires the reduced-size vehicle floats in water at least under some operational circumstances.

Further, in at least some embodiments, each of the first and second compartments displaces at least 17 gallons of water. Additionally, in at least some embodiments, at least one of the first and second compartments includes an openable port.

In at least some embodiments, the present further relates to a method of operating a reduced-size vehicle. The method includes providing sealed compartments within fore and aft sections of the vehicle, driving the vehicle into a body of water, and floating the vehicle across the body of water.

BRIEF DESCRIPTION OF THE DRAWINGS

FIGS. 3, 4, 5 and 6 respectively are perspective (as viewed from a position adjacent a front left portion of the frame), top plan, front elevation and left side elevation views of an additional exemplary internal frame that is similar to that of FIG. 2, and which also could be employed in the vehicle of FIG. 1;

FIGS. 8(a) and 8(b) are perspective views of two alternate exemplary internal frames that could be employed in the vehicle of FIG. 1 in accordance with at least some alternate embodiments of the present invention;

FIGS. 26(a)-(b) illustrate two exemplary seals that can be employed in conjunction with the internal compartments and lids of FIGS. 21, 23, 24 and 25 allowing for those compartments to be both openable and watertight when closed;

FIG. 27 is a schematic top plan view of an exemplary floor portion of one of the internal compartments of FIGS. 10-16 and 18 in which the floor portion includes a drain/drain plug allowing the compartment to be drained;

FIGS. 28(a)-(c) respectively show an interior side cutaway portion of the front internal compartment of FIG. 18, a cross-sectional view of a hinge locating pocket formed along that side cutaway portion taken along line A-A of FIG. 28(a), and an alternate cross-sectional view of a threaded insert capable of being mounted along the side cutaway portion;

FIG. 36 illustrates exemplary air flow patterns around and through the reduced-size vehicle of FIGS. 31 and 32 when the vehicle is being driven forward by an operator;

FIG. 37 is a perspective view of an exemplary vertical muffler that could be implemented within the vehicle of FIG. 1 in accordance with some embodiments of the present invention, where the view shows inner compartments of the muffler and schematically indicates gas flow patterns within the muffler during operation;

FIG. 38 is a cross-sectional view of an exemplary muffler such as the vertical muffler of FIG. 37 where the muffler includes a plurality of inner chambers that serve to reduce the likelihood of liquid passing through the muffler from the exhaust outlet and back into the engine of the vehicle;

DETAILED DESCRIPTION OF THE INVENTION

Figure 1:
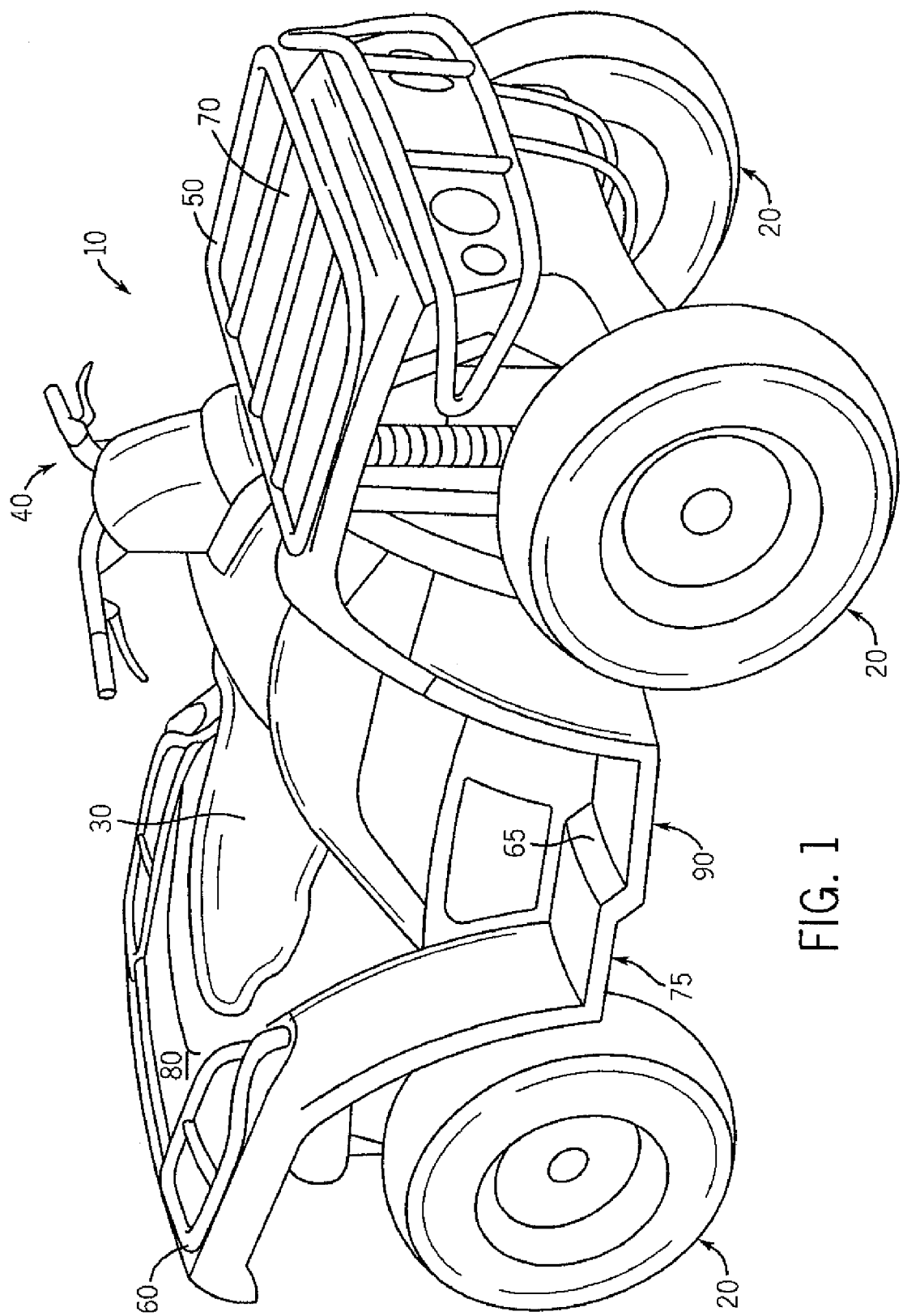
FIG. 1 is a perspective view of an exemplary reduced-size vehicle, in this example shown to be an ATV, in accordance with at least some embodiments of the present invention.

Referring to FIG. 1, a perspective view of an exemplary reduced-size vehicle in accordance with at least some embodiments of the present invention, namely, an exemplary all-terrain vehicle (ATV) 10, is shown. As illustrated, the ATV 10 has an exterior appearance that is similar to the appearances of conventional ATVs, e.g., the vehicle has four tires 20 (three of which are visible), a saddle-type seat 30, motorcycle-type handlebars 40 for steering the vehicle, and a largely box-like shape. The four tires 20 typically are balloon-type tires pressurized to up to 10 psi, albeit in other embodiments the tires need not be balloon tires or be pressurized to such degree, but rather could be other types of tires, for example, non-deflatable tires, or tires pressurized at other levels (or tires that included or operated in association with pumping devices such that the tires could be inflated or deflated to a variety of pressures).

Also, front and rear cargo racks/storage racks 50, 60, respectively, are attached to an outer surface 90 of the vehicle 10, particularly along upper surfaces of front and rear sections 70, 80 of the vehicle, respectively. In alternate embodiments, the cargo racks 50, 60 can be connected directly to a frame of the vehicle as discussed below with reference to FIG. 2 et seq. As will be described in further detail below, in accordance with at least some embodiments of the present invention, large internal cavities and/or large internal storage compartments are positioned within the vehicle 10 within the front and rear sections 70, 80 of the vehicle, underneath the cargo racks 50, 60. Further as shown, the ATV 10 has foot wells/foot rests 65 on either side of the vehicle between the front and rear tires.

Depending upon the embodiment, the relative extents of the front and rear sections 70, 80, as well as a mid-section 75 of the vehicle between the front and rear sections, can be understood in any of a variety of manners. In at least some embodiments, the mid-section 75 of the vehicle can be understood to extend from the frontmost surfaces of the rear tires to the rearmost surfaces of the front tires, with the front section 70 then being understood to extend from the rearmost surfaces of the front tires forward and the rear section 80 being understood to extend from the frontmost surfaces of the rear tires rearward. Also, in at least some embodiments, the mid-section 75 of the vehicle can be understood to be that section of the vehicle that is between the large internal cavities and/or storage compartments existing within the front and rear sections of the vehicle. Further, in at least some embodiments, the front section 70 of the vehicle can be understood to be the section of the vehicle that is in front of the seat 30 or the handlebars 40 (e.g., from a frontmost or rearmost extent of the handlebars forward), the rear section 80 of the vehicle can be understood to be the section of the vehicle that is behind an operator (e.g., a first person controlling the vehicle rather than any passenger positioned behind that first person) or behind a rearmost portion of the foot wells 65, and the mid-section 75 can be understood as being the section of the vehicle between the front and rear sections.

Additionally, in at least some embodiments, the front section 70 can be understood as that portion of the vehicle that is forward of the front axle of the vehicle, the rear section 80 can be understood as that portion of the vehicle that is rearward of the rear axle of the vehicle, and the mid-section 75 can be understood as the portion of the vehicle in between those axles. In at least some further embodiments, the mid-section can be understood as the portion of the vehicle between the foot wells 65, under the seat 30 (or under the operator), and or between the racks. In at least some additional embodiments, the front, rear and mid-sections of the vehicle can be sections that correspond to particular portions of a frame supporting the vehicle (e.g., front, rear and middle portions of frames that are discussed in more detail below). In still additional embodiments, the extents of the front, rear and mid-sections can be understood in still additional manners, including manners that involve different combinations of the above-discussed considerations (for example, the mid-section 75 could also be understood as extending from just in front of the handlebars to the frontmost surfaces of the rear tires or to the rear axle).

While FIG. 1 shows the ATV 10, the present invention is intended to be applicable to a wide variety of different types of reduced-size vehicles including not only ATVs, but also various types of utility vehicles (UVs) and other similar vehicles (e.g., in-airport personnel transporters and the like)

that are intended to provide mobility, rapid speed (e.g., greater than 14.4 miles per hour), and/or carrying capacity, and/or towing capacity for people and/or items/materials. At the same time, reduced-size vehicles as discussed herein are not intended to encompass machines that perform specific specialized functions upon the environment over which they are traversing such as, for example, operator-ridable lawn mowers or snow-blowers, bulldozers, excavators or forklifts (albeit the present invention is intended to encompass reduced-size vehicles that tow trailers that potentially have capabilities of these types), nor are reduced-size vehicles intended to encompass small, plastic-framed, electric-powered children's toys or low-speed (e.g., less than 14.4 miles per hour) golf carts. To the extent that the present invention relates in particular to ATVs, the term ATV as used herein can encompass any of a variety of vehicles that fit into conventional definitions of ATVs as are known in the art, for example, vehicles that generally have a 48 inch width or less. Utility vehicles can include, for example, commercial utility vehicles and recreational utility vehicles. The present invention is applicable to vehicles having four wheels (e.g., two front wheels and two rear wheels) and also other wheel arrangements. For example, the present invention is also applicable to reduced-size vehicles having six wheels (e.g., two wheels in front, and four wheels in back).

Depending upon the embodiment, the present invention is intended to encompass reduced-size vehicles of any of these types (e.g., not merely ATVs such as the ATV 10), where the vehicles include any one or more of the features described in detail above and below. The present invention is also intended to encompass variations and/or combinations of the features described below as would be evident to those having ordinary skill in the art.

Reduced-Size Vehicle Having Improved Frame Design

Figure 2:
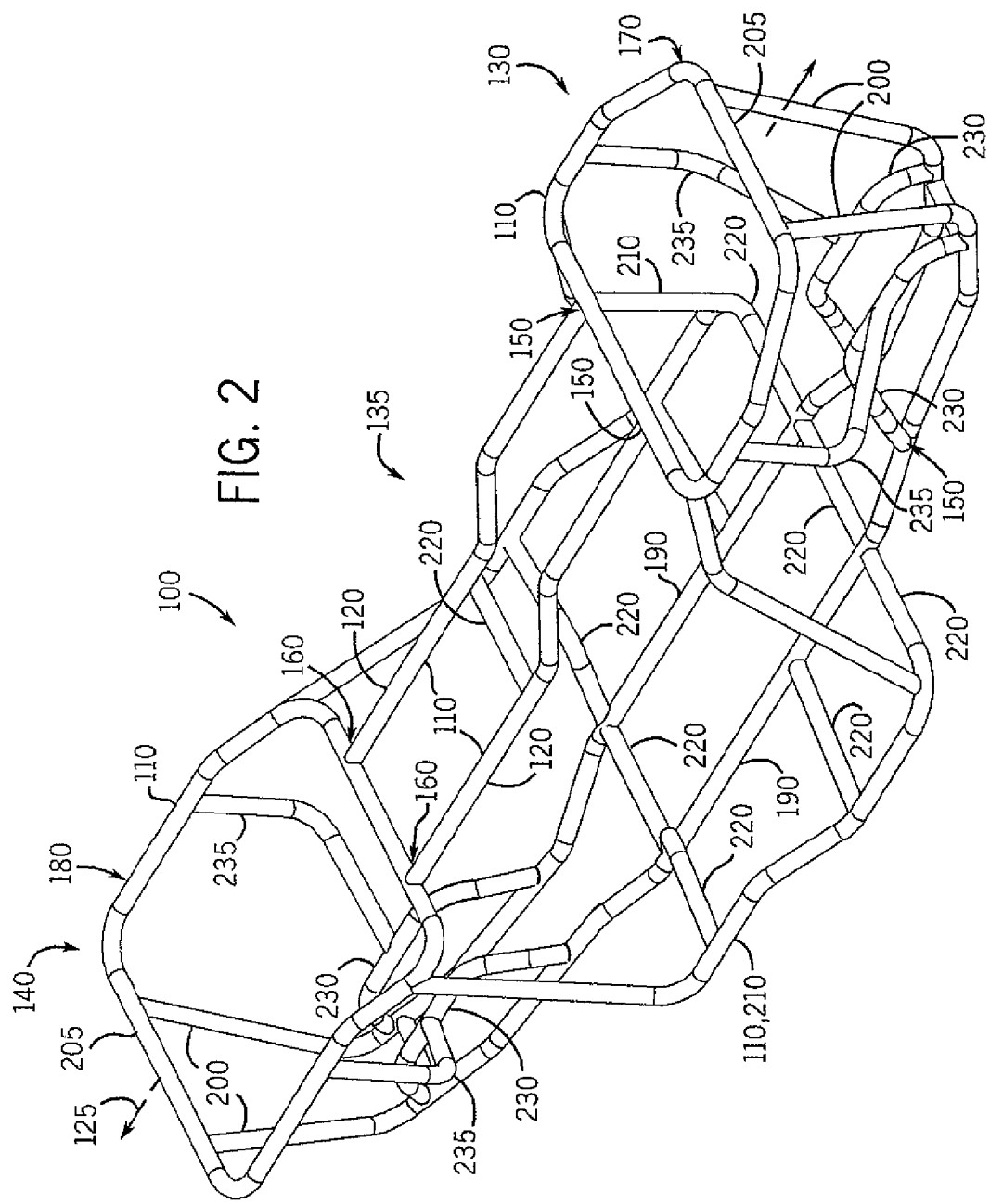
FIG. 2 is a perspective view of an exemplary internal frame that could be employed in the vehicle of FIG. 1 (as viewed from a position adjacent a front right portion of the frame) in accordance with at least some embodiments of the present invention.

Referring to FIG. 2, an exemplary embodiment of a frame 100 that can be implemented into reduced-size vehicles such as the ATV 10 of FIG. 1 is shown in a perspective view. Additionally, referring to FIGS. 3-6, a slightly modified version of the frame 100, shown as a frame 100', is shown in a perspective view (FIG. 3), a top plan view (FIG. 4), a front elevation view (FIG. 5) and a left side elevation view (FIG. 6). In the embodiments of FIGS. 2-6, the frames 100, 100' include multiple struts (or tubes/bars/rods) 110 that are coupled to one another (e.g., bolted together or welded together in the case of metallic struts) or formed integrally with one another. As is evident from a comparison of the frames 100, 100' shown in FIGS. 2-6 and the ATV 10 shown in FIG. 1, the frames 100, 100' generally have outer perimeters that largely conform to the outer perimeter or "silhouette" of the vehicle, particularly along the vehicle's ends and sides.

With respect to each of the frames 100, 100', the struts 110 in particular include a pair of upper primary struts 120 that extend in a direction that is generally parallel to a central axis 125 extending from a front portion 130 of the respective frame (see FIG. 2 in particular for the central axis) toward a rear portion 140 of the respective frame. The upper primary struts 120, which run side-by-side to one another in an approximately parallel manner, are spaced quite closely to one another such that the saddle-type seat 30 can be fit about those struts, and consequently the primary struts 120 resemble corresponding struts of a conventional motorcycle-type frame as is employed in many conventional ATVs. However, in contrast to conventional frame designs, the upper primary struts 120 do not extend the full length (or close to the full length) of the ATV 10 but rather extend only about half of the length of the vehicle (or less), within a middle portion 135 of the frame. The front and rear ends 150 and 160, respectively, of the upper primary struts 120 are connected to front and rear loop struts 170 and 180, respectively, of the respective frames 100, 100'. As discussed in greater detail below, these loop struts 170, 180 help to define large interior cavities or spaces within which can be situated large internal compartments or chambers (see FIG. 10).

Also included within each of the frames 100, 100' are a pair of lower primary struts 190. The lower primary struts 190 extend generally along a bottom portion of the respective frames 100, 100', in a manner that is largely parallel to the upper primary struts 120 and to the central axis 125 along much of the lengths of the struts 190. However, in contrast to the upper primary struts 120, the lower primary struts 190 run the full length of the respective frames 100, 100' through each of the front portion 130, middle portion 135 and rear portion 140 (and substantially the full length of the vehicle). Proximate the ends of the respective frames 100, 100', the lower primary struts 190 include upwardly directed portions 200 that slope upward and attach to end portions 205 of the front and rear loop struts 170, 180.

In addition to the lower primary struts 190, the frames 100, 100' further each include side struts 210 that generally extend outward and downward from the left and right sides of the front loop strut 170 and then back inward and upward to the rear loop strut 180. In at least some embodiments, the side struts 210 are positioned under, and help to define, footrests of the reduced-size vehicle. Auxiliary struts 220 further link the side struts 210 with the lower primary struts 190, which themselves are also coupled to one another by way of the auxiliary struts 220. Another one of the auxiliary struts 220 similarly connects the two upper primary struts 120 with one another. Further, as shown, the frames 100, 100' also each include four horizontal support struts 230, two of which are coupled to the lower primary struts 190 at the respective front portions 130 of the respective frames 100, 100' and two of which are coupled to the lower primary struts at the respective rear portions 140 of the respective frames. Further, four more vertical support struts 235 link the front and rear loop struts 170, 180 to the respective horizontal support struts 230.

While nearly identical, the frames 100 and 100' of FIG. 2 and FIGS. 3-6, respectively, differ in two minor respects. First, the frame 100' of FIGS. 3-6 includes an X-brace 213 coupling the upper primary struts 120 and the horizontal support struts 230 in the rear of the vehicle. The X-brace 213 serves to further strengthen the frame 100' longitudinally, laterally, and vertically (e.g., in terms of the relative positioning of the upper primary struts 120 relative to the lower primary struts 190 to which the rear horizontal support struts 230 are coupled). In addition to the X-brace, the frame 100' also differs from the frame 100 insofar as each of the side struts 210 of the frame 100' include first and second outward bends 214 (see in particular FIG. 4) such that the side struts 210 along most of their length are positioned farther from the central axis of the vehicle/frame than the side struts of the frame 100 (due to this difference, while for simplicity the side struts and auxiliary struts are respectively labeled with numerals 210 and 220 in each of FIGS. 2-6, it would be appropriate to label the side struts and at least some of the auxiliary struts of the frame 100' with different numerals than the side struts and the corresponding auxiliary struts of the frame 100). Thus, while each of the frames 100, 100' can each be employed in the vehicle of FIG. 1, the frames 100, 100' also could be used in slightly different vehicles having slightly different outer contours, particularly in terms of their footrests.

The particular arrangement of struts 110 of the frames 100, 100' shown in FIGS. 2-6 can be varied depending upon the embodiment. For example, in some alternate embodiments, the lower primary struts 190 can also be a series of struts that connect various ones of the auxiliary struts 220 to one another rather than long struts to which the auxiliary struts are connected. Also for example, the side struts 210 could be long struts that bend upward to connect to the rear (or front) loop strut 180 but do not bend upward to connect to the front (or rear) loop strut 170, and instead bend inward to connect to the lower primary struts 190 (e.g., taking the place of the frontmost side struts 220 shown in FIGS. 2-6). In such case, additional auxiliary struts could be used to connect the side struts to the front (or rear) loop strut 170.

The frames 100, 100' shown in FIGS. 2-6 are advantageous in comparison with the frames of conventional ATVs in a number of manners. First, as mentioned above and discussed in greater detail below, the frames 100, 100' make it possible for large internal compartments to be positioned within the ATV both within its front and rear sections 70 and 80, respectively, along its front and rear ends. Second, as illustrated in additional FIG. 7, in the event of an accident in which the ATV 10 impacts a substantially stationary object such as a tree or pole (e.g., as represented by a pole 245) head-on, the front loop strut 170 bears the brunt of the impact and dissipates substantial amounts of the energy of the impact such that an operator situated on the ATV does not experience as much of the force associated with the impact as might be the case with ATVs of conventional design. That is, the front loop strut 170 constitutes a deformable structure that can collapse during impact.

Figure 7:
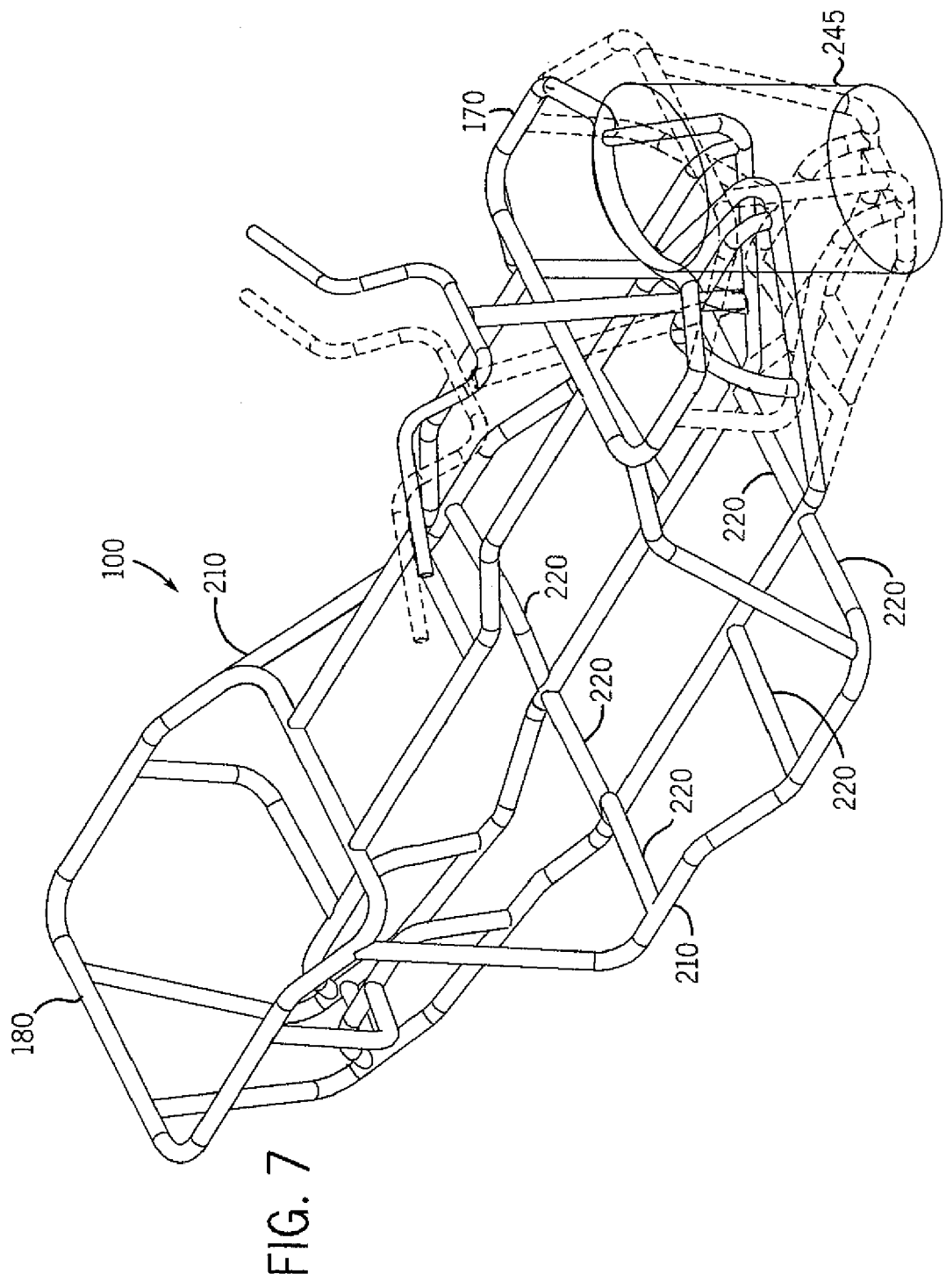
FIG. 7 is an additional perspective view illustrating how the exemplary internal frame of FIGS. 2-6 could deform in the event of a head-on collision of the vehicle of FIG. 1 with a substantially immovable object (at least in some circumstances)

Further, because the front loop strut 170 extends all of the way around the large internal cavity defined (at least in part) by the loop strut, the loop strut also helps to protect anything that happens to be stored/contained within any compartment situated within that cavity. Although not shown in FIG. 7, similar protective and energy dissipative benefits are provided by the rear loop strut 180 in the event of a rear collision and by the side struts 210 (and the auxiliary struts 220 as well) in the case of a side impact. Additionally, it will be understood that while FIG. 7 shows in particular an impact being experienced by the frame 100 of FIG. 2, the above discussion is equally applicable with respect to the frame 100' of FIGS. 3-6.

Further, the frames 100, 100' are also advantageous insofar as, because the primary struts 120 do not extend the entire length of the ATV as in many conventional designs, the damage caused by the ATV 10 upon external objects with which the ATV might collide during an accident is reduced. That is, in at least some circumstances, the frames 100, 100' do not tend to "pierce" external objects with the upper primary struts 230 in the event of a collision, but rather merely "bump into" such external objects with the front or rear loop struts 170, 180. Additionally, because the side struts 210 assist the primary struts 120,190 in maintaining the relative positions of the front and rear portions 130,140 of the frames 100, 100', the frames are better able to resist/tolerate torques that are placed upon the respective frames during impacts or during other operational stresses in which the front portion 130 of a given frame tends to be rotated in a direction opposite to that of the rear portion (e.g., about the axis 125) of that frame. Torques/forces are run through the foot wells of the ATV 10 along its sides (via the side struts 210) rather than merely along the saddle-type seat 30 of the ATV and corresponding primary struts 120, 190. The auxiliary struts 220 also assist in maintaining the relative positioning of the primary struts 120, 190 and side struts 210.

Turning to FIGS. 8(a) and 8(b), alternate embodiments of the vehicle frames 100, 100' are shown as frames 240 and 290, respectively. With respect to the frame 240 shown in FIG. 8(a), that frame is similar to the frame 100 except insofar as the end portions 205 of the front and rear loop struts 170 and 180 are missing from those loop struts, such that the loop struts instead become front and rear c-brackets 250 and 260, respectively. Further, insofar as the end portions 205 are missing, the lower primary struts 190 of the frame 100 are replaced with lower primary struts 270 that, instead of extending to end portions of the loop struts, extend only to inner portions 265 of the c-brackets 250, 260. That is, the primary struts 270 extend to about the same locations on the c-brackets 250, 260 as the locations at which the primary struts 120 connect to those c-brackets.

Also as shown in FIG. 8(a), the c-brackets 250, 260 each have pairs of arms 275 that extend forward and rearward, respectively, up to four end points 280. The endpoints 280 are locations at which shock absorbers of the suspension system of the ATV can attach to and support the frame 240, as discussed further below. Thus, the frame 240 of FIG. 8(a) differs from the frame 100 of FIG. 2 in that the frame 240 includes end (e.g., front and rear) portions that only extend so far as is necessary to provide coupling locations for the shock absorbers.

As for the embodiment of FIG. 8(b), the frame 290 is similar to the frame 240 insofar as it includes front and rear c-brackets 300 and 310, respectively. However, in contrast to the frame 240, the frame 290 only includes a single upper primary strut 320 that links the front and rear c-brackets 300 and 310. Additionally, the lower primary struts 270 of the frame 240 are replaced with short struts 330 that, instead of extending upward to the c-brackets 300 and 310, merely extend up to auxiliary struts 340, which extend sideways across the frame between side struts 350 (which correspond to the side struts 210). Rather than having both the lower primary struts 270 and the side struts 210 both be coupled to the c-brackets as in the frame 240, only the side struts 210 are coupled to the c-brackets 300 and 310.

The frames 240 and 290 of FIGS. 8(a) and 8(b), although different in some respects from the frame 100 of FIGS. 2-7 and from one another, nevertheless offer some of the same advantages as the frame 100 as discussed above. In particular, the c-brackets 250, 260, 300 and 310 define (at least partly) large cavities within which can be situated large internal compartments/containers in much the same manner as the loop struts 170,180 of the frame 100 help to define cavities within which such compartments can be situated. The side struts 210 and 350 of the frames 240 and 290 also help to improve the robustness of the overall frame, both in terms of counteracting torques experienced by the frame (e.g., torques that would tend to rotate the front portion of the frame in an opposite direction to that of the rear portion of the frame) and in the case of accidents involving side impacts.

Although the c-brackets 250, 260, 300 and 310 do not constitute loop struts that extend all of the way to the ends of the ATV 10, the c-brackets can be designed to interface with additional brackets formed of plastic or other materials such that the c-brackets together with the additional brackets from complete loops (corresponding to the front and rear loop struts 170,180) that substantially extend to the front and rear ends of the ATV and help to define the internal cavities within which are provided internal compartments. These additional brackets can be formed from sufficiently robust, resilient, plastic materials that the brackets provide some of the same energy dissipative and other benefits at the front and rear ends of the ATV as are provided by the loop struts 170, 180. Thus, for an ATV employing such additional brackets, the consequences of an impact with an external object upon the ATV will be reduced in comparison with the consequences of the same impact upon a conventional ATV. Also by comparison with the frame 100, the frames 240 and 290 offer some weight reduction insofar as fewer and/or shorter metallic struts are required. Further, like the frame 100, the frames 240 and 290 generally require a reduced amount of material as well as a reduced amount of assembly (e.g., a reduced amount of welding) in comparison with conventional frames, and also provide more design freedom with the frame incorporating additional features such as additional fuel capacity.

Figure 9A:
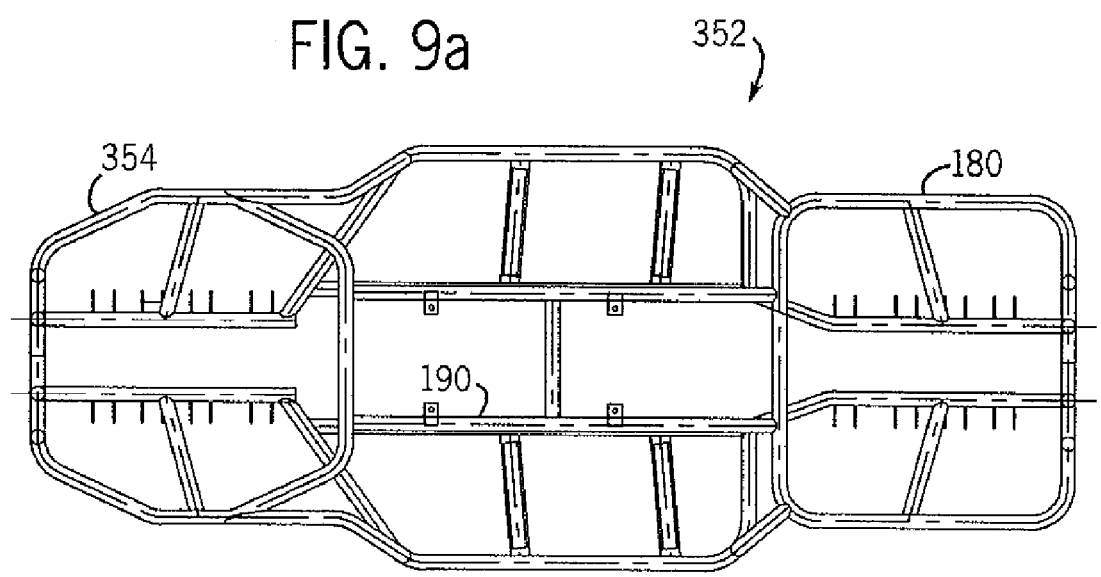
FIGS. 9(a) and 9(b) are top plan and left side elevation views of an additional alternate exemplary internal frame that could be employed in the vehicle of FIG. 1 (or a similar vehicle) in accordance with at least some alternate embodiments of the present invention.
Figure 9B:
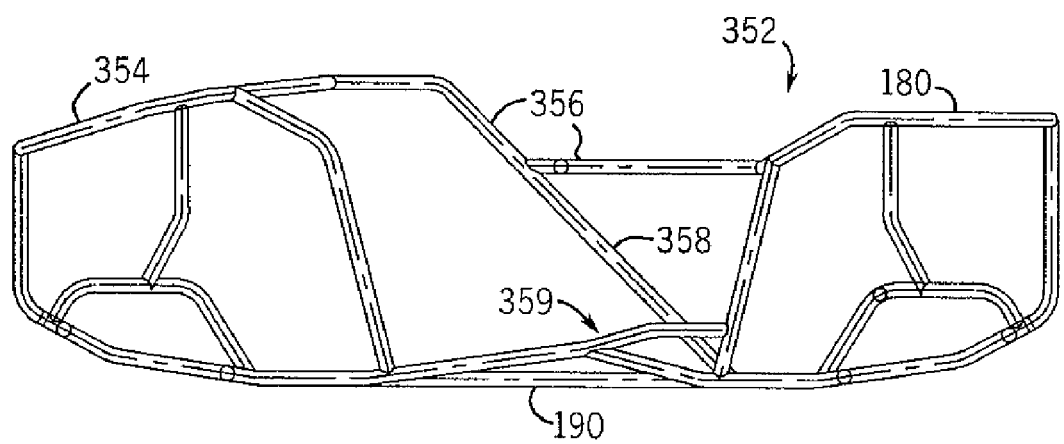

Turning to FIGS. 9(a) and 9(b) an additional exemplary frame 352 that can be employed in reduced-size vehicles such as the vehicle 10 of FIG. 1 is shown. The frame 352, as with the frames 100' and 100" discussed above, is highly similar to the frame 100 of FIG. 2, albeit the frame 352 differs from the frame 100 in certain respects. First, as is evident from the top plan view of the frame 352 shown in FIG. 9(a), a front loop strut 354 of the frame 350 differs from the front loop strut 170 of the frame 100 insofar as the front loop strut 354 is substantially octagonal in shape rather than hexagonal in shape. The octagonal shape of the loop strut 354 can help to accommodate various other vehicle components (e.g., as steering components). Also as shown particularly in the right side elevation view provided by FIG. 9(b), front loop strut 354 is inclined relative to a central axis of the vehicle (e.g., an axis corresponding to the central axis 125 of FIG. 2), sloping upward from the front end to the mid-section of the vehicle. Such inclination of the front loop strut 354 can be desirable for various reasons including, for example, to improve the aerodynamics of the vehicle.

Further as shown particularly in FIG. 9(b), upper primary struts 356 not only extend between the front loop strut 354 and the rear loop strut 180, but also include (or are coupled to) additional diagonally-extending struts 358 that extend from the front loop strut 354 to the lower primary struts 190. The additional diagonally-extending struts 358 serve to strengthen the frame 352 both longitudinally and laterally (e.g., to at least some extent in the same manner as the X-brace 213 discussed above with respect to FIGS. 3-6). Additionally, as shown particularly in FIG. 9(b), the frame 352 includes additional strut portions 359 along its sides that serve to provide further support under the foot wells/foot rests of the vehicle, and to accommodate exhaust outlets of the vehicle.

Although FIGS. 2 through 9 show several exemplary embodiments of frames for reduced-size vehicles in accordance with some embodiments of the present invention, these embodiments are not intended to be exhaustive of all frames that come within the scope of the present invention. For example, while the above-described embodiments of frames all include one or more upper primary struts extending between looping struts and/or c-brackets, in at least some embodiments the upper primary struts can be eliminated. Further for example, in some frames intended for implementation within UVs in which conventional bench or "captain's chair" seating is desirable (rather than saddle-type seating), the upper primary struts can be entirely eliminated, and the structural support provided by such upper primary struts can be alternately achieved by way of a roll cage or reinforcement of other frame components (e.g., the lower primary struts).

Large Internal Compartments

Figure 10:
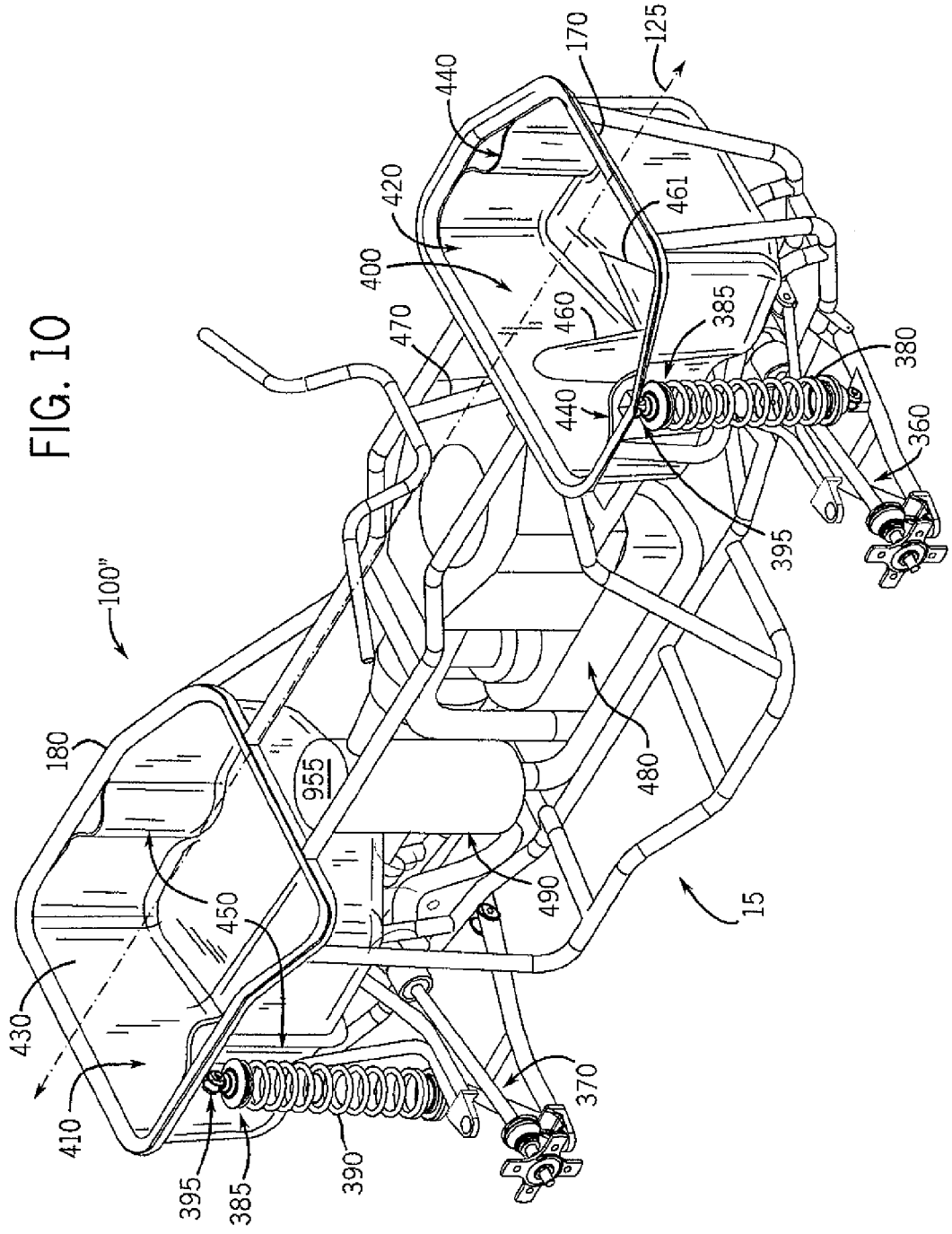
FIGS. 10 and 13 are perspective views of exemplary internal components of the vehicle of FIG. 1 (as viewed from positions adjacent a front right portion and a front left portion of the vehicle, respectively) including a slightly modified version of the exemplary internal frame of FIGS. 3-6, front and rear internal compartments within the vehicle, and various components of other vehicle systems.
Figure 11:
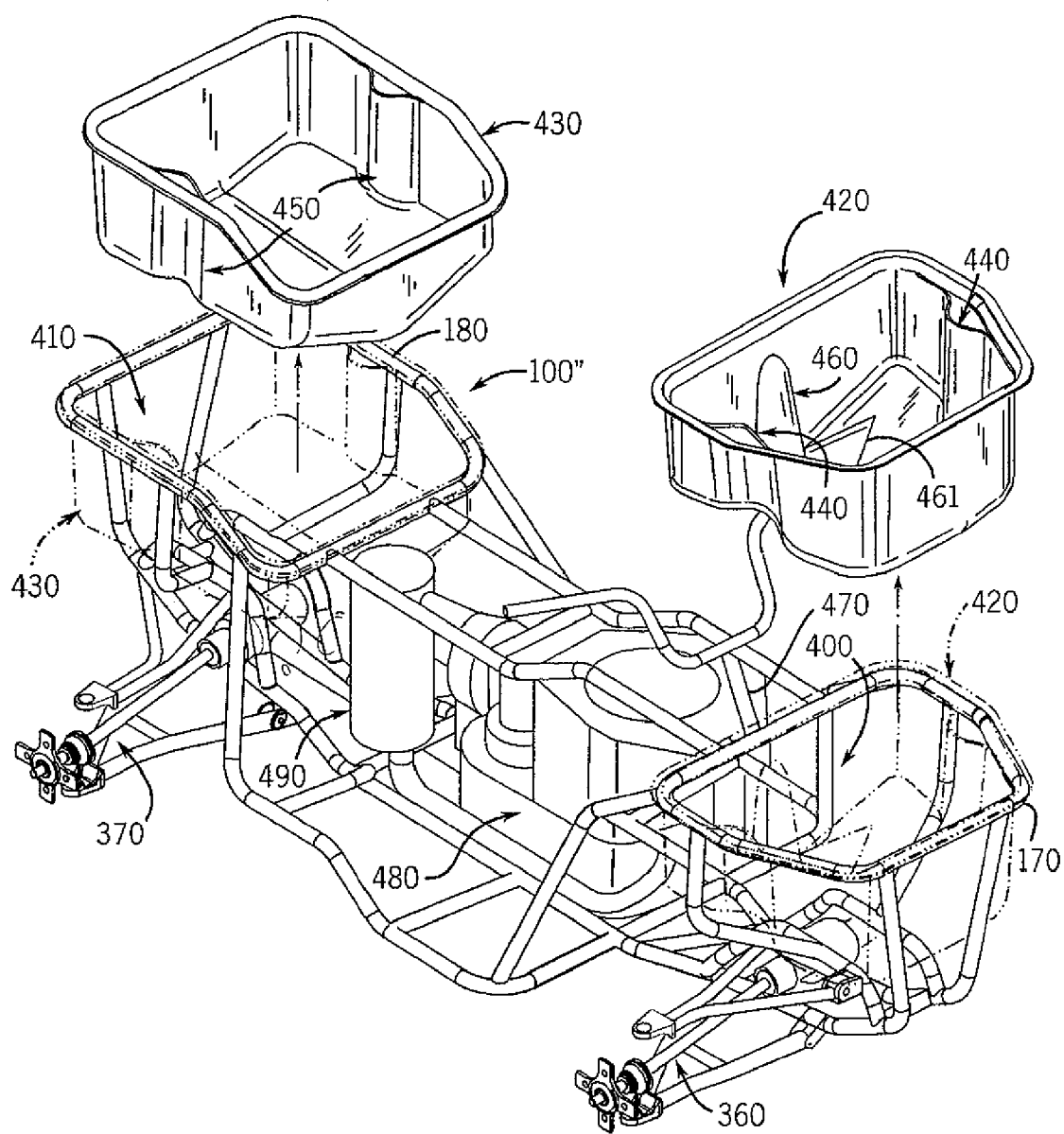
FIG. 11 is the same perspective view as provided in FIG. 10, except insofar as certain of the suspension system components of the vehicle have been removed and insofar as the internal compartments of the vehicle are shown both when installed and when removed from the vehicle.
Figure 12:
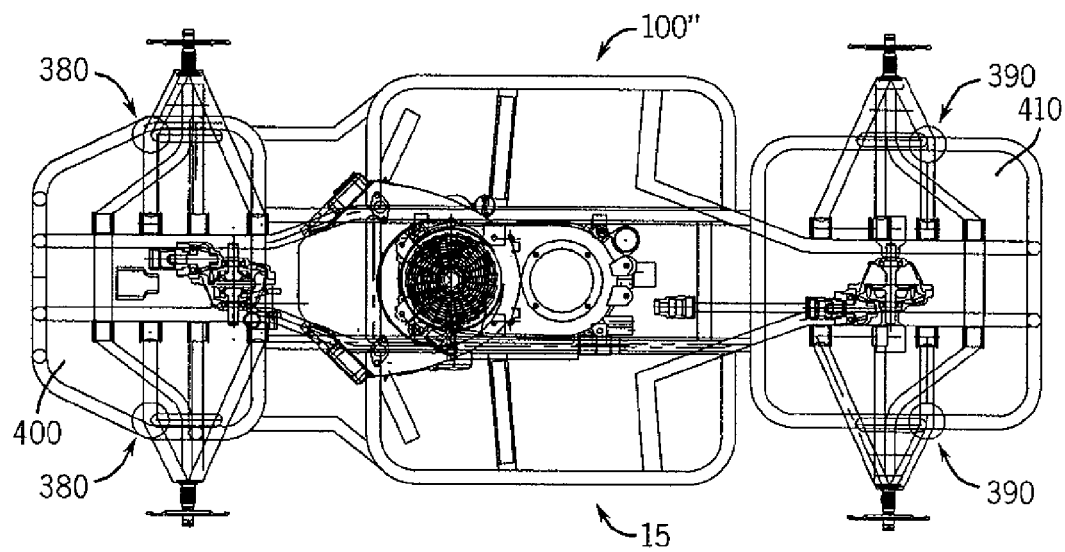
FIGS. 12, 14 and 15 respectively are top plan, front elevation and side elevation views of the internal components shown in FIG. 10.
Figure 13:
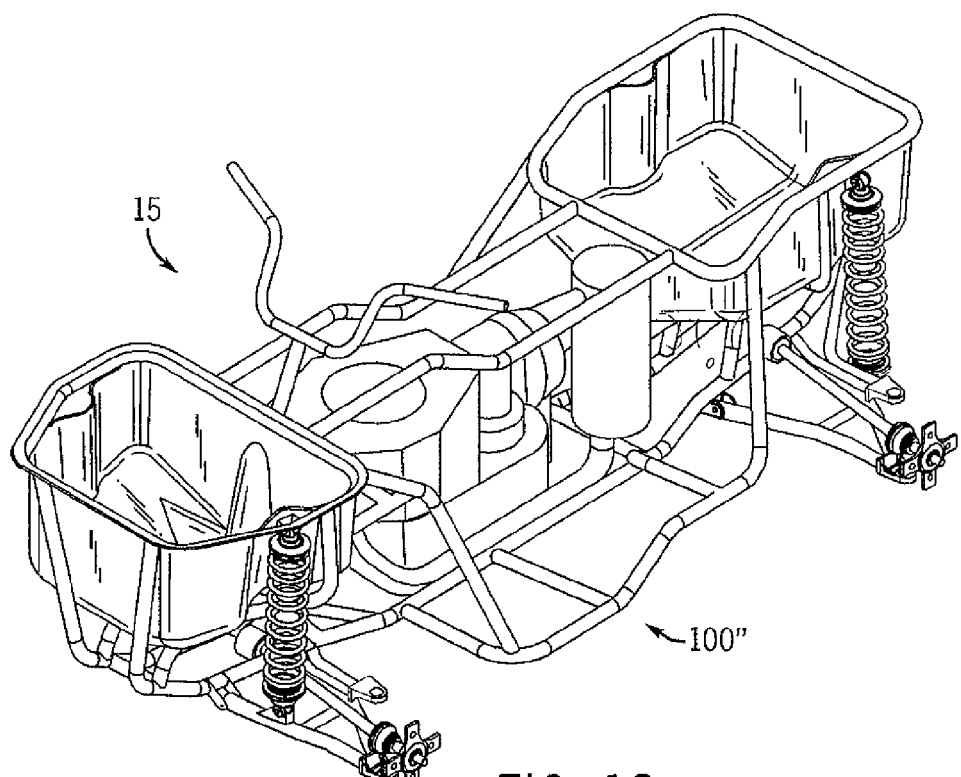

Turning to FIGS. 10-15, exemplary internal components 15 of the ATV 10 are shown in more detail. More particularly, the internal components 15 shown in FIGS. 10-15 include a slightly modified version of the frame 100' shown in FIGS. 3-6, referred to as a frame 100", along with various additional components associated with other vehicle systems. The frame 100" of FIGS. 3-6 in particular differs from the frame 100' insofar as the frame 100" lacks the X-brace 213 of the frame 100'. As for the additional components, among these additional components are vehicle suspension components, which include front and rear axles 360 and 370, respectively, as well as pairs of front and rear shock absorbers 380 and 390 (only one of each is shown in FIG. 10). FIGS. 10 and 13 respectively provide right and left front perspective views of the internal components 15, respectively, while FIGS. 12, 14 and 15 respectively provide a top plan view, a front elevation view and a left side elevation view of the internal components, respectively. FIG. 11 provides an additional right front perspective view that, while similar to that of FIG. 10, shows only some of the internal components 15 shown in FIG. 10.

As shown in FIGS. 10 and 12-15, in accordance with at least some embodiments of the present invention, the shock absorbers 380, 390 of the ATV are vertically-oriented (or at least substantially vertically orientated). This is in contrast to many conventional designs of ATVs in which the shock absorbers are positioned in an inclined manner such that the shock absorbers extend downward and outward away from the points along the frame to which they are attached toward outer points along the axles (e.g., toward the wheels of the vehicle), and/or in an oblique manner within a plane that is parallel to the central axis of the vehicle (e.g., an axis such as the axis 125 of FIG. 2). Although FIGS. 10 and 12-15 show the vertically-oriented shock absorbers 380, 390, in other embodiments of the present invention, the shock absorbers can be positioned in other manners. For example, the shock absorbers could be inclined within planes that were vertical (or substantially vertical) and parallel (or substantially parallel) to the central axis 125, such that the shock absorbers did not extend outward away from the frame along the axles but did extend in an inclined manner within those planes. In such embodiments, the right rear and right front shock absorbers could be positioned within/along the same substantially vertical, parallel plane, or within/along two different planes, and the same is true with respect to the left rear and left front shock absorbers.

As shown in FIG. 10, tops 385 of the shock absorbers 380,390 are attached to portions of the frame 100" that are situated substantially away from the center of the vehicle, e.g., to middle locations along side sections 395 of the front and rear loop struts 170 and 180. The implementation of the shock absorbers 380, 390 in a vertical (or substantially vertical) manner as shown in FIG. 10 is complementary in relation to the implementation of the front and rear loop struts 170, 180, since the orientation of the shock absorbers makes it possible to attach those shock absorbers to the frame 100" even though the side sections 395 of the loop struts 170,180 to which the shock absorbers are coupled are positioned outward away from the central axis 125 of the frame significantly farther than the primary struts 120,190. This is also possibly the case in appropriate alternate embodiments, such as those discussed above in which the shock absorbers are obliquely positioned within planes that are substantially vertical and parallel to the central axis 125. Although not shown, similar arrangements of shock absorbers to these discussed in relation to the frame 100" are also possible in relation to the alternate frame embodiments 100, 100', 240 and 290 discussed above (as well as to other possible frame embodiments).

The complementary arrangement of the loop struts 170, 180 and the shock absorbers 380, 390 shown in FIG. 10 differs from, and is advantageous in comparison with, the corresponding arrangements of many conventional ATVs. Because conventional ATVs employ downwardly and outwardly-extending shock absorbers, their shock absorbers typically are attached to their frames at locations proximate the central axes of the vehicles. Consequently, such ATVs have little unobstructed space in the front and rear sections of the vehicles where the shock absorbers are located. In contrast, the present complementary arrangement of the loop struts 170,180 and shock absorbers 380, 390 (or between the c-brackets 250, 260, 300 and 310 and such shock absorbers) makes it possible for large front and rear interior cavities/volumes/spaces 400 and 410, respectively, to be provided within the front and rear sections 70, 80 of the ATV 10. The large, unobstructed interior spaces 400, 410 can be used in a variety of ways, e.g., for storage space, floatation materials, or accessories. Further, notwithstanding the existence of the spaces 400, 410, the shock absorbers 380, 390 can be relatively long, extending from the axles to the top of the frame 100" (extending to locations that are proximate the tops of the tires when the suspension system is fully compressed). As a consequence, high ratios of wheel movement to shock movement (e.g., approximately or greater than one-to-one ratios, and even nearly 1.5 to 1 or 2 to 1 ratios) become possible, resulting in improved suspension travel for the ATV.

As shown in FIG. 10 and further shown in FIG. 11, in at least some embodiments, large front and rear internal containers or compartments 420 and 430, respectively, are fit within the spaces 400 and 410, respectively. The compartments 420, 430 can be formed by way of large, box-like tubs that are positioned within the spaces 400, 410, with the tubs being made from plastic or other appropriate materials. Although largely box-like and rectangular in cross sectional shape, the actual shapes of the compartments 420, 430 can vary depending upon the embodiment, and also can vary depending upon the particular cross-section that is taken (e.g., some cross-sections of the compartments can be trapezoidal or hexagonal). For example, as shown particularly in FIG. 12, the particular shapes of the compartments 420, 430 as viewed from a plan view generally conform to the shapes of the front and rear loop struts 170, 180.

Additionally as shown in FIGS. 10 and 11, certain allowances are made in the overall shapes of the compartments 420, 430 in order to allow those compartments to fit within the spaces 400, 410 in view of certain other system components. In particular, each of the front and rear compartments 420, 430 includes a respective pair of side cutouts or indentations 440 and 450, respectively, allowing for the shock absorbers 380, 390 to coexist with the compartments when the compartments are placed within the spaces 400,410. Additionally, the front internal compartment 420 includes an additional cutout/indentation 460 allowing for a steering column 470 to pass underneath the compartment toward the front axle 360 and a further cutout 461 along its bottom creating an unobstructed area within which the steering system can operate.

FIGS. 10 and 11 are similar to one another insofar as they show the frame 100", the internal compartments 420 and 430, and various other system components including engine components 480 and exhaust system components 490. However, FIG. 11 reveals that, in certain embodiments, the internal compartments 420,430 are removable with respect to the frame 100" and other components, by showing those compartments in both installed and removed states (to facilitate this illustration, the shock absorbers 380,390 are not shown in FIG. 11). Notwithstanding the embodiment shown in FIG. 11, in alternate embodiments the compartments 420,430 need not be removable. Also, FIGS. 10 and 11 illustrate that the internal compartments 420, 430 are quite large, for example, in comparison with the length of the shock absorbers. As such, in at least some embodiments, the internal cavity is positioned adjacent to the first shock absorber and extends along more than fifty percent of the length of the first shock absorber when fully-extended. Also, in at least some embodiments, the internal cavity has a depth that is more than 45% (and possibly much higher, e.g., 75% or even higher) of the distance between the bottom and top of the frame (e.g., between the upper and lower primary struts).

Figure 16:
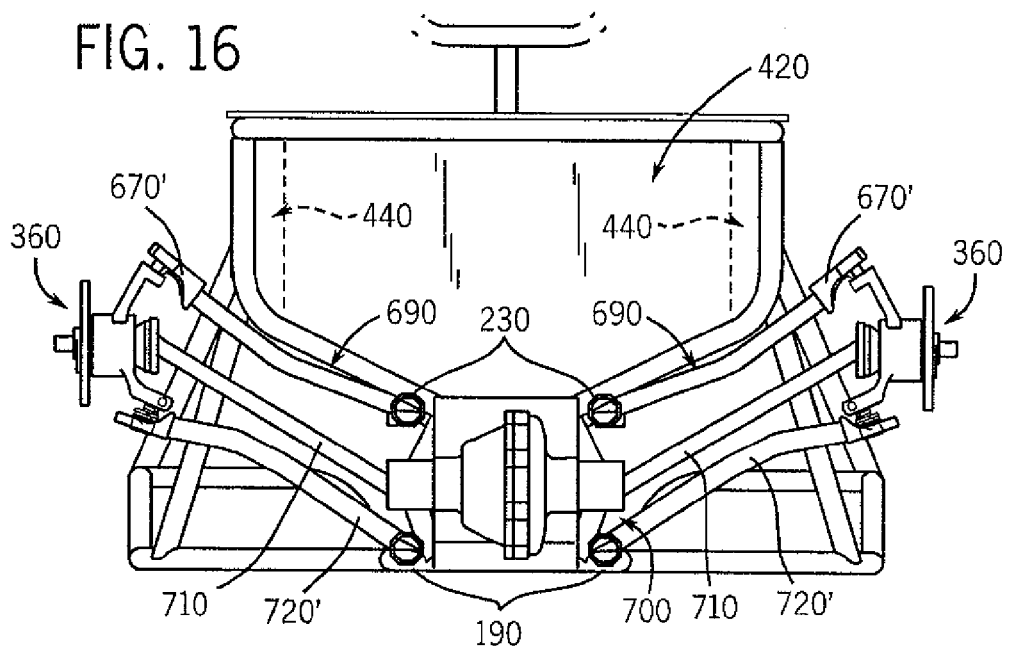
FIG. 16 is an exemplary cross-sectional view of internal components of a vehicle taken along the front axle of the vehicle, where the internal components are similar to those shown in FIGS. 11 and 14, and wherein the internal components are shown in positions that would occur during an operational circumstance in which the front wheels are moved upward relative to the frame of the vehicle.
Figure 17A:
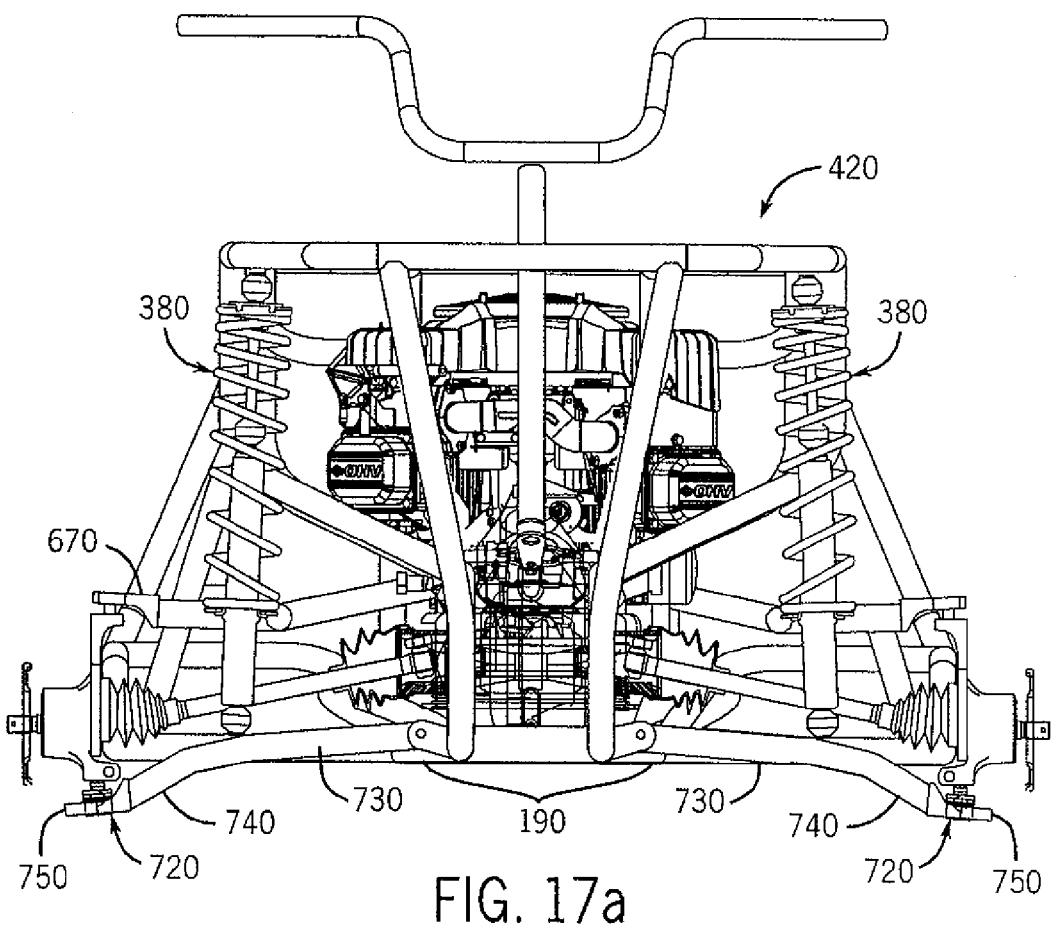
FIG. 17(a) is a front elevation view similar to that of FIG. 14.
Figure 17B:
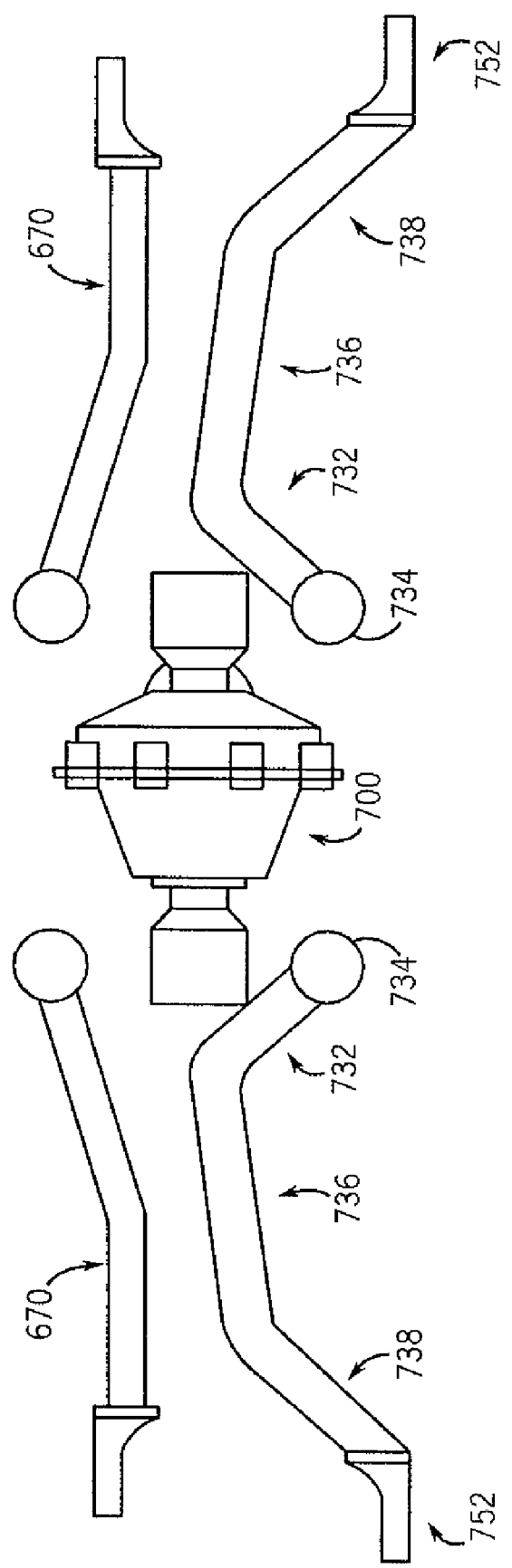
FIG. 17(b) is a front elevation, schematic, partially-exploded, cutaway view of a further alternate embodiment of A-arms.
Figure 17C:
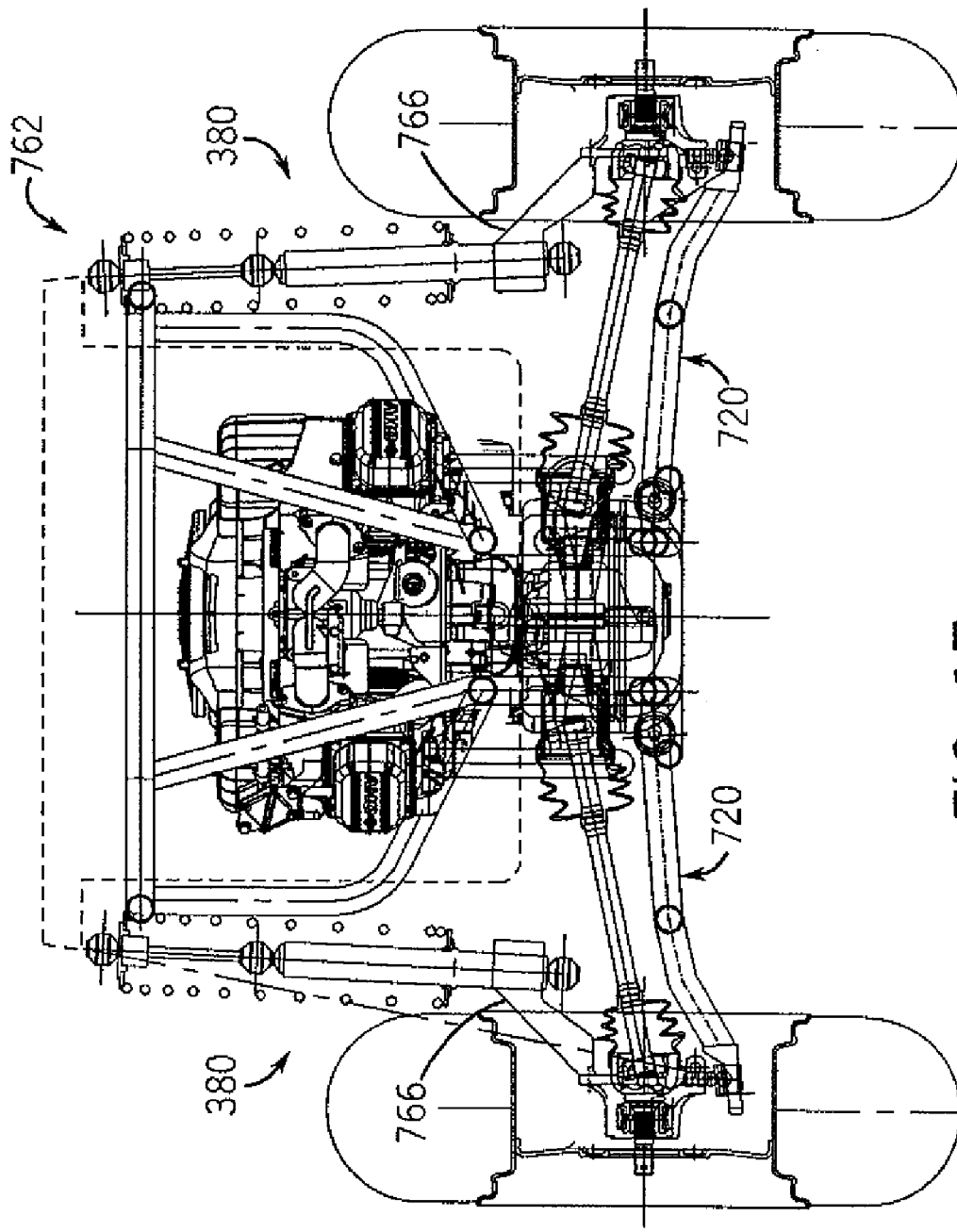
FIGS. 17(c)-(d) are front elevation views similar to that of FIG. 17(a) except insofar as the suspension system of the vehicle employs a MacPherson strut arrangement in place of twin A-arms (and with storage compartments shown in phantom), in accordance with at least some embodiments of the present invention.
Figure 17D:
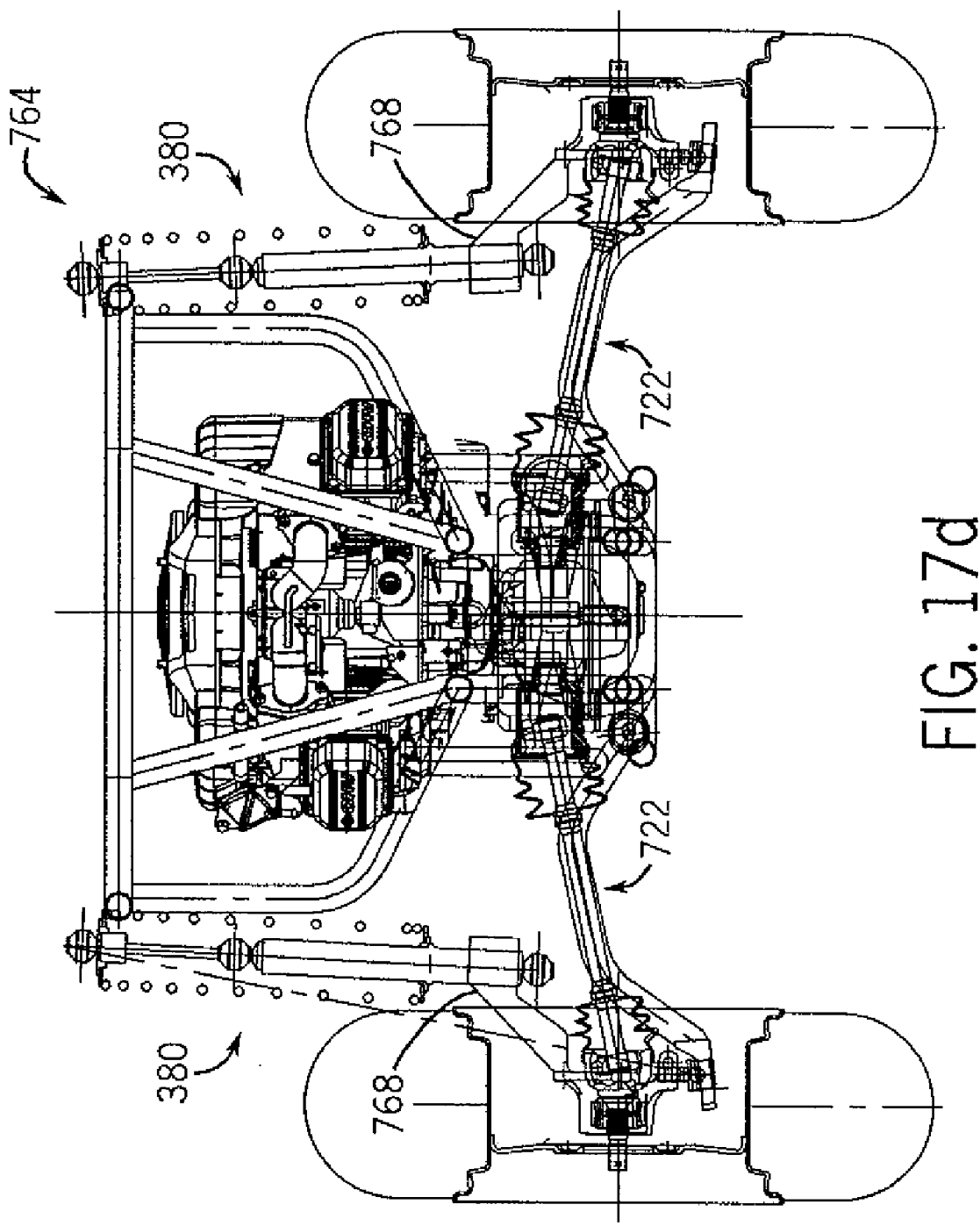

FIGS. 10 and 12-15 also illustrate the physical positioning of the compartments 420, 430 in relation to various suspension system components in addition to the shock absorbers 380, 390. Further, FIGS. 14 and 17(*a*) in particular show the front internal compartment 420 in relation to upper and lower A-arms 670 and 720, which respectively couple the wheels to the frame 100". Referring additionally to FIG. 16, a cross-sectional view taken generally along the front axle 360 of another embodiment of the ATV 10 having similar suspension components to that of FIGS. 14 and 17(*a*) shows more clearly how the front internal compartment 420 is in at least some embodiments shaped to accommodate movement of the suspension system components, particularly, upward and downward movements of the front axle 360 as allowed by the front shock absorbers 380 (see FIG. 10). As shown, the front axle 360 is supported relative to the lower primary struts 190 and the front horizontal support struts 230 of the frame 100" by way of pairs of upper and lower A-arms 670' and 720', respectively, which differ from the A-arms 670 and 720 of FIGS. 14 and 17(*a*) insofar as the A-arms 670 and 720 are straight rather than having any bends. To allow for relative movement upward of the front axle 360 and the corresponding A-arms 670', 720' (particularly the A-arm 720'), the front internal compartment 420 includes tapered bottom sides 690, which provide the desired clearance. Although not shown, in at least some embodiments, similar tapered sides could be provided with respect to the rear internal compartment 430 as well.

Further, again referring to FIGS. 14 and 17(*a*), neither the upper A-arms nor the lower A-arms in at least some embodiments need be completely straight. Rather, as shown in those FIGS., the upper A-arms 670 can be configured to generally extend diagonally downward from the central axis of the vehicle and then, near their midpoints, to include bends (e.g., labeled with numeral 671 in FIG. 14), so as to extend substantially horizontally toward the wheels (as shown, the vehicle is at its designed, or substantially designed, "ride height"). Such configuration of the upper A-arms 670 further increases the space available for the internal compartments 420, 430, particularly when the A-arms are elevated as in FIG. 16. As for the lower A-arms 720, each of those lower A-arms can include two segments (see in particular FIG. 17(*a*)), a first segment 730 that extends outward away from the lower primary struts 190 in a substantially straight manner and then a second segment 740 that dips downward relative to the first segment 730. As a result of the second segments 740 that dip downward, outer ends 750 of the lower A-arms 720 are somewhat lower than in the embodiment of FIG. 16. As a result, the clearance of the ATV with respect to the ground is increased.

Figure 14:
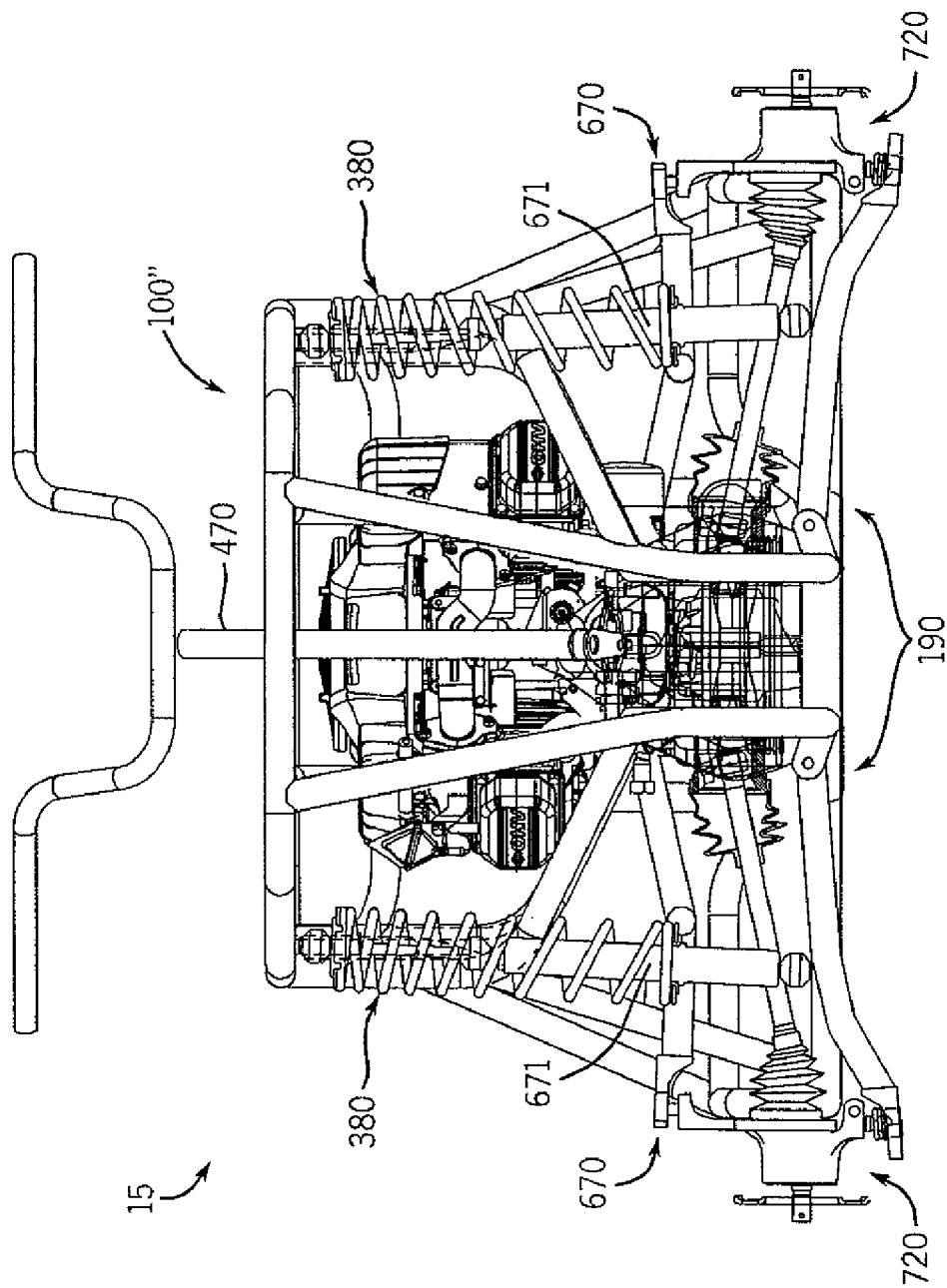
Figure 15:
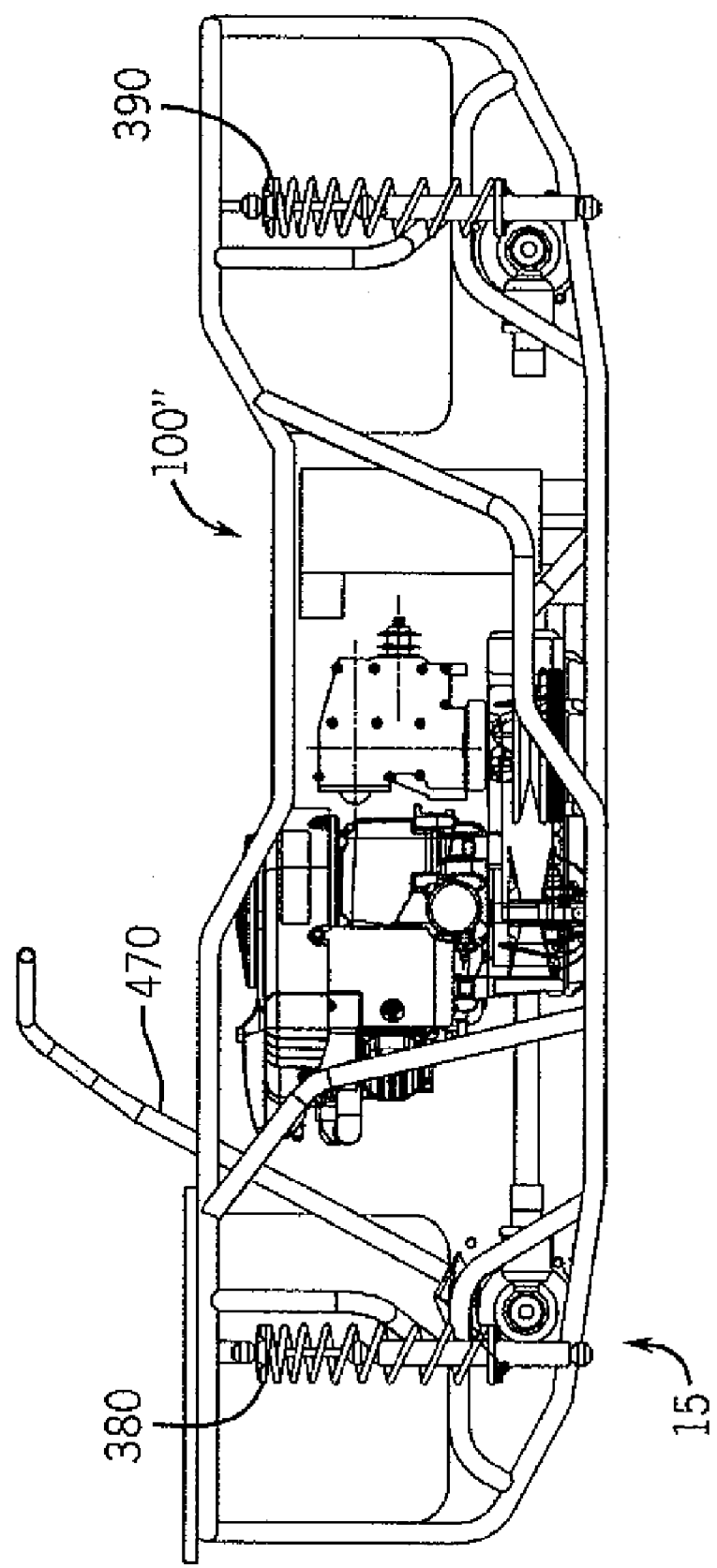

Referring to FIG. 17(*b*), a further embodiment of suspension system components are shown in which the lower A-arms 720, 720' shown in FIGS. 14, 16 and 17 are replaced with modified lower A-arms 722, respectively (the upper A-arms 670 are the same as those of FIG. 14). With respect to the modified lower A-arms 722 of FIG. 17(*b*), each of those modified lower A-arms includes three segments (in a front plane), a first segment 732 that extends both upward and outward from an inner end 734 that would be attached to the lower primary struts (not shown), a second segment 736 that extends substantially horizontally outward from the first segment, and a third segment 738 that extends both downward and outward from the second segment. As in the case of the A-arms 720, clearance of the ATV with respect to the ground is enhanced through the use of the modified lower A-arms 722. It should be further noted that FIGS. 16 and 17(*b*) also illustrate that the two ends of the front axle 360 are coupled to, and driven by way of, a differential 700 that transmits rotational energy to the ends of the front axle by way of linking portions 710.

Although the above-described FIGS. show embodiments of twin A-arm type suspension systems, the present invention also is intended to encompass embodiments that employ other types of suspension systems. For example, referring to FIGS. 17(*c*) and 17(*d*), cross-sectional views of two alternate embodiments of suspension systems 762 and 764, respectively, are shown in which MacPherson strut-type arrangements are employed. The suspension system 762 of FIG. 17(*c*) in particular is shown to include a MacPherson strut-type suspension arrangement in which the modified lower A-arms 720 of FIG. 17(*a*) (or A-arms similar thereto) are still employed to connect the wheels to the frame, but the upper A-arms are replaced by short arms 766 that directly couple the wheels to the shock absorbers 380, without any additional coupling of the wheels to the frame. The suspension system 764 of FIG. 17(*d*) in particular is shown to include a MacPherson strut-type suspension arrangement in which the modified lower A-arms 722 of FIG. 17(*b*) (or A-arms similar thereto) are still employed to connect the wheels to the frame, but the upper A-arms are replaced by short arms 768 that directly couple the wheels to the shock absorbers 380, without any additional coupling of the wheels to the frame. Although FIGS. 17(*c*) and 17(*d*) show the suspension systems associated with the front wheels of the vehicle, similar MacPherson strut-type suspension systems can also (or instead) be employed with respect to the rear wheels of the vehicle. By employing such MacPherson strut-type suspension systems in the front and/or rear of the vehicle, the internal compartments 420, 430 (and cavities within which those compartments are positioned) can be further increased in size relative to what would be possible in embodiments employing A-arm-type suspension systems.

Figure 18:
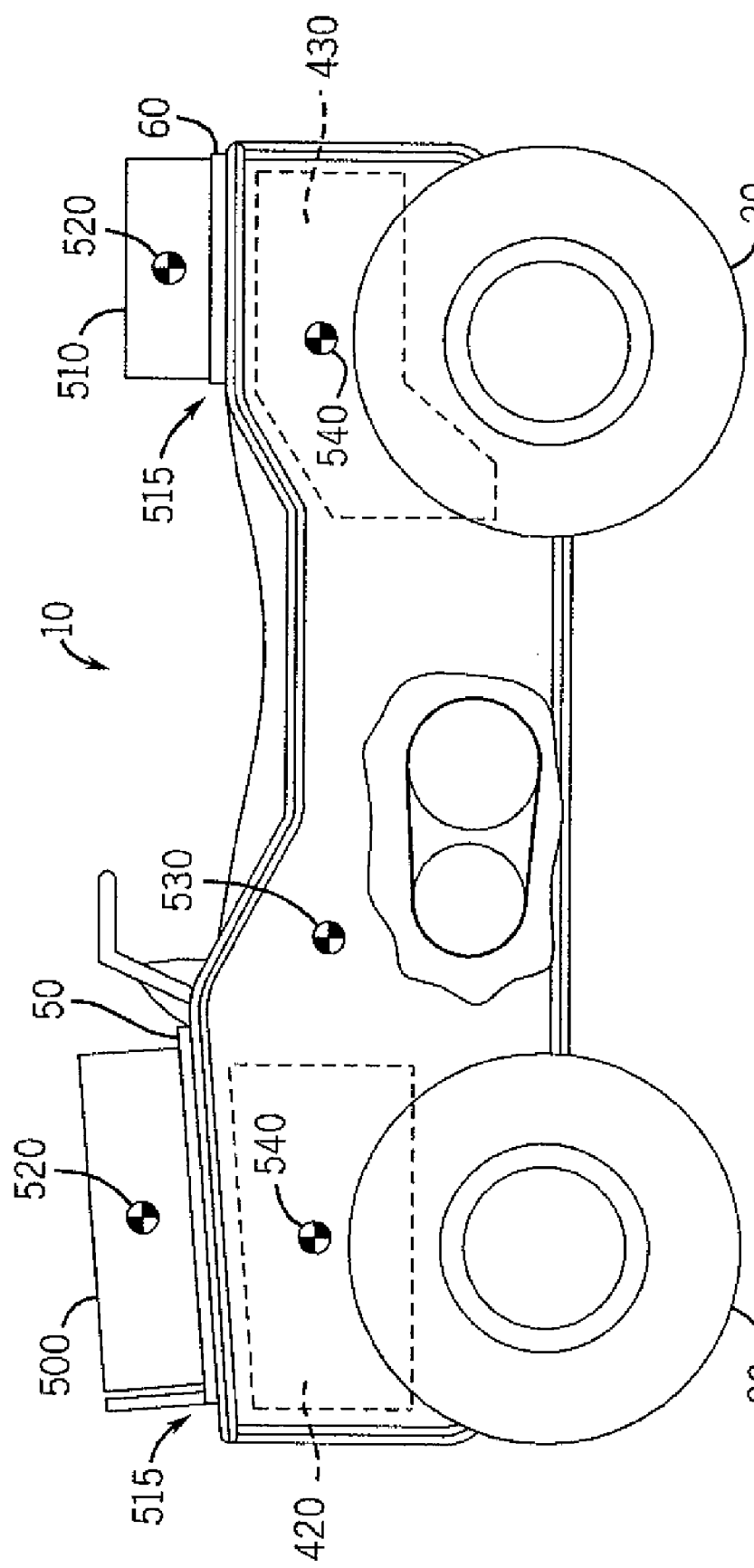
FIG. 18 is a left side elevation view of the vehicle of FIG. 1 further showing the internal compartments of FIGS. 10-16 (in phantom) and additional external front and rear storage compartments mounted on racks at front and rear sections of the vehicle, along with approximate indicators of centers of gravity of each of these compartments (if empty) and the vehicle as a whole.

Turning to FIG. 18, the ATV 10 is shown to be fully loaded with multiple storage compartments that include, in addition to the internal compartments 420, 430 (shown in phantom), additional optional front and rear exterior storage compartments 500 and 510, respectively. The storage compartments 500 and 510 respectively rest upon and are attached to the front and rear storage racks/cargo racks 50 and 60, respectively, along an upper surface 515 of the ATV 10. Given that the front and rear internal compartments 420 and 430 have widths that approach the width of the overall ATV 10 (e.g., over 50% of the width of the vehicle), given that the front and rear exterior storage compartments 500 and 510 have widths that are no more than the width of the ATV (and are largely the same as those of the corresponding internal compartments), and given the overall length and depth dimensions of the respective compartments as shown in FIG. 18, it is evident that the overall volume of space within the internal compartments typically is considerably larger than that of the exterior storage compartments. Further, given that the internal compartments 420, 430 are quite large, the need for exterior storage compartments (particularly exterior storage compartments that are large and might impede operator visibility or negatively affect dynamic handling) is significantly reduced in comparison with conventional ATVs.

Also as shown in FIG. 18, in contrast to the exterior storage compartments 500 and 510, which have centers of gravity 520 that are above a center of gravity 530 of the entire unloaded ATV 10, the internal compartments 420, 430 have centers of gravity 540 that are at approximately the same level as the center of gravity 530 of the vehicle unladen. Consequently, loading of the internal compartments 420, 430 does not typically cause the overall center of gravity of the ATV 10 to be raised, in contrast to loading of the exterior storage compartments 500, 510. Additionally, given that the relative dimensions and volumes of the internal compartments 420, 430 are considerably larger than those of the exterior storage compartments 500, 510 as discussed above, it would rarely be the case that the loading of all of the various compartments of the ATV 10 would substantially raise the overall center of gravity of the ATV, particularly assuming that the internal compartments 420, 430 are loaded first before any loading (or even attachment) of the exterior storage compartments 500, 510. Indeed, in many cases the loading of the internal compartments 420, 430 tends to lower the overall center of gravity of the ATV (e.g., when only the lower portions of the internal compartments are filled), and thus tends to expand the vehicle's operating envelope and increase the vehicle's tip-over and rollover angles, which enhance stability and safety. Additionally, since the overall center of gravity 530 of the overall vehicle will be considerably higher than that shown when an operator (and/or passenger) are riding on the vehicle, the internal compartments (particularly when filled) serve to significantly reduce the actual center of gravity of the vehicle under operating circumstances. This all is in contrast to conventional ATVs, in which all or nearly all of the storage capacity of the ATVs occurs by way of external storage.

Figure 19B:
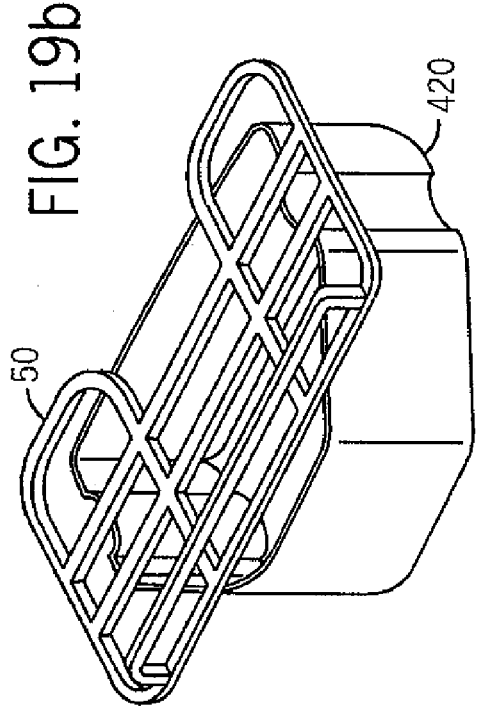
FIGS. 19(a)-(c) respectively are perspective views of the rack at the front section of the vehicle of FIG. 18, the external front storage compartment of FIG. 18 mounted on that rack, and internal compartment beneath that rack (as the compartment would appear if removed from the remainder of the vehicle)
Figure 19C:
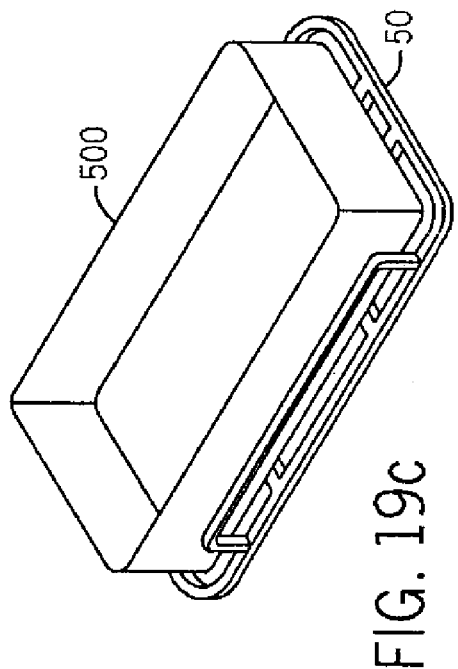
Figure 19A:
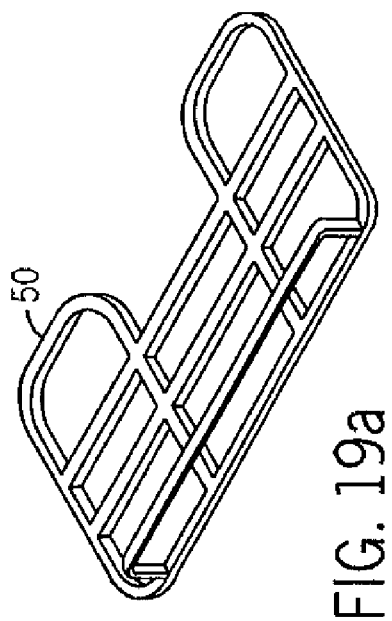
Figure 20:
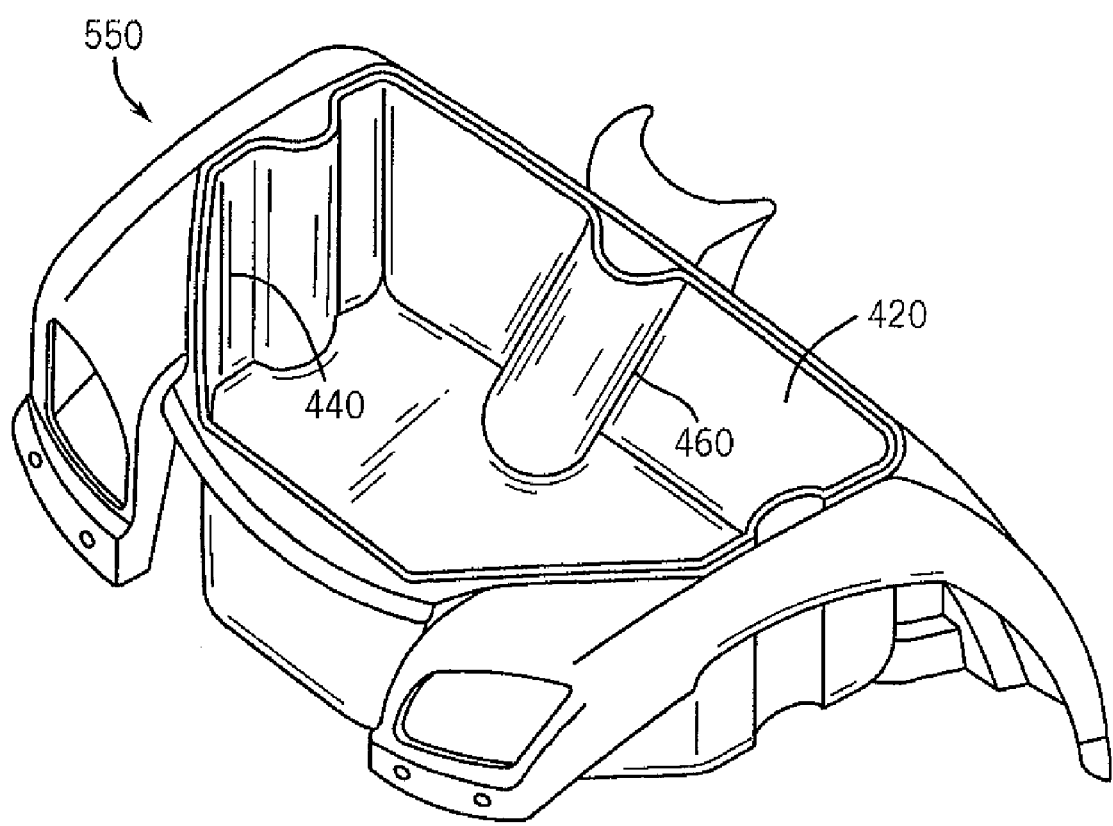
FIG. 20 is a perspective view of a portion of an exemplary front section of body work of a vehicle such as that shown in FIG. 18, with the rack at the front section removed to reveal an interior of the front internal compartment in accordance with at least some embodiments of the present invention.

Referring to FIGS. 19(*a*)-(*c*), additional perspective views of the exemplary front storage rack (or carrier) 50, front internal compartment 420 and front exterior storage compartment 500 of FIG. 18 are provided. FIG. 19(*a*) in particular shows simply the rack 50, while FIG. 19(*b*) shows the rack along with the front internal compartment 420 below it and FIG. 19(*c*) shows the rack along with the front exterior storage compartment 500 above it. Referring additionally to FIG. 20, a perspective top view of a front portion 550 of the ATV 10, which largely but not entirely corresponds to the front section 70 of FIG. 1, is shown in cutaway from the remainder of the vehicle. More particularly, FIG. 20 shows the front portion 550 with each of the front storage rack 50 and a lid or cover for the front internal compartment 420 (as described below) removed, to reveal the interior of the front internal compartment 420.

The front and rear internal compartments 420, 430 can take a variety of forms and serve a variety of purposes depending upon the embodiment. In some embodiments, the internal compartments 420, 430 are used (or usable) primarily for storing and/or carrying loads that an operator (or other party) wishes to move from one location to another location via the ATV or other reduced-size vehicle having the compartments. Also, as described further below, in at least some embodiments, the compartments 420, 430 are optionally sealable (or even permanently sealed) so as to provide air tight and/or watertight compartments that can be used to carry fluids, used to carry equipment that should not be exposed to the outside environment (e.g., electronic equipment that should not be exposed to rainwater), or used to increase the displacement and thereby the buoyancy of the ATV or other reduced-size vehicle. In some embodiments, one or both of the compartments 420, 430 also can be employed as coolers (or thermoses) to store various items that require heating or refrigeration such as, for example, food or drink. In some such embodiments, Styrofoam liner(s) or other appropriate thermal insulation components can be provided within one or both of the compartments to provide appropriate insulation. Further, depending upon the embodiment, the liners or other appropriate thermal insulation components can be integrally formed with the compartments, or formed as separate components and then inserted into the compartments (e.g., such that the liners would generally follow the contours of the compartments, along the insides of the compartments).

In at least some embodiments (as shown, for example, in FIG. 11), the internal compartments 420, 430 are geometrically configured to enhance their usefulness as large storage containers. More particularly, in such embodiments, the internal compartments 420, 430 have cross-sections that are substantially convex polygons (e.g., all interior angles are 90 degrees or greater), with the possible exception of the allowances/indentations described above (e.g., the indentations 440, 450, 460, 461, etc.), and/or are designed so that lines connecting largely or substantially all pairs of points on opposing interior surfaces within the compartments would not cross or be obstructed by any intermediary surface of the compartments. That is, the internal compartments 420, 430 are configured so as to create the largest possible uninterrupted or unobstructed volumes within the compartments. As a result, the internal compartments 420, 430 in many embodiments will be capable of holding large-volume items such as, for example, 5 gallon water containers or 5 gallon gas containers.

While it is typically desirable that the size (e.g., the largeness) of the internal compartments 420, 430 be maximized for a given vehicle, the actual size of the internal compartments can be evaluated in a number of manners. To begin with, the size of the compartments can be evaluated simply based upon the actual volumes within the compartments, e.g., the number of gallons of fluid that the compartments could hold. While a simple volume measure is one useful figure of merit, particularly in terms of determining whether a given compartment is capable of providing sufficient fluid-carrying capacity or sufficient displacement, other figures of merit also are of interest, particularly depending upon the particular application(s) in which it is envisioned that a given ATV or other reduced-size vehicle might be used. For example, in view of the above discussion concerning the desirability of having internal compartments with "convex polygon" cross-sectional shapes, other useful figures of merit can include the largest-diameter sphere or largest-width cube that will fit within a given compartment. In some cases, it is of interest whether particularly objects or devices will fit into a given internal compartment. In at least some embodiments of the invention, each of the front and rear internal compartments can hold spheres that are more than 10" in diameter, up to 16" in diameter or even larger (particularly if the lids of the compartments and/or the racks were bulbous in shape). Also, in at least some embodiments of the invention, each of the front and rear internal compartments can hold a cube that is more than 10" by 10" by 10" in volume, up to 12" by 12" by 12" in volume, or even 16" by 16" by 16" in volume or even larger.

Further, the length, width, depth/height or other cross-sectional dimensions of the internal compartments 420, 430, or areas or volumes calculated by multiplying two or more of these dimensions, can also be of interest as figures of merit, either by themselves or in relation to other dimensions of the overall vehicle such as the width of the vehicle, the height of the vehicle, and/or the length or wheelbase of the vehicle. Indeed, such measurements or ratios can be of use in comparing the storage capacity of two or more comparable ATVs or other reduced-size vehicles. The dimensions of the internal compartments that are used in any given size evaluation can be maximum dimensions, average dimensions, mean dimensions, or some other type of dimensions or arbitrarily-measured dimensions across the compartments.

In at least some embodiments of the present invention, such as that shown in FIG. 11, one useful figure of merit is the ratio of the sum of the maximum lengths of the two (front and rear) internal compartments (where length is measured parallel to the central axis of the vehicle, e.g., the axis 125 of FIG. 2) to the wheelbase of the vehicle. With respect to many embodiments of the present invention, including the embodiment described with respect to FIGS. 10-15, this ratio is 65% or greater (and, in any event, well over 50%), and in some embodiments this ratio could potentially reach as high as around 90%. Other useful figures of merit include, for example, the ratio of the length of an internal compartment to the total length of the vehicle, the ratio of the width of an internal compartment to the total width of the vehicle, and the ratio of the depth of an internal compartment to the total height of the vehicle. In at least some embodiments, these respective length, width and depth/height ratios can attain values of between 20% and 32%, between 46% and 51%, and between 62% and 63% (where height of the vehicle can be measured from the ground to the top of one of the racks, or both of the racks, when the vehicle is unladen), respectively.

Figure 22C:
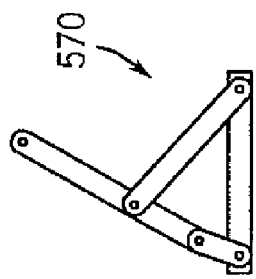
FIGS. 22(a)-(c) show side elevation views of an exemplary hinge component that could be used to fasten and support a lid and/or rack such as that of FIG. 21 with respect to the underlying vehicle (e.g., with respect to the interior of an internal compartment beneath the lid/rack)
Figure 22B:
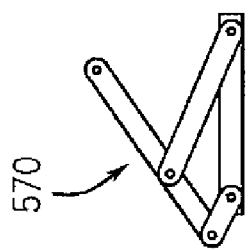
Figure 22A:
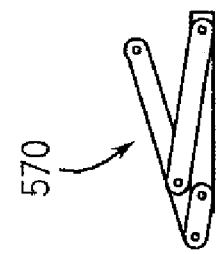
Figure 21:
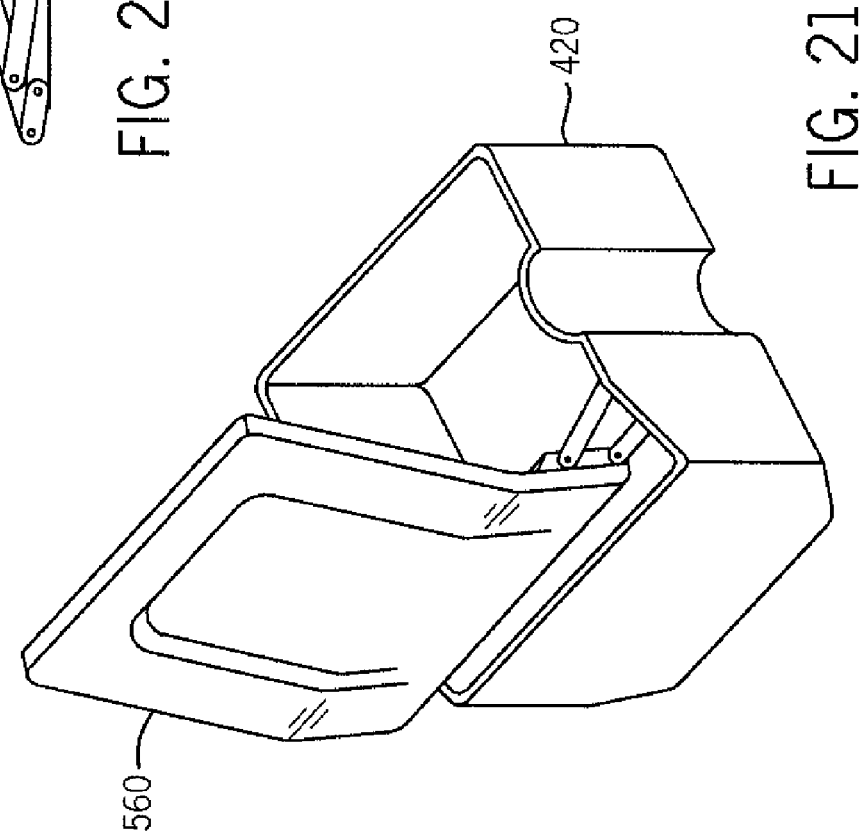
FIG. 21 is a perspective view of an exemplary front internal compartment such as that shown in FIGS. 10-16 and 18-20, along with an exemplary openable lid, on which could be mounted onto the front rack of FIGS. 19(a)-(c)

In certain embodiments, the internal compartments 420, 430 can be opened and closed by way of a hinged door or other openable/closeable port. In at least some embodiments, the compartments 420, 430 include a lid or top or cover that can be opened and closed. For example, as shown in FIG. 21, the front internal compartment 420 in some embodiments operates in conjunction with (or can be considered as including) a lid/top 560 that is coupled to the compartment by way of one or more coupling links, which can take the form of one or more hinge components 570. Each of the hinge components 570 can have a variety of forms, one of which is shown in more detail in FIGS. 22(a)-(c) in fully-closed, partly-closed, and fully-opened positions, respectively. Although not shown, in at least some embodiments, the lid/top 560 is configured to support a storage rack such as the storage rack 50. In such embodiments, lifting of the storage rack 50 results in raising of the lid/top 560 so as to open the compartment 420.

Figure 23:
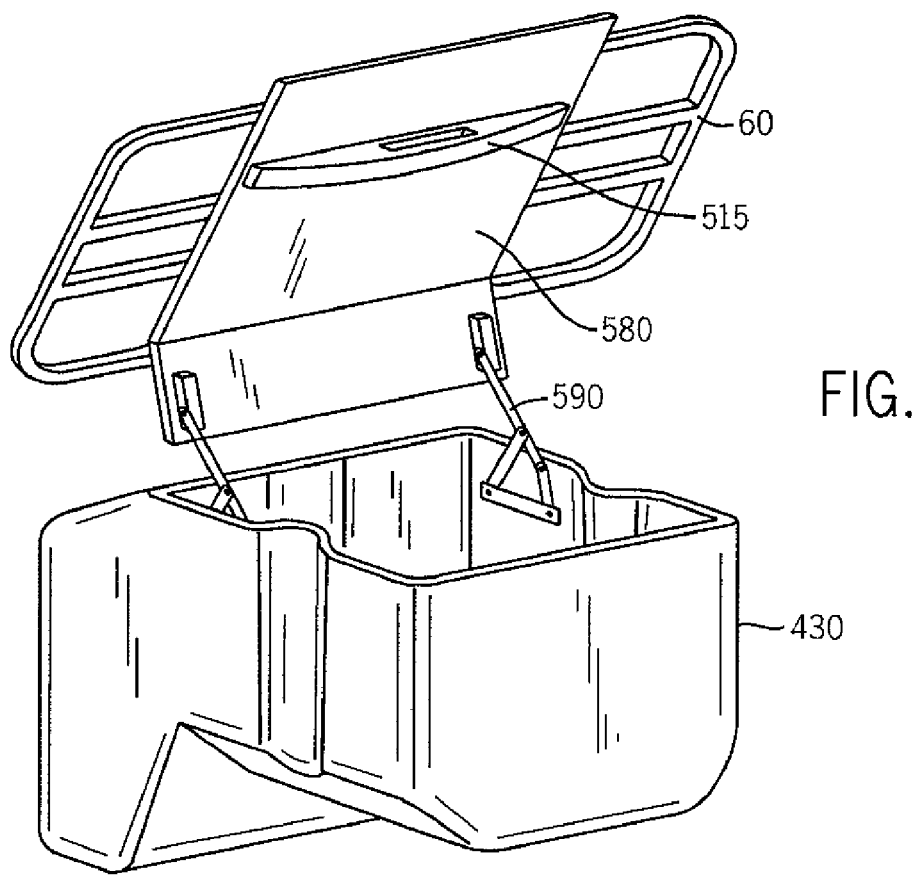
FIG. 23 shows a perspective view of the rear internal compartment of FIG. 18 in combination with an openable lid and the rear rack of FIG. 18, where the lid/rack is supported with respect to the internal compartment by way of alternate exemplary hinge components differing from that of FIGS. 22(a)-(c)
Figure 24:
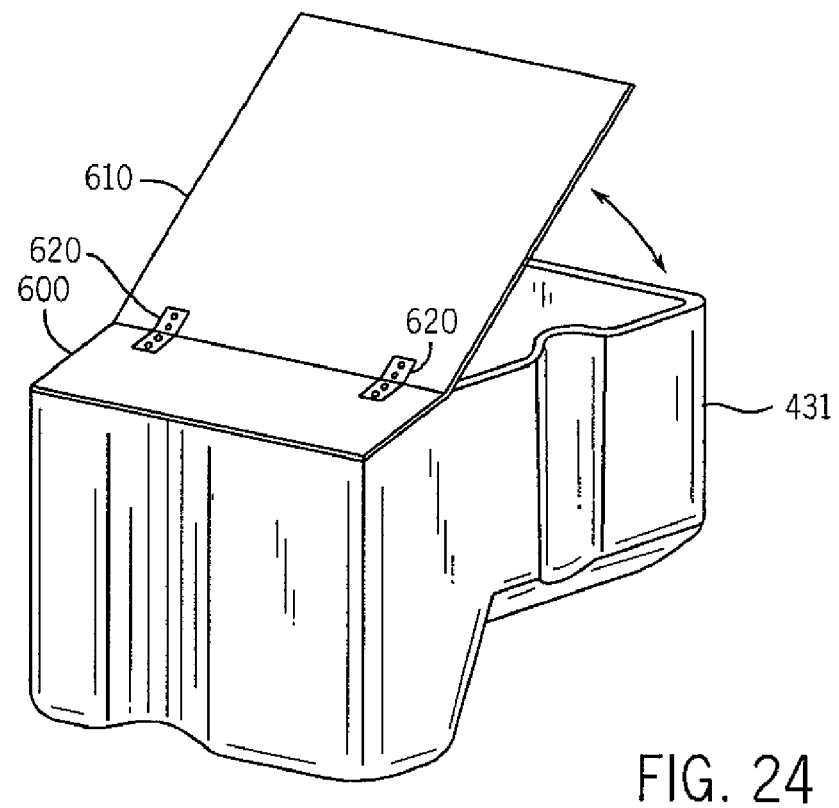
FIG. 24 shows a perspective view of an alternate exemplary embodiment of a rear internal compartment differing from that of FIGS. 18 and 23, where the compartment includes a partly fixed top portion and a lid mounted to the top portion by way of a pair of hinge components that differ from those of FIGS. 22 and 23.

FIG. 23 further shows the rear internal compartment 430 in combination with a lid/top 580 (the lid/top can also be considered to be a part of the rear internal compartment). The lid/top 580 is coupled to the rear internal compartment 430 by way of two hinge components 590. FIG. 23 also shows that, in some embodiments, the rear storage rack 60 is coupled directly to the top 580 such that lifting of the rack 60 results in the opening of the compartment 430. Further, the top 580 can have a strengthening rib 515 enabling the top to become a structural member capable of bearing significant loads. FIG. 24 additionally shows an alternate embodiment of the rear internal compartment 430, in this case referred to as a rear internal compartment 431, where the compartment includes a partly fixed top portion 600 and also is coupled to an openable top portion or lid 610, which is coupled to the top portion 600 by way of hinges 620 (the lid 610 can also be considered to be part of the internal compartment 431).

Figure 25A:
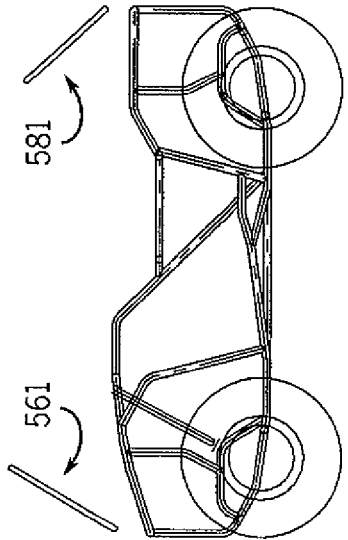
FIGS. 25(a)-(f) illustrate several exemplary manners in which lids to the internal compartments can be mounted on an ATV.
Figure 25B:
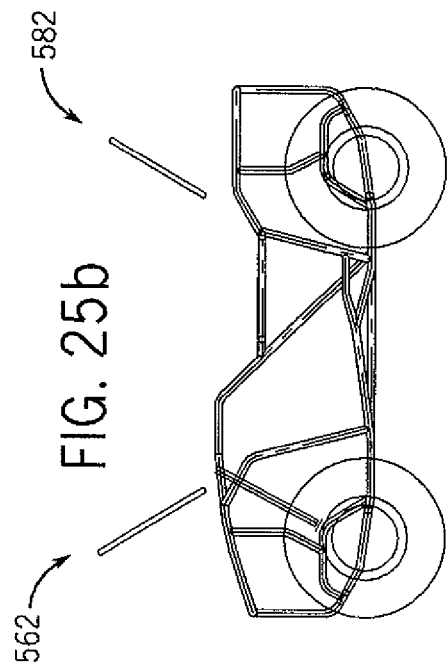
Figure 25E:
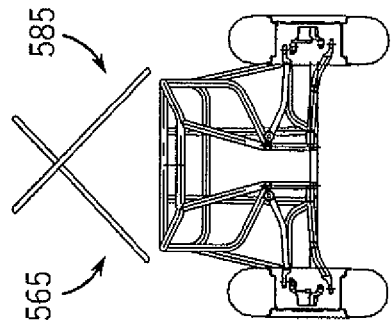
Figure 25F:
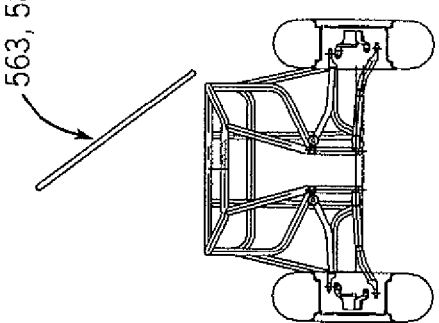
Figure 25C:
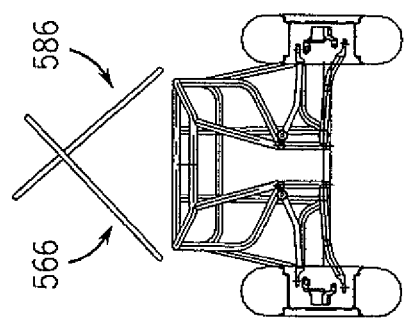
Figure 25D:
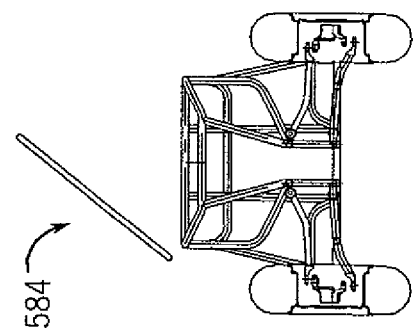

Although FIGS. 21, 23 and 24 show the lids 560, 580, 610 as each being hinged so as to open upward and toward the front of the ATV 10, regardless of whether the lids are for the front or rear internal compartments 420, 430/431, the present invention is intended to encompass a variety of different configurations of lids. Referring to FIGS. 25(a)-(f), six additional exemplary lid configurations are illustrated. FIG. 25(a)

in particular shows an ATV having front and rear lids 561 and 581 that each are hinged with respect to the vehicle and swing upward and outward toward the front and rear rends of the vehicle, respectively (e.g., both of the lids swing away from the operator). FIG. 25(*b*) shows an alternative ATV having front and rear lids 562 and 582 that each are hinged with respect to the vehicle so as to swing upward and inward toward the mid-section of the vehicle, where the operator would be seated. Although not shown in FIGS. 25(*a*)-(*f*), as discussed above, it also is be possible for both the front and rear lids to be hinged so as to swing toward the front (or rear) of the vehicle.

Further, it also is possible in some embodiments to have both front and rear lids 563 and 583, respectively, swing toward the left side of the vehicle as shown in FIG. 25(*c*), or to have both front and rear lids 564 and 584, respectively, swing toward the right side of the vehicle as shown in FIG. 25(*d*). Additionally, as shown in FIG. 25(*e*), it also is possible in some embodiments to have one of the front and rear lids, e.g., a front lid 565, swing toward the right side of the vehicle while the other of the lids, e.g., a rear lid 585, swing toward the left side of the vehicle. A reverse orientation to that of FIG. 25(*e*) is also possible, as shown in FIG. 25(*f*) (with each of FIGS. 25(*e*) and (*f*) again providing front elevation views of vehicles). Indeed, it will be evident from FIGS. 25(*a*)-(*f*) that at least 16 different hinged lid combinations are possible in terms of the different hinge orientations that can be employed with respect to the front and rear lids.

Although FIGS. 25(*a*)-(*f*) envision ATVs or other reduced-size vehicles that have both a front internal compartment and a rear internal compartment that are each accessible from the top by way of a hinged lid, the present invention is also intended to encompass ATVs or other reduced-size vehicles that have only a single large internal compartment (e.g., at either the front or the rear) and/or one or more compartments that are accessible from locations other than (or in addition to) their tops. Further, the present invention is intended to encompass vehicles having one or more compartments having lids that are removable but not hinged. For example, in some alternate embodiments, the lids can be slid laterally/horizontally across the tops of the compartments along slots formed within the interior sides of the compartments. Also, for example, the lids can be pulled off or completely removable in some other manner. Indeed, the embodiments shown and discussed above are only intended to be exemplary, and are not intended to be an exhaustive description of all possible arrangements of lids/tops/covers/doors or other ports in relation to one or more internal compartments of an ATV or other reduced-size vehicle.

Also, while FIGS. 21-24 show a number of hinge-type components that can be utilized to couple lids or similar door-type components to internal compartments, the present invention is intended to encompass a variety of other hinge-type components other than those shown, which are intended to be merely exemplary. Further, the present invention is also intended to encompass a variety of other embodiments of internal and external compartments and racks even though they are not shown in the FIGS. For example, one or more of the internal compartments can be further compartmentalized into several distinct regions or subcompartments. Also for example, the various compartments, including possibly various subcompartments within those compartments, can be used for many different specialized purposes (e.g., as one or more coolers, as one or more tool holders, for the purpose of storing/conveying hunting equipment, and for a variety of other purposes).

In at least some embodiments, the front and rear internal compartments 420, 430 in combination with their complimentary lids (or tops, covers, doors, etc.) are sealed or sealable such that the compartments are capable of serving as buoyant compartments within the ATV 10 or serving other purposes for which it is desirable to have sealed (e.g., watertight and/or airtight) compartments (e.g., to hold liquids). In some such embodiments, the compartments 420, 430 each have a volume of more than 10 gallons, for example, 15 gallons or 17 gallons, and in at least some embodiments, the compartments each have an even larger volume approaching 20 to 25 gallons per compartment (or possibly even more). In such embodiments, when combined with the buoyancy afforded by the remainder of the vehicle (including, in this case, four balloon tires 20 and a fuel tank of the ATV 10), the overall buoyancy of the ATV is significantly improved over conventional ATVs. Indeed, the 50 gallons or more of displacement afforded by such compartments, in combination with the above-estimated 72 gallons of displacement afforded by the tires 20 and fuel tank and the remainder of the ATV, achieves an overall displacement of 122 gallons, well over the 114 gallons of displacement that (as discussed above) would be required to keep a conventional ATV afloat when supporting an operator of average size (e.g., an operator of about 200 lbs). Indeed, with such displacement, it would be possible not only to support an operator of that size but also be possible to support up to approximately another 67 lbs of additional weight and still float. Further, because both the front and rear internal compartments 420,430 are capable of providing approximately equivalent levels of buoyancy, the ATV 10 remains largely horizontal (e.g., less than 5 degrees of tilt off of the horizontal) if the ATV enters a body of water rather than suffering from significant tilting (e.g., having one end of the ATV become significantly higher than the other end of the ATV).

In certain embodiments, the internal compartments 420, 430 are fully sealed and cannot be opened. However, more commonly, the compartments 420, 430 have openable lids, tops, covers, doors or other openable ports, for example, as shown in FIGS. 21-24 (e.g., the lids/tops 610, 580 and 560). To allow for such openable lids or other ports and at the same time achieve satisfactory sealing of the internal compartments, it is typically desirable (although not necessary) for the lids or other ports associated with the compartments 420, 430 and the compartments themselves to include one or more seals such that, when the lids or other ports are closed with respect to the compartments, liquid or gas cannot enter into or exit from the compartments. FIG. 26(*a*) shows one exemplary rubber seal 635 existing between the lid 610 and the storage compartment 431 of FIG. 24, while FIG. 26(*b*) shows an alternate exemplary outer seal arrangement. Further, while not appropriate in all embodiments, to the extent that liquids or water can enter the compartments 420, 430, the compartments can also include one or more drain holes such as a drain hole 630 shown in FIG. 27 along their bottom surfaces. The drain holes can be both unplugged to allow drainage of liquids/water from the compartments 420, 430 as well as plugged to allow for the compartments to be fully-sealed.

Referring further to FIGS. 28(*a*)-(*c*), in certain embodiments, the inner surfaces of the internal compartments 420, 430 can include various features that allow for the attachment of the coupling links/hinge components such as the hinge components 570, 590 shown in FIGS. 21-23. For example, as shown in FIGS. 28(*a*) and (*b*), an inner side surface 640 of the front internal compartment 420 can include a slot 650 into which a bottom portion of one of the hinge components 570 rests. Alternatively, as shown in FIG. 28(*c*), a threaded insert 660 can be employed, allowing a threaded shaft of a hinge component to be screwed into a complementary threaded hole within the sidewall of the internal compartment (or allowing a hinge component with a threaded hole to be screwed onto a threaded shaft protruding from the sidewall). The use of such threaded inserts can enable the cost effective manufacture of the internal compartments in a manner similar to existing body manufacture with injection molding, for example.

Mid-Section Cooling and Exhaust Systems

Figure 29:
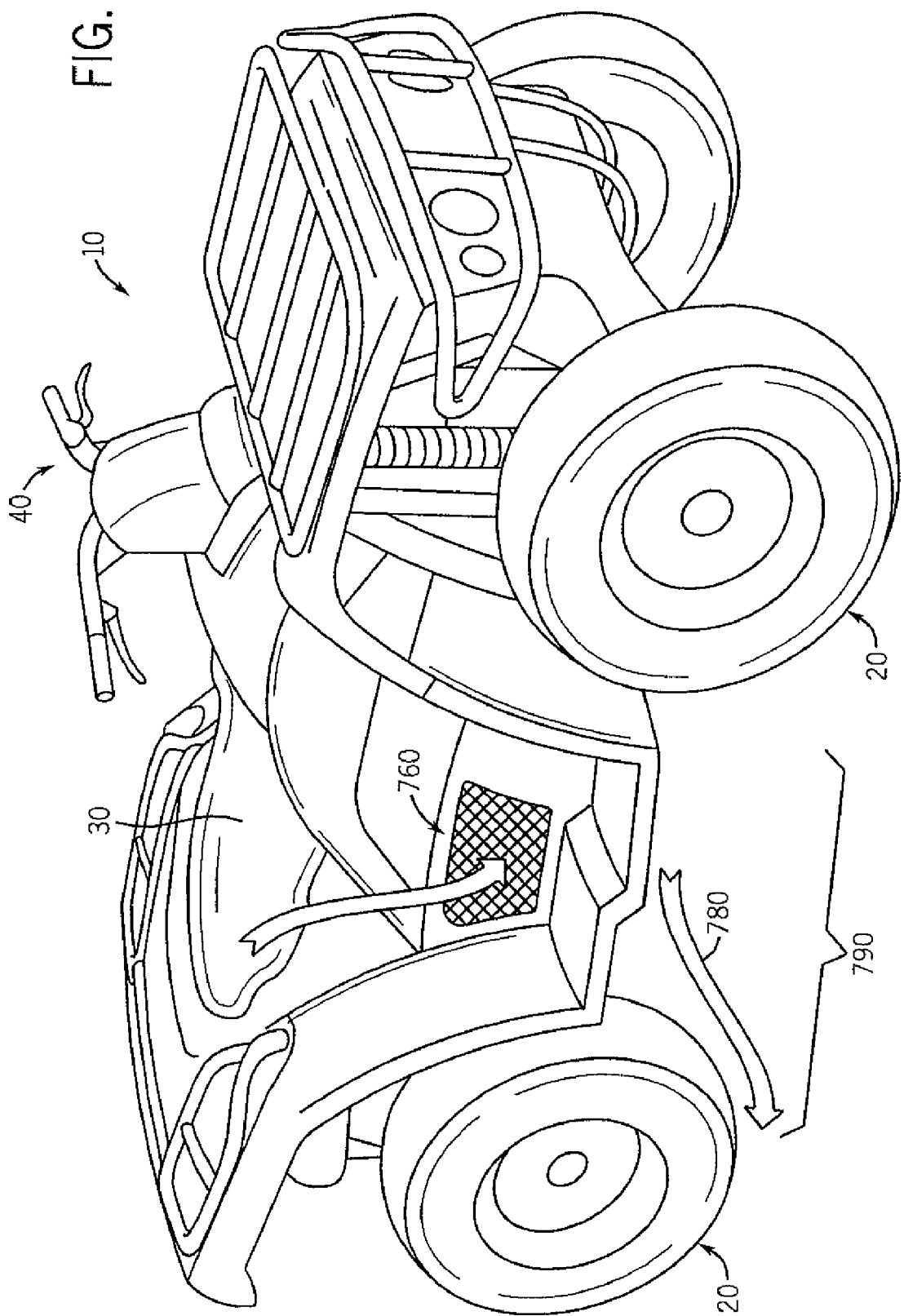
FIGS. 29-31 are perspective views of various exemplary embodiments of the reduced-size vehicle of FIG. 1 in which the vehicles are equipped with cooling systems at the mid-sections of the vehicles and the flow of air through the cooling systems is largely vertical.

Referring to FIG. 29, the ATV 10 is shown in one embodiment to include side air inlets 760 (only one of which is shown, the other being on the opposite side of the vehicle) that are situated on opposite sides of the operator seat 30. As indicated by first and second arrows 770 and 780, which respectively represent air inflow into and air outflow from the ATV 10, the ATV differs from conventional ATVs insofar as the cooling system of the vehicle for cooling the engine and related components is situated exclusively within a mid-section 790 of the ATV that corresponds generally to the middle portion 135 of the frame 100 discussed above.

Figure 30:
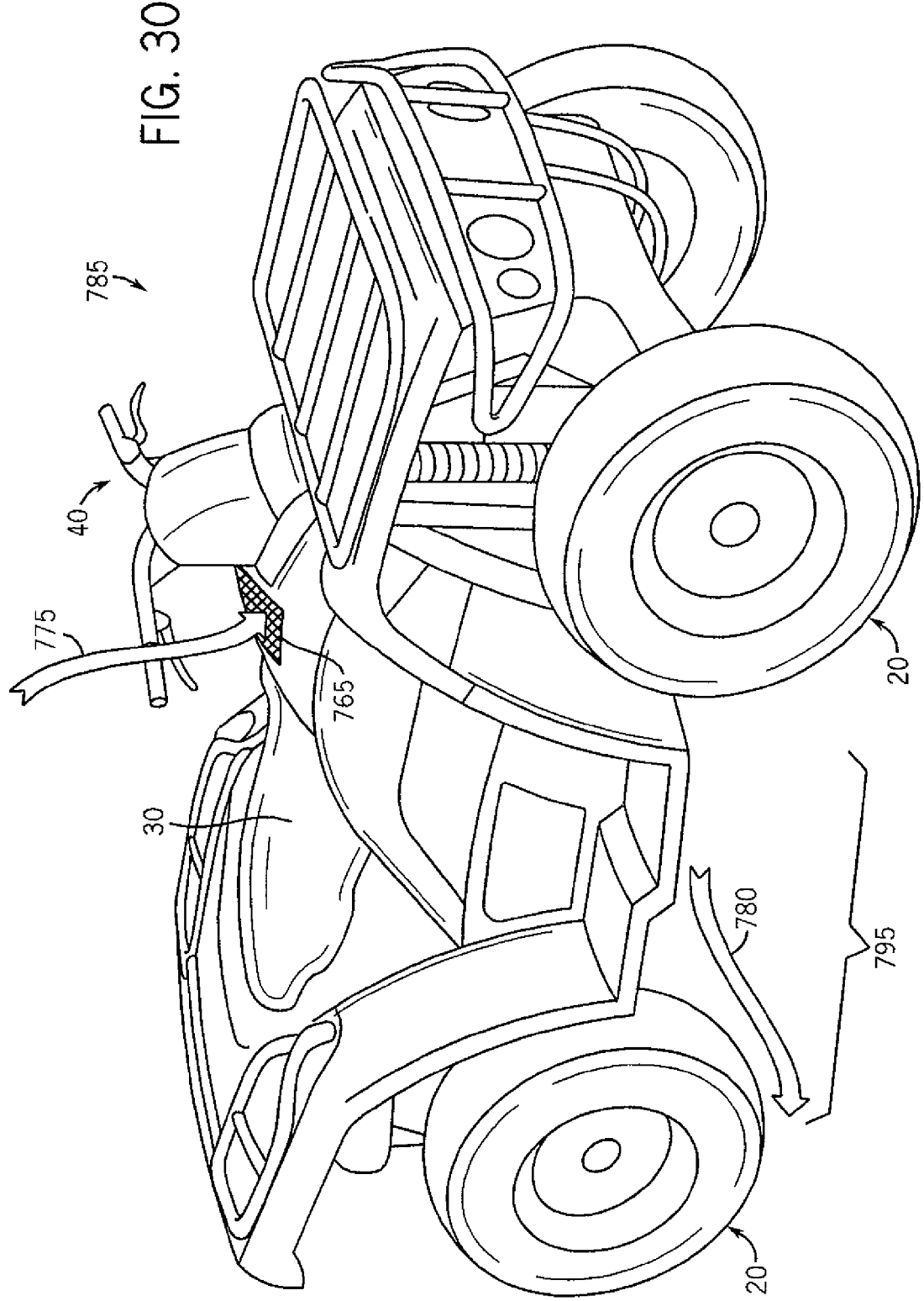
Figure 31:
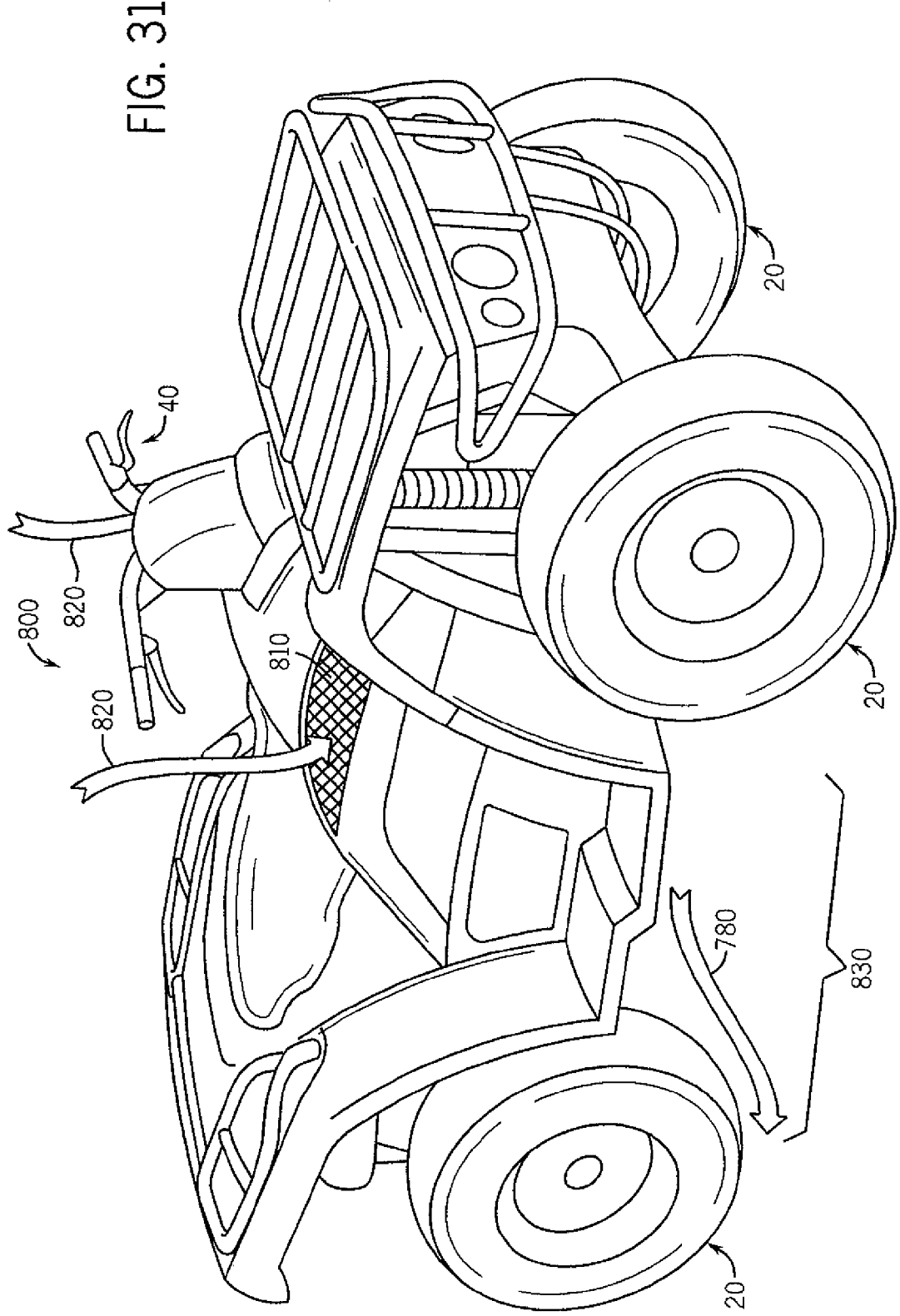

Turning to FIGS. 30 and 31, in two alternate embodiments of the ATV 10, shown respectively as ATVs 785 and 800, air inlets 765 and 810 are respectively located at positions that are higher up and somewhat forward of the positions occupied by the air inlets 760, proximate the handlebars 40. More specifically, the air inlet(s) 765 of the ATV 785 are positioned just behind where the handlebars 40 are mounted to the vehicle (along the center of the vehicle), while the air inlet(s) 810 are positioned nearly adjacent to, and to the sides of, where the handlebars are mounted to the vehicle. Consequently, FIGS. 30 and 31 respectively include arrows 775 and 820 representing the air inflow into the air inlets 765 and 810, which respectively are moved upward and forward relative to the arrow 770 of FIG. 29, albeit the arrow 780 can still be used to represent air outflow from underneath the vehicle in each case. As in the case of the ATV 10 of FIG. 29, the entire cooling systems of the vehicles in FIGS. 30 and 31 are positioned within respective mid-sections 795 and 830 of the vehicles 785 and 800, respectively.

The positioning of the cooling systems of FIGS. 29-31 within the mid-sections 790, 795, 830 of the ATVs 10, 785, 800 is advantageous in several regards relative to conventional ATVs. In particular, because the cooling systems in these embodiments are located within the mid-sections of the vehicles, and because of the locations of the air inlets 760, 765, 810, there is reduced likelihood that mud, water, seeds, grass, leaves or other undesirable materials will be received into the cooling systems. Further, there is little likelihood of puncture or other damage to cooling system components, since the outer bodies of the ATVs 10, 785, 800 naturally create protective perimeters around the cooling system components.

Figure 32:
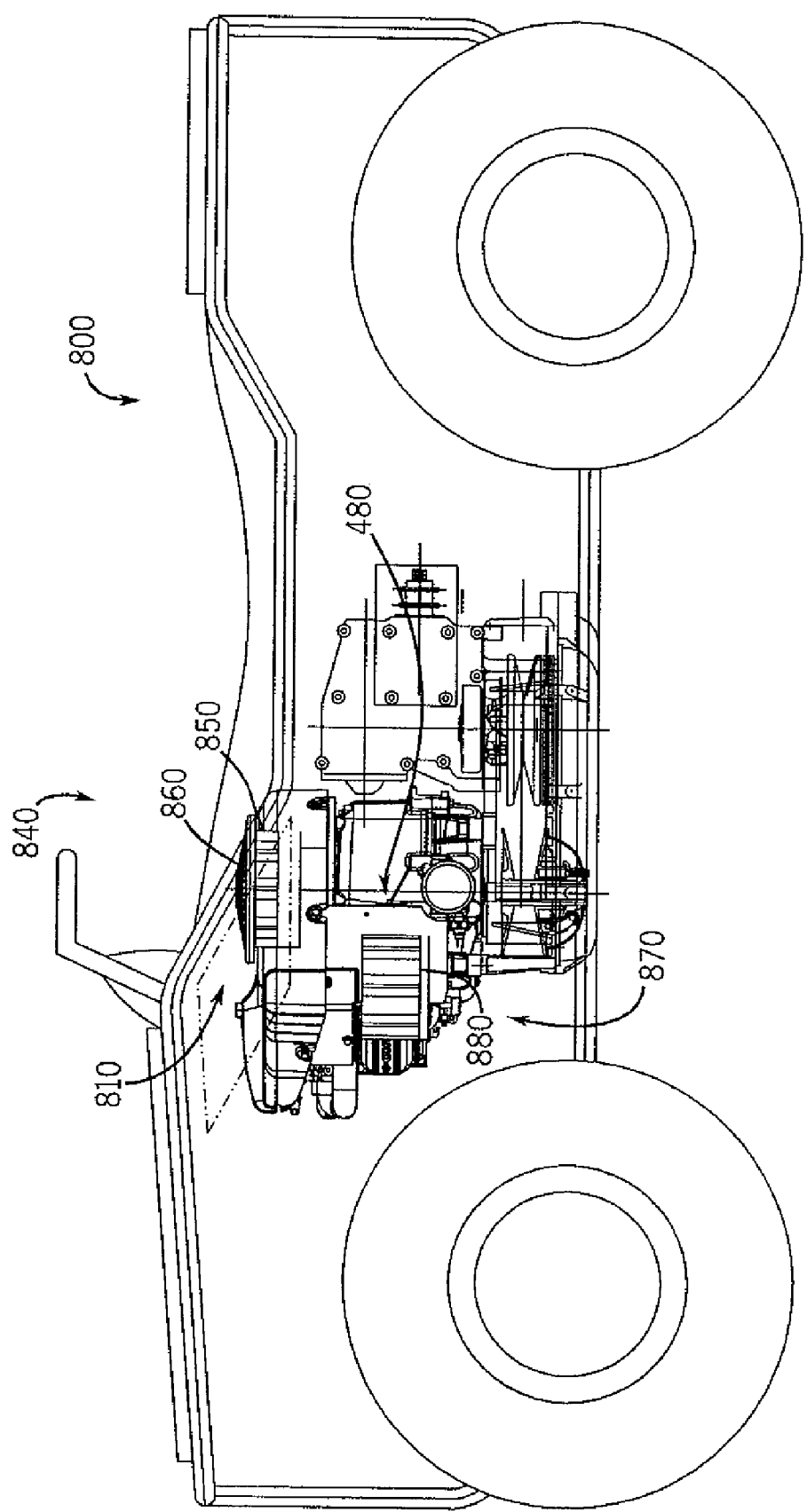
FIG. 32 is a left side elevation view (shown partly in cutaway) of the reduced-size vehicle of FIG. 31 that reveals exemplary internal components of the cooling system when the cooling system is a forced air-cooled cooling system.
Figure 34:
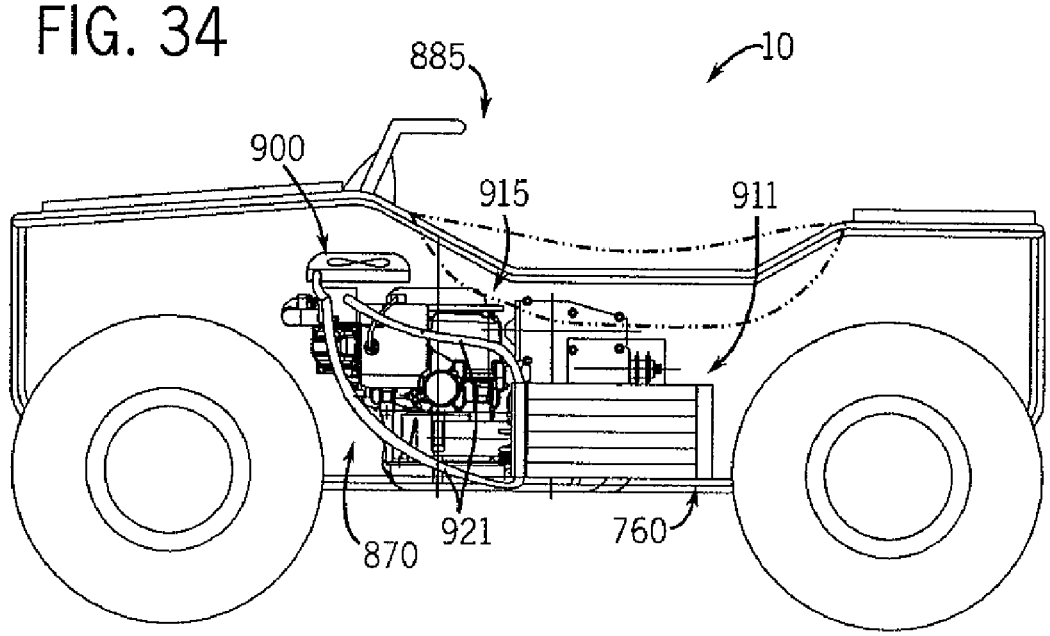
FIGS. 33 and 34 are left side elevation views (shown partly in cutaway) of the reduced-size vehicles shown in FIGS. 31 and 29, respectively, which reveal exemplary internal components of the cooling systems of the vehicles when the cooling systems are water-cooled cooling systems.
Figure 33:
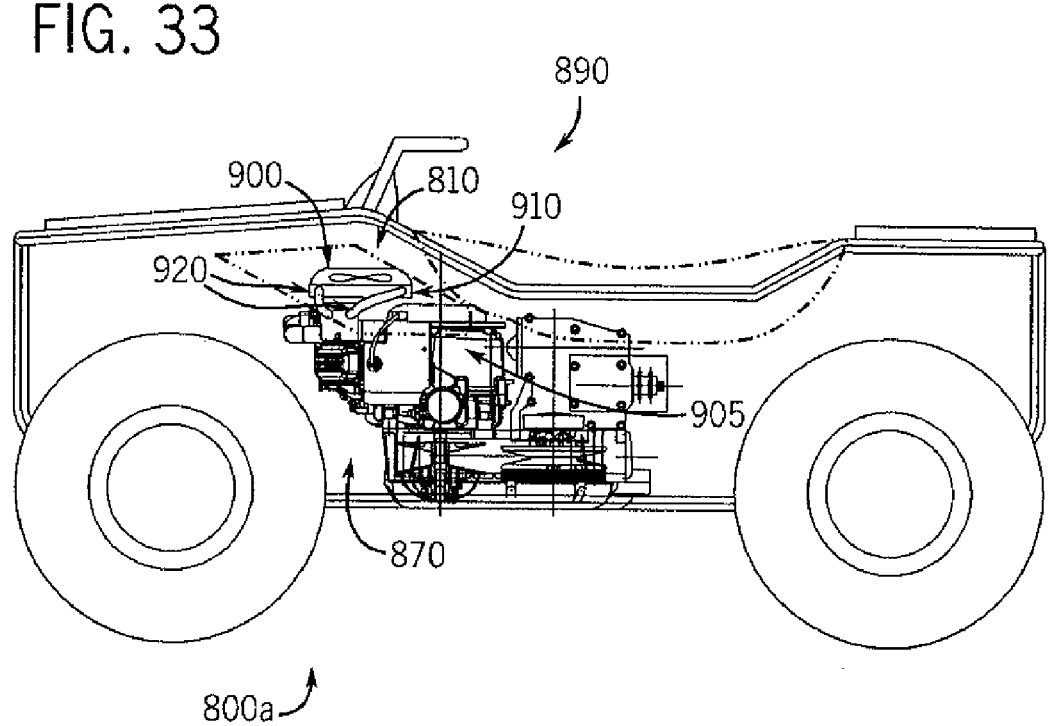

Referring to FIGS. 32-34, components of two different types of cooling systems that can be employed within the ATVs 10, 785 and 800 of FIGS. 29-31 (as well as other ATVs and reduced-size vehicles) are shown in more detail. With respect to FIG. 32, components of a first, forced air-cooled cooling system 840 are shown in partial cutaway. As shown, the arrangement of components of the cooling system 840 of FIG. 32 is particularly applicable to the embodiment of ATV 800 shown in FIG. 31; however, similar arrangements could also be used with respect to the ATVs 10, 785 of FIGS. 29-30 and with other ATVs and reduced-size vehicles. The cooling system 840 of FIG. 32 in particular includes the air inlets 810 (only one is shown) and also includes a fan 850, a spinning mechanical air filter 860 located slightly above the fan, and an air discharge outlet 870 located proximate the underside of the ATV 800. Air entering by way of the air inlet 810 is sucked into the ATV 800 by way of the fan 850 through the air filter 860, passes by and cools the engine components 480, particularly finned cylinders and cylinder heads 880 on the engine, and then proceeds down and out through the air discharge outlet area 870.

FIG. 33 shows, in partial cutaway, components of an alternate, liquid cooled cooling system 890 as implemented in another version of the ATV 800 of FIG. 31, referred to as ATV 800a. As shown, the cooling system 890 includes, in addition to the air inlets 810 and the air discharge outlet 870 (which can be the same as that shown in FIG. 32), an electric cooling fan 900 and a radiator 910, which is connected to engine components 905 by way of coolant lines 920. In this embodiment, the radiator 910 is oriented so that its large outer sides through which air flows are substantially horizontally-oriented. In contrast to conventional ATVs employing liquid cooled cooling systems, the coolant lines 920 in the present embodiment are short since the cooling system 890 is within the mid-section of the ATV 800a in close proximity to the engine components 905. Further, FIG. 34 shows, in partial cutaway, components of another embodiment of liquid cooled cooling system 885 as implemented in the ATV 10 of FIG. 29, with the cooling system including the air inlets 760 (one of which is shown) rather than the air inlets 810, a radiator 911 positioned adjacent the air inlets, and coolant lines 921 between the radiator and engine components 915. In this embodiment, the large outer sides of the radiator 911 through which air flows are oriented in a substantially vertical manner and also are substantially parallel to a central axis of the vehicle (e.g., corresponding to the central axis 125 of FIG. 2).

Figure 35A:
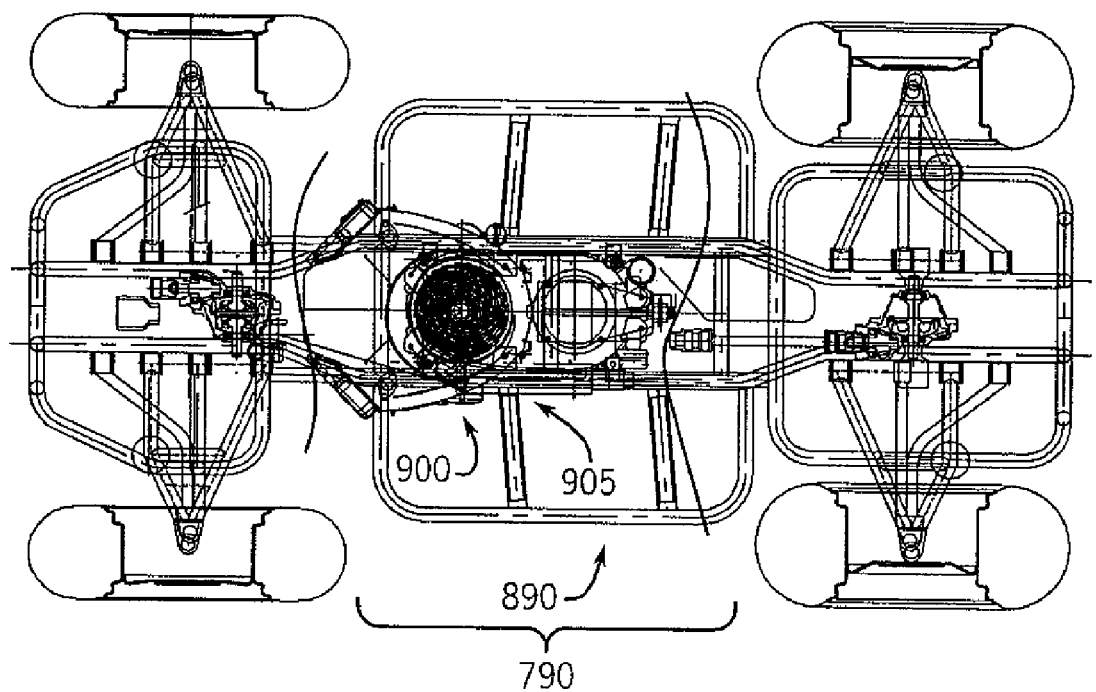
FIGS. 35(a) and (b) respectively show top plan and left side elevation views of some of the internal components of the reduced-size vehicle of FIG. 33, including an internal frame (which is the same as that shown in FIG. 2), suspension system components and cooling system components, and include cross hatching used to indicate volume voids that are formed when a vertical cooling path is employed in the vehicle as shown.
Figure 35B:
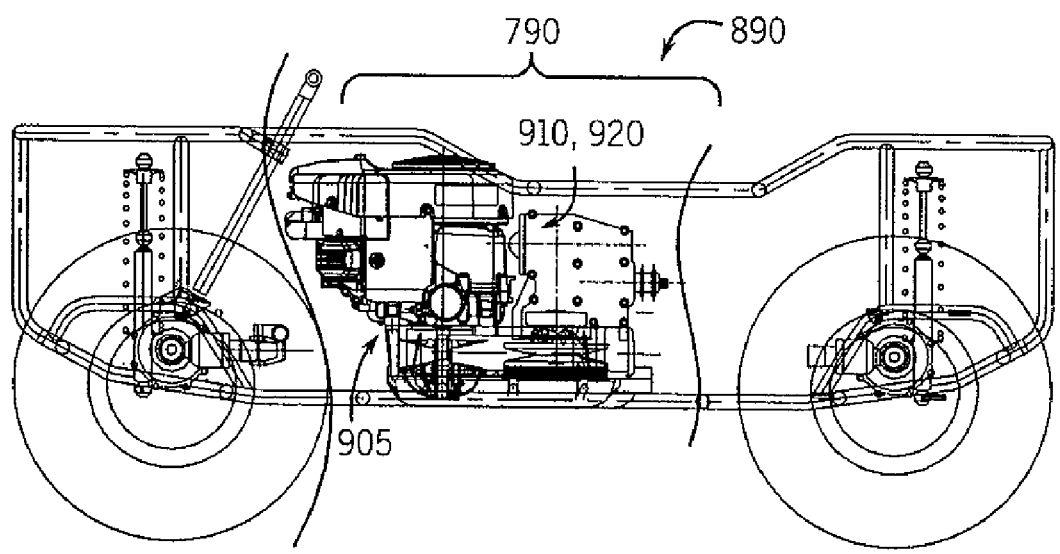

FIGS. 35(a)-(b) additionally show a number of the components of the cooling system 890 of FIG. 33 mounted on the ATV 800a. In contrast to the depiction in FIG. 33, FIGS. 35(a)-(b) show the ATV 800a with most external components (e.g., the outer housing or body of the vehicle) removed to reveal in more detail the components of the cooling system 890 (aside from the air inlets 810 and air discharge outlet 870) along with the engine components 905 of the vehicle, both from a top view (FIG. 35(a)) and from a left side elevation view (FIG. 35(b)). FIGS. 35(a)-(b) in particular demonstrate the compactness of the arrangement that is achieved by virtue of providing the cooling system 890 within the mid-section 790 of the ATV 800a proximate the engine components 905. Again, while the arrangements of components shown in FIGS. 32-35 are particularly applicable to the embodiments of ATVs 10, 800/800a shown in FIGS. 29 and 31, similar arrangements could also be used with respect to the ATV 785 of FIG. 30 and with other ATVs and reduced-size vehicles.

Turning to FIG. 36, exemplary air flow patterns around and through the ATV 800 of FIGS. 31-32 (or other ATVs such as the ATVs 10, 785) during operation are shown. As illustrated, when the ATV 800 moves forward, high velocity air 930 flows around and past the vehicle in a largely horizontal manner. Typically, some of the high velocity air 930 is slowed down and becomes low velocity air 940, particularly as the high velocity air encounters the operator himself or herself. That is, some of the high velocity air 930 is blocked, and as a result eddy currents and other swirling patterns of the low velocity air 940 are created, particularly around the mid-section 830 of the ATV 800. It is primarily this low velocity air 940 that enters the air inlets 810 (or air inlets 760 or 765). After the low velocity air 940 enters the air inlets 810, and passes through the cooling system 840 (or 885 or 890), the air leaves the vehicle by way of the air discharge outlet 870 and then passes underneath the vehicle as expelled cooling air 950.

The air flow patterns created by the ATV 800 and its cooling system components during operation are advantageous in several regards. When the ATV 800 is moving forward, the operator creates a low velocity, high pressure zone over the air inlets 810, while high velocity air proceeding underneath the vehicle creates a low pressure area below the vehicle. Consequently, air has a natural tendency to move through the cooling system 840 from the low velocity, high pressure region above the vehicle to the high velocity, low pressure area beneath the vehicle. Further, insofar as the air passing through the particular cooling system embodiments shown in FIGS. 32-34 is, in each case, driven by a fan that in turn is driven by the engine, the engine will not overheat during idling, and hot air will not chimney upward out of the air inlet(s) toward the operator so long as the engine continues to run.

In the present embodiment, the expelled cooling air 950 is expelled in a direction away from the operator and does not tend to heat the operator. However, in alternate embodiments, one or more vents could be provided proximate the saddle-type seat 30 (e.g., near the operator's legs) that would allow some or all of the expelled cooling air 950 to pass by the operator and thus provide heating to the operator, or to be passed through and around the seat. In further alternate embodiments, such vents would be provided, but could be switched on and off (e.g., opened or closed) by the operator, thus giving the operator control over whether heated air was provided proximate the operator or directed away from the operator (or some combination of both).

In accordance with at least some embodiments of the present invention, some or all of the exhaust system components 490 are also located within the mid-section 790 of the ATV 10 (or other ATV or reduced-size vehicle). In particular, as is evident from a comparison of FIGS. 1 and 10, a muffler 955 can be provided within the mid-section of the ATV 10, for example, under the saddle-type seat 30 of the ATV. As discussed further below, in addition to the muffler 955, the exhaust system components 490 typically further include an exhaust inlet, an exhaust outlet, a cooling air inlet and a cooling air outlet.

Referring additionally to FIG. 37, in a preferred embodiment, the muffler 955 includes a substantially cylindrical housing 960 that is orientated so that its central axis 965 is vertically-oriented (or at least substantially or largely vertically oriented) within the ATV 10. The housing 960 can be top mounted to the frame 100 or other vehicle component by a single rubber mount. Within the cylindrical housing 960 are a first, interior cylindrical chamber 970 and also a second, annular chamber 975 existing between the housing 960 and the interior cylindrical chamber 970. Cooling air is provided from the cooling system (e.g., from a fan such as the cooling fan 900 discussed above or an auxiliary fan) to a cooling air inlet 980 that is coupled to (or formed integrally with) the muffler 955, where the cooling air inlet is located proximate a top 962 of the muffler 955/cylindrical housing 960 and is in communication with the annular chamber 975. Upon entering the air inlet 980, the cooling air proceeds into the annular chamber 975 and then swirls around that chamber in a generally downward manner until it exits the chamber at a cooling air outlet 985 along a bottom 990 of the muffler 955.

The bottom 990 of the muffler 955 further is coupled to (or formed integrally with) both an exhaust inlet 995 and an exhaust outlet 999, which are both in communication with the interior cylindrical chamber 970 of the muffler. Exhaust from the engine is communicated by way of the exhaust inlet 995 into the interior cylindrical chamber 970, where it is cooled due to the cooling air flow within the annular chamber 975. The cooled exhaust then exits the muffler 955 by way of the exhaust outlet 999, which can transport the exhaust to a variety of locations around the vehicle for emission. To the extent that the exhaust outlet 999 is longer than in most conventional ATVs (e.g., to the extent that exhaust is communicated form the mid-section 790 of the ATV 10 to the rear end of the ATV), the length of the exhaust outlet helps to attenuate noise from the engine.

Positioning of the exhaust system components 490, particularly the muffler 955, within the mid-section 790 of the ATV 10 is advantageous relative to positioning of those components elsewhere such as in the rear section of the vehicle. In particular, because the muffler 955 is a fairly large component, the placement of the muffler within the mid-section 790 of the ATV 10 makes space available within other sections of the vehicle at which the muffler might otherwise be located, particularly within the rear section. Such space can then be used for other purposes, for example, the implementation of internal compartments such as the rear internal compartment 430 discussed above. Further, placement of the muffler within the mid-section 790 of the ATV 10 actually allows for the use of a larger muffler than in conventional embodiments of ATVs in which the muffler is placed in the rear of the vehicle, since the muffler's size is not constrained by the need to work around the other components in the rear of the vehicle (e.g., suspension components).

Appropriate placement of the muffler 955 and other exhaust system components, particularly the exhaust outlet 999, can also reduce or preclude backflow of water or other liquids through the muffler and into the engine. Additionally, in some embodiments the muffler 955 can include features that further reduce the chances of backflow. For example, as shown in FIG. 38, in one such embodiment an interior cylindrical chamber 971 of the muffler (e.g., taking the place of the chamber 970 described above) is further divided into multiple interconnected interior chambers 1000 connected by vertical stand tubes that together function as a water labyrinth tending to preclude water from making its way back from the exhaust outlet 999 into the exhaust inlet 995 and subsequently into the engine.

In the embodiment shown, there are four such interior chambers 1000 shown as chambers 1001, 1002, 1003, and 1004, each of which is at a level higher than the previous chamber. As shown, the exhaust outlet 999 is linked to the third highest chamber 1003. The third highest chamber 1003 in turn is coupled by way of an interior vertical stand tube 1005 to the second highest chamber 1002. That second highest chamber 1002 in turn is coupled to the highest chamber 1004 by an additional interior vertical stand tube 1006. Further, the highest interior chamber 1004 is then coupled to the lowest chamber 1001 by way of a further interior vertical stand tube 1007, with the interior chamber 1001 then being coupled to the exhaust inlet 995. As shown, preferably, the vertical stand tubes 1005 and 1007 are coupled to the respective interior chambers 1003 and 1004 at relatively high points within those chambers, while the exhaust outlet 999 and vertical stand tube 1006 are coupled to those respective interior chambers at lower points within those chambers. Consequently, if water enters the exhaust outlet 999, the water fills up the interior chamber 1003 nearly completely before water then proceeds into the chamber 1002, and likewise water fills up the interior chamber 1004 nearly completely before the water proceeds into the chamber 1001 and then into the exhaust inlet 995.

Referring now to FIGS. 39(*a*), 39(*b*), 39(*c*) and 39(*d*), two alternate embodiments of mufflers 1010 and 1040 are shown, respectively. More particularly, FIG. 39(*a*) shows the muffler 1010 to have lower, middle and upper chambers 1012, 1014 and 1016, respectively. The chambers 1012, 1014 and 1016 are situated within an exterior housing 1034 of the muffler 1010, and an annular cavity 1036 exists between the exterior housing 1034 and outer surfaces 1038 of the chambers 1012, 1014 and 1016. Cooling air enters the exterior housing 1034 by way of an entrance 1040 and passes through the annular cavity 1036 and then out a bottom 1042 of the muffler, such that the exterior housing 1034 is cooled relative to the exhaust within the chamber 1012, 1014, and 1016. Further as shown, the upper chamber 1016 is coupled to an exhaust inlet 1018 of the muffler, while the lower chamber 1012 is coupled to an exhaust outlet 1020 of the muffler. Additionally, the upper chamber 1016 is coupled to the lower chamber 1012 by way of a first intermediate channel 1022. A second intermediate channel 1023 links the upper chamber 1016 to the middle chamber 1014, with an upper lip 1024 of the channel 1023 being positioned somewhat higher than an upper lip 1026 of the first intermediate channel 1022, and substantially lower than an upper lip 1028 of the exhaust inlet 1018 within the upper chamber 1016. At a bottom 1030 of the first intermediate channel 1022 is located an openable/closable door or valve 1032 that is coupled to the bottom by way of a hinge 1033.

Figure 39A:
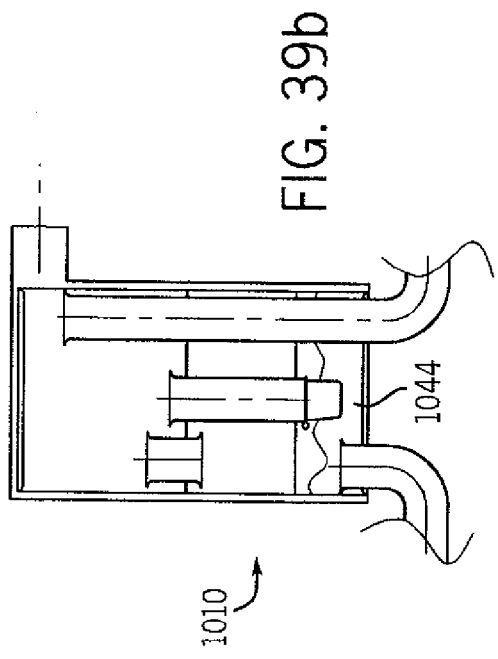
FIGS. 39(a) and (c) are schematic views of two alternate embodiments of mufflers that can be used in the vehicle of FIG. 1.
Figure 39B:
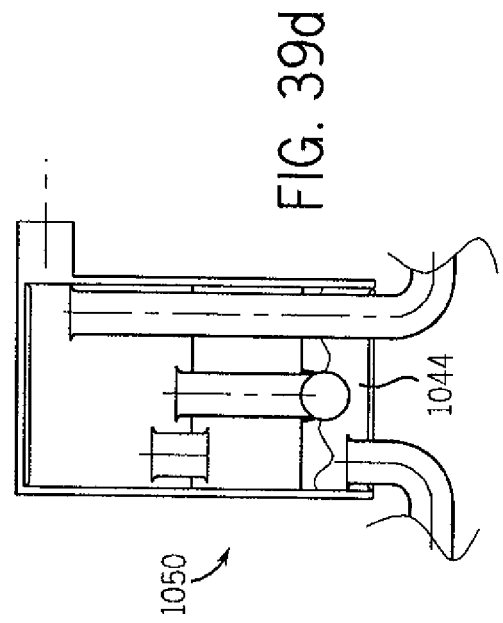
FIGS. 39(b) and (d) are additional schematic views of the mufflers shown in FIGS. 39(a) and (c), respectively, where bottom chambers within the mufflers are partially filled with water.

As shown by a comparison of FIGS. 39(a) and 39(b), the muffler 1010 operates so as to allow exhaust to pass through the muffler and at the same time to restrict any water (or other fluid) backflow from the exhaust outlet 1020 back to the exhaust inlet 1018. The valve 1032 as shown in FIG. 39(a) is normally in an open position so as to allow for the passage of exhaust out of the muffler 1010. However, as shown in FIG. 39(b), in circumstances where a substantial amount of water 1044 backflows into the lower chamber 1012 by way of the exhaust outlet 1020, the valve 1032 closes (at least temporarily) to prevent backflow of the water into the upper chamber 1016. To achieve this operation, the valve 1032 typically is made from a material that tends to float when situated within water. When exhaust pressure within the muffler becomes sufficient, the valve 1032 still will open to allow egress of the exhaust notwithstanding the floatation of the valve.

In addition to preventing water backflow through operation of the valve 1032, the muffler 1010 also prevents backflow due to the arrangement of channels 1022 and 1023. If water should fill up the lower chamber 1012 and the channel 1022 so as to rise above the upper lip 1026 of the channel 1022 and begin to fill the upper chamber 1016, the water will only rise above the upper lip 1028 of the exhaust inlet 1018 and begin to spill into that inlet after the water has first risen above the upper lip 1024 of the channel 1023, completely filled up the middle chamber 1014, and then further nearly completely filled up the upper chamber 1016.

Figure 39C:
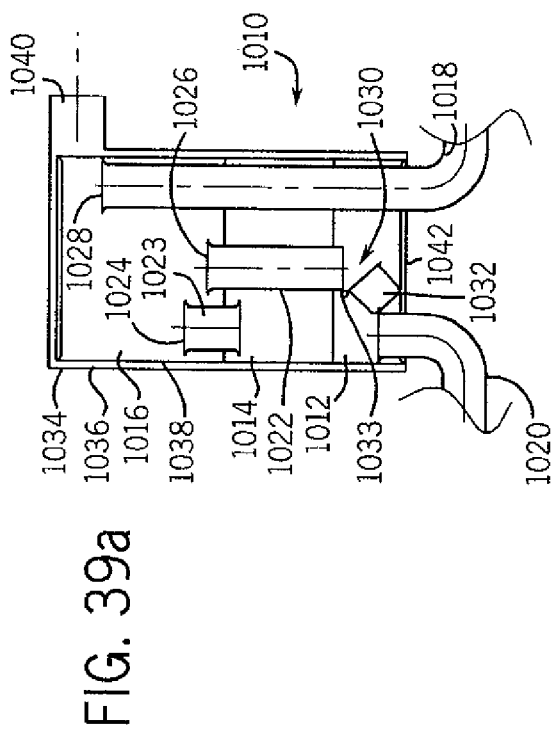
Figure 39D:
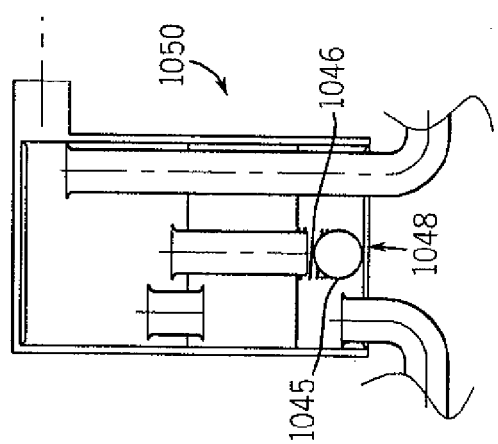

Referring further to FIGS. 39(c) and 39(d), the muffler 1050 is identical to the muffler 1010 except insofar as a spring-loaded check valve 1048 is employed in place of the hinged door valve 1032. As shown in FIG. 39(c), the valve 1048 is normally open with a check ball 1045 hanging from the channel 1022 by way of a spring 1046. However, as shown in FIG. 39(d), the valve 1048 closes when the level 1044 of water rises sufficiently. As with the hinged door valve 1032, the ball 1045 is typically made of a material that floats within water so that the valve 1048 closes when water sufficiently fills the lower chamber 1012.

As shown in FIGS. 39(a)-(d), proper operation of the mufflers 1010, 1050 presumes that the muffler 1010 is substantially vertically orientated, e.g., where the upper chamber is physically above the lower chamber, etc. It should be noted that, in these and similar embodiments employing labyrinths such as the muffler of FIG. 38 (and even in many embodiments that do not employ labyrinths, such as the muffler of FIG. 37), the mufflers tend to have a longer dimension (e.g., an axial length of a cylinder) and a shorter dimension (e.g., a diameter of the cylinder). In such embodiments, vertical orientation of the muffler also corresponds to aligning the longer dimension of the muffler substantially parallel to a vertical axis (e.g., normal to the ground).

The implementation of cooling system components and exhaust system components within the mid-section of an ATV as described above provides numerous advantages. Placement of the cooling system components in the mid-section enhances the cooling of the engine by improving the flow characteristics of the cooling system, better protecting critical components, and effectively venting heated discharge air. Further, it centralizes the necessary cooling apparatus in the vehicle, thus creating a more compact cooling solution, and further simplifies powertrain packaging, so as to free up valuable space within the vehicle allowing for alternative uses of that space. In particular when applied to ATVs, this arrangement creates a vehicle that is safer to use, due to enhanced mobility and mass centralization, and is more comfortable to operate because hot discharge air is effectively directed away from the operator (and/or any passenger) or, in alternate embodiments, more effectively directed toward the operator (and/or any passenger). Further, the ATV is more reliable to operate because critical powertrain components are out of harms way and less easily damaged due to encounters with environmental hazards.

Further, in particular with respect to the exhaust system components, the above-described embodiments improve performance by allowing the use of a larger volume muffler, reducing backpressure (which in part is due to the larger volume of the muffler) and lowering the output noise level resulting in quieter operation and increased power. Further, because of the larger muffler volume, there is a higher muffler volume to engine volume ratio, making tuning and noise targets easier to optimize and balance. Additionally, because the muffler uses forced cooling air, the air flow directed around the external surface of the muffler cools the hottest area first, and the top-down flow of cooling air enables heat to be forced out the bottom of the muffler to provide even cooling and to reduce the potential for excessive heating of the muffler, particularly its exterior surface, and components located nearby to the muffler. Because the muffler cooling air outlet is moved downward and is facing the ground, it also is more comfortable to work behind the ATV, and the muffler is quieter during operation.

The arrangement of the exhaust system components further enables the vehicle to ford deeper water crossings as the muffler can be designed (e.g., in accordance with FIG. 38) so that water does not back flow into the engine when the outlet is under water. The vertical orientation of the muffler allows other components of the vehicle to be packaged close by, particularly when the vertical muffler is cooled by forcing air under a heat shield and over the muffler, and also allows for easier installation. This cooling feature will become increasingly valuable as emission control apparatuses such as catalysts (which further heat the exhaust) begin to be used and eventually become necessary. The application of one or more of these features therefore results in ATVs that are one or more of more powerful, quieter, less prone to water ingestion, and more durable, with enhanced comfort for the operator and additional packaging flexibility for the vehicle designer. The end result is an ATV with superior handling, safety, comfort, convenience, and reliability.

It is specifically intended that the present invention not be limited to the embodiments and illustrations contained herein, but rather that the invention further include modified forms of those embodiments including portions of those embodiments and other embodiments and combinations of elements of such various embodiments as come within the scope of the following claims.

What is claimed is:

1. A reduced-size vehicle having a front section, a midsection and a rear section, the reduced-size vehicle comprising:
   a first compartment within the front section of the vehicle;
   a second compartment within the rear section of the vehicle; and
   a plurality of tires including front left and front right tires and rear left and rear right tires;
   wherein the first compartment is positioned at least substantially between the front left and right tires, and the second compartment is positioned at least substantially between the rear left and right tires;
   wherein at least one of the first and second compartments includes an openable port;
   wherein the openable port includes a lid; and
   wherein due to combined buoyancy of the first compartment, the second compartment and the tires, the reduced-size vehicle floats in water at least under some operational circumstances.

2. The reduced-size vehicle of claim 1, wherein the vehicle floats in water when the first and second compartments each are filled only with air.

3. The reduced-size vehicle of claim 1, wherein the vehicle floats in water when the vehicle is supporting an operator.

4. The reduced-size vehicle of claim 1, wherein the first and second compartments are substantially equal in terms of volume, and wherein a central axis of the vehicle extending between the front and rear sections is substantially horizontal when the vehicle is floating in the water.

5. The reduced-size vehicle of claim 1, wherein each of the first and second compartments displaces at least 17 gallons of water.

6. The reduced-size vehicle of claim 5, wherein each of the first and second compartments displaces at least 20 gallons of water.

7. The reduced-size vehicle of claim 1, wherein the lid is couple to a remainder of the compartment in a hinged manner.

8. The reduced-size vehicle of claim 1 wherein at least one of the compartments is capable of being filled with fluid and being sealed in a manner such that the fluid does not leak from the compartment.

9. The reduced-size vehicle of claim 1, further comprising a fuel tank that contributes to buoyancy of the vehicle, and wherein the tires are balloon-type tires.

10. The reduced-size vehicle of claim 1, wherein at least one of the first and second compartments includes a fixed top portion and a movable lid portion.

11. The reduced-size vehicle of claim 1, wherein the v6hicle is at least one of an all-terrain vehicle (ATV) and a utility vehicle (UV).

12. A reduced-size vehicle having a front section, a midsection and a rear section, the reduced-size vehicle comprising:
   a first compartment within the front section of the vehicle;
   a second compartment within the rear section of the vehicle; and
   a plurality of tires including front left and front right tires and rear left and rear right tires;
   wherein the first compartment is positioned at least substantially between the front left and right tires, and the second compartment is positioned at least substantially between the rear left and right tires;
   wherein due to combined buoyancy of the first compartment, the second compartment and the tires, the reduced-size vehicle floats in water at least under some operational circumstances;
   wherein at least one of the first and second compartments includes an openable port; and
   wherein at least one of the openable port and a remaining portion of the at least one compartment includes a seal, so that when the openable port is closed with respect to the remaining portion, an interior of the at least one compartment is sealed in at least one of an airtight and watertight manner from an exterior of the compartment.

13. The reduced-size vehicle of claim 12, wherein a rack is mounted on the openable port.

14. A reduced-size vehicle having a front section, a midsection and a rear section, the reduced-size vehicle comprising:
   a first compartment within the front section of the vehicle;
   a second compartment within the rear section of the vehicle; and
   a plurality of front and rear tires;
   wherein the first compartment is substantially interposed between said plurality of front tires, and the second compartment is substantially interposed between said plurality of rear tires;
   wherein due to combined buoyancy of the first compartment, the second compartment and the tires, the reduced-size vehicle floats in water at least under some operational circumstances,
   wherein at least one of the first and second compartments includes an openable port, wherein the openable port includes a lid, and wherein a rack is mounted on the lid.

15. The reduced-size vehicle of claim 14, wherein an exterior storage compartment can be coupled to the rack.

16. The reduced-size vehicle of claim 14, wherein at least one of the openable port and a remaining portion of the at least one compartment includes a seal, so that when the openable port is closed with respect to the remaining portion, an interior of the at least one compartment is sealed in at least one of an airtight and watertight manner from an exterior of the compartment.

17. The reduced-size vehicle of claim 14, wherein the lid is coupled to a remainder of the at least one compartment in a hinged manner.

18. A reduced-size vehicle having a front section, a midsection and a rear section, the reduced-size vehicle comprising:
   a first compartment within the front section of the vehicle;
   a second compartment within the rear section of the vehicle; and
   a plurality of tires including front left and front right tires and rear left and rear right tires;
   wherein the first compartment is positioned at least substantially between the front left and right tires, and the second compartment is positioned at least substantially between the rear left and right tires;
   wherein due to combined buoyancy of the first compartment, the second compartment and the tires, the reduced-size vehicle floats in water at least under some operational circumstances; and
   wherein the first compartment includes a first lid that is coupled in a hinged manner to a first remaining portion of the first compartment, and wherein the second compartment includes a second lid that is coupled in a hinged manner to a second remaining portion of the second compartment.

19. The reduced-size vehicle of claim 18, further comprising means for attaching the first lid to the first remaining portion in the hinged manner.

20. The reduced-size vehicle of claim 18, wherein each of the first and second lids opens upward and outward away from the mid-section of the vehicle.

21. The reduced-size vehicle of claim 18, wherein at least one of the following is true:

each of the first and second lids opens upward and inward toward the mid-section of the vehicle;

one of the first and second lids opens upward and inward toward the mid-section while the other of the first and second lids opens upward and outward away from the mid-section;

both of the first and second lids open upward and toward a right side of the vehicle; and one of the first and second lids opens upward and toward the right side while the other of the first and second lids opens upward and toward the left side.

22. The reduced-size vehicle of claim 18, wherein a rack is mounted on at least one of the first lid and the second lid.

* * * * *